US012303464B2

(12) United States Patent
Tagliamento et al.

(10) Patent No.: US 12,303,464 B2
(45) **Date of Patent: *May 20, 2025**

(54) SYSTEMS, METHODS, AND COMPONENTS FOR TRANSFERRING MEDICAL FLUIDS

(71) Applicant: ICU Medical, Inc., San Clemente, CA (US)

(72) Inventors: John Tagliamento, San Diego, CA (US); Hung Quang Ha, Escondido, CA (US); Erik Scott Shauver, Tustin, CA (US); Thomas F. Fangrow, Mission Viejo, CA (US); Yordan Dimitrov Pargov, Rolling Meadows, IL (US); Ivan Kurilov, Poway, CA (US)

(73) Assignee: ICU Medical, Inc., San Clemente, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 18/171,894

(22) Filed: Feb. 21, 2023

(65) Prior Publication Data

US 2023/0320935 A1 Oct. 12, 2023

Related U.S. Application Data

(62) Division of application No. 16/840,010, filed on Apr. 3, 2020, now Pat. No. 11,590,057.

(51) Int. Cl.
*A61J 1/20* (2006.01)
*A61J 1/10* (2006.01)

(52) U.S. Cl.
CPC ........... *A61J 1/2062* (2015.05); *A61J 1/2089* (2013.01); *A61J 1/10* (2013.01); *A61J 1/2096* (2013.01)

(58) Field of Classification Search
CPC ......... A61J 1/2062; A61J 1/2089; A61J 1/22; A61J 1/1475; A61J 1/2068; A61J 2200/70; A61M 5/142
See application file for complete search history.

(56) References Cited

U.S. PATENT DOCUMENTS 1,923,501 A 8/1933 Perry
3,157,201 A 11/1964 Littmann
(Continued)

FOREIGN PATENT DOCUMENTS

CA 2 060 151 8/1997
CA 2 125 300 10/1999
(Continued)

OTHER PUBLICATIONS

Ahn et al., "Towards Scalable Authentication in Health Services", Eleventh IEEE International Workshops on Enabling Technologies: Infrastructure for Collaborative Enterprises, Jun. 2002, pp. 83-88.
(Continued)

*Primary Examiner* — Timothy P. Kelly
(74) *Attorney, Agent, or Firm* — Knobbe, Martens, Olson & Bear, LLP

(57) ABSTRACT

An example of an electronic medical fluid transfer device can comprise a fluid transfer module with a multidirectional flow control valve and an intermediate container or pumping region, a sensor configured to detect whether at least one of a vacuum or gas is present in the fluid transfer module, a first electromechanical driver configured to interface with and control the multidirectional flow control valve on the fluid transfer module, a second electromechanical driver configured to be mechanically linked to and control the intermediate container or pumping region according to an operational parameter, and one or more computer processors configured to communicate electronically with the sensor and the first and second electromechanical drivers to deter-
(Continued)

mine the operational parameter based on a flow characteristic of medical fluid to be transferred and adjust the operational parameter based on output of the sensor.

20 Claims, 18 Drawing Sheets

(56) References Cited

U.S. PATENT DOCUMENTS 3,344,785 A 10/1967 Hamilton
D222,956 S 2/1972 Sato
D222,957 S 2/1972 Sato
D236,163 S 7/1975 Manno
4,005,710 A 2/1977 Zeddies et al.
4,024,864 A 5/1977 Davies et al.
4,055,175 A 10/1977 Clemens et al.
4,084,606 A 4/1978 Mittleman
4,151,845 A 5/1979 Clemens
4,187,890 A 2/1980 Stach et al.
4,190,048 A 2/1980 Sampson
4,213,454 A 7/1980 Shim
4,240,438 A 12/1980 Updike et al.
4,262,671 A 4/1981 Kersten
4,280,494 A 7/1981 Cosgrove et al.
4,306,705 A 12/1981 Svensson
4,308,866 A 1/1982 Jeliffe
4,336,802 A 6/1982 Stone et al.
4,367,736 A 1/1983 Gupton
4,370,983 A 2/1983 Lichtenstein et al.
4,373,527 A 2/1983 Fischell
D268,206 S 3/1983 Kosako
D268,284 S 3/1983 Manno et al.
4,392,849 A 7/1983 Petre et al.
4,395,259 A 7/1983 Prestele et al.
4,397,335 A 8/1983 Doblar et al.
4,410,321 A 10/1983 Pearson et al.
4,423,741 A 1/1984 Levy
4,457,751 A 7/1984 Rodler
4,464,170 A 8/1984 Clemens
4,469,481 A 9/1984 Kobayashi
4,475,901 A 10/1984 Kraegen et al.
4,494,950 A 1/1985 Fischell
4,498,843 A 2/1985 Schneider et al.
4,515,584 A 5/1985 Abe et al.
4,519,792 A 5/1985 Dawe
4,526,568 A 7/1985 Clemens et al.
4,529,401 A 7/1985 Leslie et al.
4,534,758 A 8/1985 Akers et al.
4,543,955 A 10/1985 Schroeppel
4,551,133 A 11/1985 Zegers de Beyl et al.
4,553,958 A 11/1985 LeCocq
4,559,037 A 12/1985 Franetzki et al.
4,559,043 A 12/1985 Whitehouse et al.
4,561,856 A 12/1985 Cochran
4,613,937 A 9/1986 Batty
4,624,661 A 11/1986 Arimond
4,633,878 A 1/1987 Bombardieri
4,634,426 A 1/1987 Kamen
4,634,427 A 1/1987 Hannula et al.
4,666,429 A 5/1987 Stone
4,670,007 A 6/1987 Wheeldon et al.
4,674,652 A 6/1987 Aten et al.
4,676,776 A 6/1987 Howson et al.
4,679,562 A 7/1987 Luksha
4,683,916 A 8/1987 Raines
4,685,903 A 8/1987 Cable et al.
4,695,954 A 9/1987 Rose
4,696,671 A 9/1987 Epstein et al.
4,714,462 A 12/1987 DiDomenico
4,722,734 A 2/1988 Kolin
4,730,849 A 3/1988 Siegel
4,731,051 A 3/1988 Fischell
4,741,732 A 5/1988 Crankshaw et al.
4,755,172 A 7/1988 Baldwin
4,756,706 A 7/1988 Kerns et al.
4,759,756 A 7/1988 Forman et al.
4,768,568 A 9/1988 Fournier et al.
4,776,842 A 10/1988 Franetzki et al.
4,778,450 A 10/1988 Kamen
4,785,969 A 11/1988 McLaughlin
4,803,625 A 2/1989 Fu et al.
4,819,684 A 4/1989 Zaugg et al.
4,835,372 A 5/1989 Gombrich et al.
4,838,275 A 6/1989 Lee
4,838,856 A 6/1989 Mulreany et al.
4,838,857 A 6/1989 Strowe et al.
4,854,324 A 8/1989 Hirschman et al.
4,857,716 A 8/1989 Gombrich et al.
4,858,154 A 8/1989 Anderson et al.
4,863,429 A 9/1989 Baldwin
D305,165 S 12/1989 Rudolph et al.
4,898,578 A 2/1990 Rubalcaba, Jr.
4,908,017 A 3/1990 Howson et al.
4,922,975 A 5/1990 Polaschegg
4,933,873 A 6/1990 Kaufman et al.
4,936,841 A 6/1990 Aoki et al.
4,943,279 A 7/1990 Samiotes et al.
4,946,439 A 8/1990 Eggers
4,953,745 A 9/1990 Rowlett
4,969,874 A 11/1990 Michel et al.
4,972,876 A 11/1990 Kabata et al.
4,976,590 A 12/1990 Baldwin
4,978,335 A 12/1990 Arthur, III
4,995,268 A 2/1991 Ash et al.
5,000,739 A 3/1991 Kulisz et al.
5,010,473 A 4/1991 Jacobs
5,014,698 A 5/1991 Cohen
5,016,172 A 5/1991 Dessertine
5,024,347 A 6/1991 Baldwin
5,026,084 A 6/1991 Paisfield
5,034,004 A 7/1991 Crankshaw
5,037,390 A 8/1991 Raines et al.
5,041,086 A 8/1991 Koenig et al.
5,058,161 A 10/1991 Weiss
5,078,683 A 1/1992 Sancoff et al.
5,084,828 A 1/1992 Kaufman et al.
5,088,981 A 2/1992 Howson et al.
5,097,505 A 3/1992 Weiss
5,100,380 A 3/1992 Epstein et al.
5,102,392 A 4/1992 Sakai et al.
5,104,374 A 4/1992 Bishko et al.
5,109,850 A 5/1992 Blanco et al.
5,114,580 A 5/1992 Ahmad et al.
5,131,816 A 7/1992 Brown
D328,952 S 8/1992 Arioka
5,142,484 A 8/1992 Kaufman et al.
5,153,827 A 10/1992 Coutre et al.
5,157,640 A 10/1992 Backner
5,161,222 A 11/1992 Montejo et al.
5,176,658 A 1/1993 Ranford
5,177,993 A 1/1993 Beckman et al.
5,181,910 A 1/1993 Scanlon
5,190,522 A 3/1993 Wocicki et al.
5,199,439 A 4/1993 Zimmerman et al.
5,200,891 A 4/1993 Kehr et al.
5,216,597 A 6/1993 Beckers
5,221,268 A 6/1993 Barton et al.
5,224,937 A 7/1993 van der Heiden et al.
5,230,061 A 7/1993 Welch
5,243,982 A 9/1993 Möstl et al.
5,244,463 A 9/1993 Cordner, Jr. et al.
5,249,260 A 9/1993 Nigawara et al.
5,254,096 A 10/1993 Rondelet et al.
5,256,155 A 10/1993 Yerlikaya et al.
5,256,156 A 10/1993 Kern et al.
5,256,157 A 10/1993 Samiotes et al.
5,261,702 A 11/1993 Mayfield
5,288,290 A 2/1994 Brody
5,300,044 A 4/1994 Classey et al.
5,317,506 A 5/1994 Coutre et al.
D348,101 S 6/1994 Poli et al.
5,319,355 A 6/1994 Russek
5,319,363 A 6/1994 Welch et al.
5,330,634 A 7/1994 Wong et al.

(56) References Cited

U.S. PATENT DOCUMENTS

| | | | |
|---|---|---|---|
| 5,334,211 | A | 8/1994 | Shiber |
| 5,336,201 | A | 8/1994 | von der Decken |
| 5,338,157 | A | 8/1994 | Blomquist |
| 5,341,476 | A | 8/1994 | Lowell |
| D352,778 | S | 11/1994 | Irvin et al. |
| 5,364,346 | A | 11/1994 | Schrezenmeir |
| 5,366,346 | A | 11/1994 | Danby |
| 5,368,562 | A | 11/1994 | Blomquist et al. |
| 5,373,454 | A | 12/1994 | Kanda et al. |
| 5,376,070 | A | 12/1994 | Purvis et al. |
| 5,378,231 | A | 1/1995 | Johnson et al. |
| 5,389,071 | A | 2/1995 | Kawahara et al. |
| 5,389,078 | A | 2/1995 | Zalesky et al. |
| 5,405,333 | A | 4/1995 | Richmond |
| 5,417,222 | A | 5/1995 | Dempsey et al. |
| 5,423,748 | A | 6/1995 | Uhala |
| 5,423,791 | A | 6/1995 | Bartlett |
| 5,431,201 | A | 6/1995 | Torchia et al. |
| 5,429,602 | A | 7/1995 | Hauser |
| 5,431,627 | A | 7/1995 | Pastrone et al. |
| 5,432,777 | A | 7/1995 | Le Boudec et al. |
| 5,439,451 | A | 8/1995 | Collinson et al. |
| 5,445,621 | A | 8/1995 | Poli et al. |
| 5,447,164 | A | 9/1995 | Shaya et al. |
| 5,455,851 | A | 10/1995 | Chaco et al. |
| 5,461,365 | A | 10/1995 | Schlager et al. |
| 5,464,392 | A | 11/1995 | Epstein et al. |
| 5,465,082 | A | 11/1995 | Chaco |
| 5,466,220 | A | 11/1995 | Brenneman |
| 5,485,408 | A | 1/1996 | Blomquist |
| 5,486,286 | A | 1/1996 | Peterson et al. |
| 5,493,430 | A | 2/1996 | Lu et al. |
| 5,496,273 | A | 3/1996 | Pastrone et al. |
| 5,505,828 | A | 4/1996 | Wong et al. |
| 5,507,288 | A | 4/1996 | Bocker et al. |
| 5,507,786 | A | 4/1996 | Morgan et al. |
| 5,508,499 | A | 4/1996 | Ferrario |
| 5,515,713 | A | 5/1996 | Saugues et al. |
| 5,520,637 | A | 5/1996 | Pager et al. |
| 5,522,798 | A | 6/1996 | Johnson et al. |
| 5,547,470 | A | 8/1996 | Johnson et al. |
| 5,554,013 | A | 9/1996 | Owens et al. |
| 5,562,615 | A | 10/1996 | Nassif |
| 5,577,169 | A | 11/1996 | Prezioso |
| 5,582,323 | A | 12/1996 | Kurtenbach |
| 5,582,593 | A | 12/1996 | Hultman |
| 5,594,786 | A | 1/1997 | Chaco et al. |
| 5,598,519 | A | 1/1997 | Narayanan |
| 5,609,572 | A | 3/1997 | Lang |
| 5,620,608 | A | 4/1997 | Rosa et al. |
| 5,630,710 | A | 5/1997 | Tune et al. |
| 5,636,044 | A | 6/1997 | Yuan et al. |
| 5,643,212 | A | 7/1997 | Coutre et al. |
| 5,645,538 | A | 7/1997 | Richmond |
| 5,647,845 | A | 7/1997 | Haber et al. |
| 5,651,775 | A | 7/1997 | Walker et al. |
| 5,658,131 | A | 8/1997 | Aoki et al. |
| 5,658,250 | A | 8/1997 | Blomquist et al. |
| 5,665,065 | A | 9/1997 | Colman et al. |
| 5,669,877 | A | 9/1997 | Blomquist |
| 5,672,154 | A | 9/1997 | Sillén et al. |
| 5,676,346 | A | 10/1997 | Leinsing |
| 5,681,285 | A | 10/1997 | Ford et al. |
| 5,685,844 | A | 11/1997 | Marttila |
| 5,685,866 | A | 11/1997 | Lopez |
| 5,687,717 | A | 11/1997 | Halpern et al. |
| 5,689,229 | A | 11/1997 | Chaco et al. |
| 5,697,899 | A | 12/1997 | Hillman et al. |
| 5,699,509 | A | 12/1997 | Gary et al. |
| 5,708,714 | A | 1/1998 | Lopez et al. |
| 5,713,350 | A | 2/1998 | Yokota et al. |
| 5,713,856 | A | 2/1998 | Eggers et al. |
| 5,718,562 | A | 2/1998 | Lawless et al. |
| 5,719,761 | A | 2/1998 | Gatti et al. |
| 5,733,259 | A | 3/1998 | Valcke et al. |
| 5,738,102 | A | 4/1998 | Lemelson |
| 5,744,027 | A | 4/1998 | Connell et al. |
| 5,752,621 | A | 5/1998 | Passamante |
| 5,754,111 | A | 5/1998 | Garcia |
| 5,764,034 | A | 6/1998 | Bowman et al. |
| 5,764,159 | A | 6/1998 | Neftel et al. |
| 5,772,635 | A | 6/1998 | Dastur et al. |
| 5,774,865 | A | 6/1998 | Glynn |
| 5,776,345 | A | 7/1998 | Truitt et al. |
| 5,778,256 | A | 7/1998 | Darbee |
| 5,778,345 | A | 7/1998 | McCartney |
| 5,781,442 | A | 7/1998 | Engleson et al. |
| 5,782,805 | A | 7/1998 | Meinzer et al. |
| 5,782,816 | A | 7/1998 | Werschmidt et al. |
| 5,788,669 | A | 8/1998 | Peterson |
| 5,797,515 | A | 8/1998 | Liff et al. |
| 5,800,387 | A | 9/1998 | Duffy et al. |
| 5,807,312 | A | 9/1998 | Dzwonkiewicz |
| 5,810,792 | A | 9/1998 | Fangrow, Jr. et al. |
| 5,814,015 | A | 9/1998 | Gargano et al. |
| 5,822,544 | A | 10/1998 | Chaco et al. |
| 5,822,715 | A | 10/1998 | Worthington et al. |
| 5,827,179 | A | 10/1998 | Lichter et al. |
| 5,830,185 | A | 11/1998 | Block, Jr. |
| 5,832,448 | A | 11/1998 | Brown |
| 5,836,910 | A | 11/1998 | Duffy et al. |
| 5,850,344 | A | 12/1998 | Conkright |
| 5,867,821 | A | 2/1999 | Ballantyne et al. |
| 5,870,733 | A | 2/1999 | Bass et al. |
| 5,871,110 | A | 2/1999 | Grimard et al. |
| 5,871,465 | A | 2/1999 | Vasko |
| 5,871,500 | A | 2/1999 | Jepson et al. |
| 5,873,731 | A | 2/1999 | Predergast |
| 5,885,245 | A | 3/1999 | Lynch et al. |
| D408,079 | S | 4/1999 | Ellis |
| 5,897,493 | A | 4/1999 | Brown |
| 5,897,498 | A | 4/1999 | Canfield et al. |
| 5,897,526 | A | 4/1999 | Vaillancourt |
| 5,904,666 | A | 5/1999 | DeDecker et al. |
| 5,910,252 | A | 6/1999 | Truitt et al. |
| 5,912,818 | A | 6/1999 | McGrady et al. |
| 5,915,240 | A | 6/1999 | Karpf |
| 5,920,054 | A | 7/1999 | Uber, III |
| 5,920,263 | A | 7/1999 | Huttenhoff et al. |
| 5,924,074 | A | 7/1999 | Evans |
| 5,931,764 | A | 8/1999 | Freeman et al. |
| 5,935,099 | A | 8/1999 | Peterson et al. |
| 5,935,106 | A | 8/1999 | Olsen |
| 5,941,846 | A | 8/1999 | Duffy et al. |
| 5,947,951 | A | 9/1999 | Ortiz et al. |
| 5,956,501 | A | 9/1999 | Brown |
| 5,957,885 | A | 9/1999 | Bollish et al. |
| 5,960,085 | A | 9/1999 | de la Huerga |
| 5,961,448 | A | 10/1999 | Swenson et al. |
| 5,967,559 | A | 10/1999 | Abramowitz |
| 5,968,014 | A | 10/1999 | Neftel et al. |
| 5,971,594 | A | 10/1999 | Sahai et al. |
| 5,975,081 | A | 11/1999 | Hood et al. |
| 5,989,237 | A | 11/1999 | Fowles et al. |
| 5,990,838 | A | 11/1999 | Burns et al. |
| 5,997,476 | A | 12/1999 | Brown |
| 6,000,828 | A | 12/1999 | Leet |
| 6,003,006 | A | 12/1999 | Colella et al. |
| 6,012,034 | A | 1/2000 | Hamparian et al. |
| 6,017,318 | A | 1/2000 | Gauthier et al. |
| 6,021,392 | A | 2/2000 | Lester et al. |
| 6,024,539 | A | 2/2000 | Blomquist |
| 6,024,699 | A | 2/2000 | Surwit et al. |
| 6,032,155 | A | 2/2000 | de la Huerga |
| 6,032,676 | A | 3/2000 | Moore |
| 6,039,251 | A | 3/2000 | Holowko et al. |
| 6,059,747 | A | 5/2000 | Bruggeman et al. |
| 6,070,761 | A | 6/2000 | Bloom et al. |
| 6,073,106 | A | 6/2000 | Rozen et al. |
| 6,104,295 | A | 8/2000 | Gaisser et al. |
| 6,110,153 | A | 8/2000 | Davis |
| 6,112,182 | A | 8/2000 | Akers et al. |
| 6,112,323 | A | 8/2000 | Meizlik et al. |
| RE36,871 | E | 9/2000 | Epstein et al. |

(56) References Cited

U.S. PATENT DOCUMENTS

| | | | |
|---|---|---|---|
| 6,115,390 | A | 9/2000 | Chuah |
| 6,122,536 | A | 9/2000 | Sun et al. |
| 6,123,685 | A | 9/2000 | Reynolds |
| 6,126,637 | A | 10/2000 | Kriesel et al. |
| 6,132,404 | A | 10/2000 | Lopez |
| 6,135,949 | A | 10/2000 | Russo et al. |
| 6,150,942 | A | 11/2000 | O'Brien |
| 6,151,643 | A | 11/2000 | Cheng et al. |
| 6,152,900 | A | 11/2000 | Mayer |
| 6,157,914 | A | 12/2000 | Seto et al. |
| 6,159,147 | A | 12/2000 | Lichter et al. |
| 6,167,567 | A | 12/2000 | Chiles et al. |
| 6,171,484 | B1 | 1/2001 | Schnell et al. |
| 6,179,823 | B1 | 1/2001 | Niedospial, Jr. |
| 6,182,667 | B1 | 2/2001 | Hanks et al. |
| 6,189,105 | B1 | 2/2001 | Lopes |
| 6,193,675 | B1 | 2/2001 | Kraus et al. |
| 6,193,689 | B1 | 2/2001 | Woodard |
| 6,195,589 | B1 | 2/2001 | Ketcham |
| 6,202,708 | B1 | 3/2001 | Bynum |
| 6,208,974 | B1 | 3/2001 | Campbell et al. |
| 6,221,041 | B1 | 4/2001 | Russo |
| 6,222,323 | B1 | 4/2001 | Yamashita et al. |
| 6,223,440 | B1 | 5/2001 | Rashman |
| 6,226,277 | B1 | 5/2001 | Chuah |
| 6,227,371 | B1 | 5/2001 | Song |
| 6,234,176 | B1 | 5/2001 | Domae et al. |
| 6,241,704 | B1 | 6/2001 | Peterson et al. |
| 6,245,048 | B1 | 6/2001 | Fangrow, Jr. et al. |
| 6,248,067 | B1 | 6/2001 | Causey, III et al. |
| 6,249,705 | B1 | 6/2001 | Snell |
| 6,257,265 | B1 | 7/2001 | Brunner et al. |
| 6,259,355 | B1 | 7/2001 | Chaco et al. |
| 6,269,340 | B1 | 7/2001 | Ford et al. |
| 6,270,455 | B1 | 8/2001 | Brown |
| 6,271,813 | B1 | 8/2001 | Palalau |
| 6,277,072 | B1 | 8/2001 | Bardy |
| 6,280,380 | B1 | 8/2001 | Bardy |
| 6,283,761 | B1 | 9/2001 | Joao |
| 6,285,665 | B1 | 9/2001 | Chuah |
| 6,287,289 | B1 | 9/2001 | Niedospial, Jr. |
| 6,292,860 | B1 | 9/2001 | Cochcroft, Jr. |
| 6,302,864 | B1 | 10/2001 | Nowosielski |
| 6,312,378 | B1 | 11/2001 | Bardy |
| 6,327,254 | B1 | 12/2001 | Chuah |
| 6,330,008 | B1 | 12/2001 | Razdow et al. |
| 6,339,718 | B1 | 1/2002 | Zatezalo et al. |
| 6,346,886 | B1 | 2/2002 | de la Huerga |
| 6,363,282 | B1 | 3/2002 | Nichols et al. |
| 6,371,719 | B1 | 4/2002 | Hildebrandt |
| 6,377,548 | B1 | 4/2002 | Chuah |
| 6,388,951 | B1 | 5/2002 | Matsumoto et al. |
| 6,406,426 | B1 | 6/2002 | Reuss et al. |
| 6,408,330 | B1 | 6/2002 | de la Huerga |
| 6,418,334 | B1 | 7/2002 | Unger et al. |
| 6,425,497 | B1 | 7/2002 | Chu et al. |
| 6,427,088 | B1 | 7/2002 | Bowman et al. |
| 6,428,483 | B1 | 8/2002 | Carlebach |
| 6,442,432 | B2 | 8/2002 | Lee |
| 6,469,991 | B1 | 10/2002 | Chuah |
| 6,474,375 | B2 | 11/2002 | Spero et al. |
| 6,475,180 | B2 | 11/2002 | Peterson et al. |
| 6,482,158 | B2 | 11/2002 | Mault |
| 6,485,418 | B2 | 11/2002 | Yasushi et al. |
| 6,485,472 | B1 | 11/2002 | Richmond |
| 6,494,694 | B2 | 12/2002 | Lawless et al. |
| 6,494,831 | B1 | 12/2002 | Koritzinsky |
| 6,497,680 | B1 | 12/2002 | Holst et al. |
| 6,514,460 | B1 | 2/2003 | Fendrock |
| 6,517,482 | B1 | 2/2003 | Eiden et al. |
| 6,519,569 | B1 | 2/2003 | White et al. |
| 6,520,930 | B2 | 2/2003 | Critchlow et al. |
| 6,540,672 | B1 | 4/2003 | Simonsen et al. |
| 6,542,902 | B2 | 4/2003 | Dulong et al. |
| 6,544,212 | B2 | 4/2003 | Galley et al. |
| 6,544,228 | B1 | 4/2003 | Heitmeier |
| 6,546,350 | B1 | 4/2003 | Hartmann et al. |
| 6,551,276 | B1 | 4/2003 | Mann et al. |
| 6,554,798 | B1 | 4/2003 | Mann et al. |
| 6,558,320 | B1 | 5/2003 | Causey et al. |
| 6,558,351 | B1 | 5/2003 | Steil et al. |
| 6,558,365 | B2 | 5/2003 | Zinger et al. |
| 6,565,509 | B1 | 5/2003 | Say et al. |
| 6,567,416 | B1 | 5/2003 | Chuah |
| 6,571,294 | B2 | 5/2003 | Simmon et al. |
| 6,572,256 | B2 | 6/2003 | Seaton et al. |
| 6,572,542 | B1 | 6/2003 | Houben et al. |
| 6,572,545 | B2 | 6/2003 | Knobbe et al. |
| 6,578,002 | B1 | 6/2003 | Derzay et al. |
| 6,581,117 | B1 | 6/2003 | Klein et al. |
| 6,585,229 | B2 | 7/2003 | Cote, Sr. et al. |
| 6,587,034 | B1 | 7/2003 | Heiman et al. |
| 6,589,229 | B1 | 7/2003 | Connelly et al. |
| 6,590,167 | B2 | 7/2003 | Clare |
| 6,599,273 | B1 | 7/2003 | Lopez |
| 6,599,281 | B1 | 7/2003 | Struys et al. |
| 6,602,191 | B2 | 8/2003 | Quy |
| 6,605,072 | B2 | 8/2003 | Struys et al. |
| 6,623,455 | B2 | 9/2003 | Small et al. |
| 6,628,809 | B1 | 9/2003 | Rowe et al. |
| 6,629,956 | B1 | 10/2003 | Polidoro et al. |
| 6,631,353 | B1 | 10/2003 | Davis et al. |
| 6,640,246 | B1 | 10/2003 | Gardy, Jr. et al. |
| 6,641,533 | B2 | 11/2003 | Causey, III et al. |
| 6,647,299 | B2 | 11/2003 | Bourget |
| 6,651,956 | B2 | 11/2003 | Miller |
| 6,652,455 | B1 | 11/2003 | Kocher |
| 6,653,937 | B2 | 11/2003 | Nelson et al. |
| 6,659,947 | B1 | 12/2003 | Carter et al. |
| 6,663,586 | B2 | 12/2003 | Verkaart et al. |
| 6,669,630 | B1 | 12/2003 | Joliat et al. |
| 6,671,563 | B1 | 12/2003 | Engleson et al. |
| 6,673,033 | B1 | 1/2004 | Sciulli et al. |
| 6,674,403 | B2 | 1/2004 | Gray et al. |
| 6,681,003 | B2 | 1/2004 | Linder et al. |
| 6,689,091 | B2 | 2/2004 | Bui et al. |
| 6,689,108 | B2 | 2/2004 | Lavi et al. |
| 6,692,241 | B2 | 2/2004 | Watanabe et al. |
| 6,694,191 | B2 | 2/2004 | Starkweather et al. |
| 6,694,334 | B2 | 2/2004 | DuLong et al. |
| 6,699,230 | B2 | 3/2004 | Jaafar et al. |
| 6,711,460 | B1 | 3/2004 | Reese |
| 6,721,286 | B1 | 4/2004 | Williams et al. |
| 6,721,582 | B2 | 4/2004 | Trepagnier et al. |
| 6,725,200 | B1 | 4/2004 | Rost |
| 6,726,672 | B1 | 4/2004 | Hanly et al. |
| 6,731,989 | B2 | 5/2004 | Engleson et al. |
| 6,740,072 | B2 | 5/2004 | Starkweather et al. |
| 6,751,651 | B2 | 6/2004 | Crockett |
| 6,752,787 | B1 | 6/2004 | Causey et al. |
| 6,753,830 | B2 | 6/2004 | Gelbman |
| 6,758,810 | B2 | 7/2004 | Lebel et al. |
| 6,773,396 | B2 | 8/2004 | Flach et al. |
| 6,774,786 | B1 | 8/2004 | Havekost et al. |
| 6,775,577 | B2 | 8/2004 | Cmkovich et al. |
| 6,780,156 | B2 | 8/2004 | Haueter et al. |
| 6,790,198 | B1 | 9/2004 | White et al. |
| 6,792,470 | B2 | 9/2004 | Hakenberg et al. |
| 6,793,651 | B1 | 9/2004 | Bennett et al. |
| 6,796,956 | B2 | 9/2004 | Hartlaub et al. |
| 6,799,149 | B2 | 9/2004 | Hartlaub |
| 6,809,653 | B1 | 10/2004 | Mann et al. |
| 6,811,534 | B2 | 11/2004 | Bowman, IV et al. |
| 6,813,868 | B2 | 11/2004 | Baldwin et al. |
| 6,816,605 | B2 | 11/2004 | Rowe et al. |
| 6,839,753 | B2 | 1/2005 | Biondi et al. |
| 6,852,104 | B2 | 2/2005 | Blomquist |
| 6,854,620 | B2 | 2/2005 | Ramet |
| 6,859,134 | B1 | 2/2005 | Heiman et al. |
| 6,871,211 | B2 | 3/2005 | Labounty et al. |
| 6,873,268 | B2 | 3/2005 | Lebel et al. |
| 6,876,303 | B2 | 4/2005 | Reeder et al. |
| 6,885,881 | B2 | 4/2005 | Leonhardt |
| 6,891,525 | B2 | 5/2005 | Ogoro |

(56) References Cited

U.S. PATENT DOCUMENTS

| | | | |
|---|---|---|---|
| 6,892,278 | B2 | 5/2005 | Ebergen |
| 6,899,695 | B2 | 5/2005 | Herrera |
| 6,908,459 | B2 | 6/2005 | Harding et al. |
| 6,915,170 | B2 | 7/2005 | Engleson et al. |
| 6,915,823 | B2 | 7/2005 | Osborne et al. |
| 6,923,763 | B1 | 8/2005 | Kovatchev et al. |
| 6,924,781 | B1 | 8/2005 | Gelbman |
| 6,928,338 | B1 | 8/2005 | Buchser et al. |
| 6,928,490 | B1 | 8/2005 | Bucholz et al. |
| 6,936,029 | B2 | 8/2005 | Mann et al. |
| 6,945,954 | B2 | 9/2005 | Hochman et al. |
| 6,948,492 | B2 | 9/2005 | Wemeling et al. |
| 6,948,522 | B2 | 9/2005 | Newbrough et al. |
| 6,953,450 | B2 | 10/2005 | Baldwin et al. |
| 6,958,677 | B1 | 10/2005 | Carter |
| 6,958,691 | B1 | 10/2005 | Anderson et al. |
| 6,958,705 | B2 | 10/2005 | Lebel et al. |
| 6,961,448 | B2 | 11/2005 | Nichols et al. |
| 6,969,352 | B2 | 11/2005 | Chiang et al. |
| 6,969,865 | B2 | 11/2005 | Duchon et al. |
| 6,974,437 | B2 | 12/2005 | Lebel et al. |
| 6,979,326 | B2 | 12/2005 | Mann et al. |
| 6,980,958 | B1 | 12/2005 | Surwit et al. |
| 6,985,870 | B2 | 1/2006 | Martucci et al. |
| 6,986,347 | B2 | 1/2006 | Hickle |
| 6,991,002 | B2 | 1/2006 | Osborne et al. |
| 6,994,315 | B2 | 2/2006 | Ryan et al. |
| 6,997,880 | B2 | 2/2006 | Carlebach et al. |
| 6,997,917 | B2 | 2/2006 | Niedospial, Jr. et al. |
| 6,997,920 | B2 | 2/2006 | Mann et al. |
| 6,998,984 | B1 | 2/2006 | Zittrain |
| 7,006,894 | B2 | 2/2006 | De La Huerga |
| 7,016,752 | B1 | 3/2006 | Ruben et al. |
| 7,017,293 | B2 | 3/2006 | Riley |
| 7,017,623 | B2 | 3/2006 | Tribble et al. |
| 7,025,743 | B2 | 4/2006 | Mann et al. |
| 7,029,455 | B2 | 4/2006 | Flaherty |
| 7,038,584 | B2 | 5/2006 | Carter |
| 7,060,031 | B2 | 6/2006 | Webb et al. |
| 7,060,059 | B2 | 6/2006 | Keith et al. |
| 7,069,552 | B2 | 6/2006 | Lindberg et al. |
| 7,072,725 | B2 | 7/2006 | Bristol et al. |
| 7,079,035 | B2 | 7/2006 | Bock et al. |
| 7,086,431 | B2 | 8/2006 | D'Antonio et al. |
| 7,092,943 | B2 | 8/2006 | Roese et al. |
| 7,096,072 | B2 | 8/2006 | Engleson et al. |
| 7,099,809 | B2 | 8/2006 | Dori |
| 7,103,419 | B2 | 9/2006 | Engleson et al. |
| 7,103,578 | B2 | 9/2006 | Beck et al. |
| 7,107,106 | B2 | 9/2006 | Engleson et al. |
| 7,108,024 | B2 | 9/2006 | Navarro |
| 7,108,680 | B2 | 9/2006 | Rohr et al. |
| 7,109,878 | B2 | 9/2006 | Mann et al. |
| 7,114,002 | B1 | 9/2006 | Okumura et al. |
| 7,117,041 | B2 | 10/2006 | Engleson et al. |
| 7,117,901 | B2 | 10/2006 | Martinell Gisper-Sauch et al. |
| 7,117,902 | B2 | 10/2006 | Osborne |
| 7,128,105 | B2 | 10/2006 | Tribble et al. |
| 7,136,645 | B2 | 11/2006 | Hanson et al. |
| 7,137,964 | B2 | 11/2006 | Flaherty |
| 7,142,190 | B2 | 11/2006 | Martinez |
| 7,150,741 | B2 | 12/2006 | Erickson et al. |
| 7,153,289 | B2 | 12/2006 | Vasko |
| 7,154,397 | B2 | 12/2006 | Zerhusen et al. |
| 7,156,807 | B2 | 1/2007 | Carter et al. |
| 7,158,030 | B2 | 1/2007 | Chung |
| 7,161,484 | B2 | 1/2007 | Tsoukalis et al. |
| 7,163,031 | B2 | 1/2007 | Graves et al. |
| 7,163,035 | B2 | 1/2007 | Khan et al. |
| 7,167,755 | B2 | 1/2007 | Seeberger et al. |
| 7,167,920 | B2 | 1/2007 | Traversat |
| 7,171,277 | B2 | 1/2007 | Engleson et al. |
| 7,171,492 | B1 | 1/2007 | Borella et al. |
| 7,175,615 | B2 | 2/2007 | Hanly et al. |
| 7,181,493 | B2 | 2/2007 | English et al. |
| 7,185,288 | B2 | 2/2007 | McKeever |
| 7,193,514 | B2 | 3/2007 | Ritson |
| 7,194,336 | B2 | 3/2007 | DiGianfilippo et al. |
| 7,197,025 | B2 | 3/2007 | Chuah |
| 7,201,734 | B2 | 4/2007 | Hickle |
| 7,204,823 | B2 | 4/2007 | Estes et al. |
| 7,213,009 | B2 | 5/2007 | Pestotnik |
| 7,216,802 | B1 | 5/2007 | de la Huerga |
| 7,220,240 | B2 | 5/2007 | Struys et al. |
| 7,224,979 | B2 | 5/2007 | Singhal et al. |
| 7,229,430 | B2 | 6/2007 | Hickle et al. |
| 7,230,529 | B2 | 6/2007 | Ketcherside |
| 7,236,936 | B2 | 6/2007 | White et al. |
| 7,238,164 | B2 | 7/2007 | Childers et al. |
| 7,247,154 | B2 | 7/2007 | Hickle |
| 7,248,239 | B2 | 7/2007 | Dowling |
| 7,250,856 | B2 | 7/2007 | Havekost et al. |
| 7,255,683 | B2 | 8/2007 | Vanderveen et al. |
| 7,256,888 | B2 | 8/2007 | Staehr et al. |
| 7,258,534 | B2 | 8/2007 | Fathallah et al. |
| 7,260,447 | B2 | 8/2007 | Osborne |
| 7,263,213 | B2 | 8/2007 | Rowe |
| 7,267,664 | B2 | 9/2007 | Rizzo |
| 7,267,665 | B2 | 9/2007 | Steil et al. |
| 7,275,156 | B2 | 9/2007 | Balfanz et al. |
| 7,278,983 | B2 | 10/2007 | Ireland et al. |
| 7,289,815 | B2 | 10/2007 | Gfeller et al. |
| 7,289,948 | B1 | 10/2007 | Mohri |
| 7,293,107 | B1 | 11/2007 | Hanson et al. |
| 7,295,119 | B2 | 11/2007 | Rappaport et al. |
| 7,295,556 | B2 | 11/2007 | Roese et al. |
| 7,301,451 | B2 | 11/2007 | Hastings |
| 7,308,300 | B2 | 12/2007 | Toews et al. |
| 7,315,825 | B2 | 1/2008 | Rosenfeld et al. |
| 7,317,967 | B2 | 1/2008 | DiGianfilippo et al. |
| 7,319,386 | B2 | 1/2008 | Collins, Jr. et al. |
| 7,324,000 | B2 | 1/2008 | Zittrain et al. |
| 7,327,705 | B2 | 2/2008 | Fletcher et al. |
| 7,343,224 | B2 | 3/2008 | DiGianfilippo et al. |
| 7,343,943 | B2 | 3/2008 | Khan et al. |
| 7,346,025 | B2 | 3/2008 | Bryson |
| 7,347,836 | B2 | 3/2008 | Peterson et al. |
| 7,351,226 | B1 | 4/2008 | Herskowitz |
| 7,354,420 | B2 | 4/2008 | Steil et al. |
| 7,354,426 | B2 | 4/2008 | Young |
| 7,369,897 | B2 | 5/2008 | Boveja et al. |
| 7,369,948 | B1 | 5/2008 | Ferenczi et al. |
| 7,383,088 | B2 | 6/2008 | Spinelli et al. |
| 7,384,410 | B2 | 6/2008 | Eggers et al. |
| 7,392,638 | B2 | 7/2008 | Baldwin et al. |
| 7,396,051 | B2 | 7/2008 | Baldwin et al. |
| 7,398,183 | B2 | 7/2008 | Holland et al. |
| 7,398,279 | B2 | 7/2008 | Muno, Jr. et al. |
| 7,398,802 | B2 | 7/2008 | Baker |
| 7,399,277 | B2 | 7/2008 | Saidara et al. |
| 7,402,153 | B2 | 7/2008 | Steil et al. |
| 7,418,981 | B2 | 9/2008 | Baker et al. |
| 7,420,472 | B2 | 9/2008 | Tran |
| 7,432,807 | B2 | 10/2008 | Schmitt |
| 7,436,454 | B2 | 10/2008 | Yamaguchi et al. |
| 7,442,186 | B2 | 10/2008 | Blomquist |
| 7,447,643 | B1 | 11/2008 | Olson |
| 7,454,314 | B2 | 11/2008 | Holland et al. |
| 7,457,804 | B2 | 11/2008 | Uber, III et al. |
| 7,464,040 | B2 | 12/2008 | Joao |
| 7,469,213 | B1 | 12/2008 | Rao |
| 7,471,994 | B2 | 12/2008 | Ford et al. |
| 7,483,756 | B2 | 1/2009 | Engleson et al. |
| 7,488,311 | B2 | 2/2009 | Domkowski et al. |
| 7,489,808 | B2 | 2/2009 | Gerder |
| 7,490,021 | B2 | 2/2009 | Holland et al. |
| 7,490,048 | B2 | 2/2009 | Joao |
| 7,491,187 | B2 | 2/2009 | Van Den Berghe et al. |
| 7,499,581 | B2 | 3/2009 | Tribble et al. |
| 7,519,905 | B2 | 4/2009 | Kougiouris et al. |
| 7,523,401 | B1 | 4/2009 | Aldridge |
| 7,524,304 | B2 | 4/2009 | Genosar |
| 7,527,619 | B2 | 5/2009 | Domkowski et al. |
| 7,530,211 | B2 | 5/2009 | McErlean et al. |

(56) References Cited

U.S. PATENT DOCUMENTS

| | | | |
|---|---|---|---|
| 7,530,974 | B2 | 5/2009 | Domkowski et al. |
| 7,538,858 | B2 | 5/2009 | Mackey |
| D594,120 | S | 6/2009 | Berberich et al. |
| 7,551,078 | B2 | 6/2009 | Carlson |
| D596,291 | S | 7/2009 | Berberich et al. |
| 7,559,321 | B2 | 7/2009 | Wermeling et al. |
| 7,565,197 | B2 | 7/2009 | Haulbrich et al. |
| 7,566,326 | B2 | 7/2009 | Duchon et al. |
| 7,572,230 | B2 | 8/2009 | Neumann et al. |
| 7,578,802 | B2 | 8/2009 | Hickle |
| 7,610,115 | B2 | 10/2009 | Rob et al. |
| 7,621,009 | B2 | 11/2009 | Elhabashy |
| D606,533 | S | 12/2009 | De Jong et al. |
| 7,630,788 | B1 | 12/2009 | Reese |
| 7,630,789 | B2 | 12/2009 | Broadfield et al. |
| 7,632,261 | B2 | 12/2009 | Zinger et al. |
| 7,636,718 | B1 | 12/2009 | Steen et al. |
| 7,640,172 | B2 | 12/2009 | Kuth |
| 7,645,258 | B2 | 1/2010 | White et al. |
| 7,647,237 | B2 | 1/2010 | Malave et al. |
| 7,654,976 | B2 | 2/2010 | Peterson et al. |
| 7,662,124 | B2 | 2/2010 | Duchon et al. |
| 7,668,731 | B2 | 2/2010 | Martucci et al. |
| 7,671,733 | B2 | 3/2010 | McNeal et al. |
| 7,678,071 | B2 | 3/2010 | Lebel et al. |
| 7,681,606 | B2 | 3/2010 | Khan et al. |
| 7,685,026 | B1 | 3/2010 | McGrady et al. |
| 7,687,678 | B2 | 3/2010 | Jacobs |
| 7,697,994 | B2 | 4/2010 | VanDanacker et al. |
| 7,698,239 | B2 | 4/2010 | Lieuallen |
| 7,705,727 | B2 | 4/2010 | Pestotnik |
| D616,092 | S | 5/2010 | Domkowski et al. |
| 7,717,897 | B2 | 5/2010 | Burg et al. |
| 7,724,147 | B2 | 5/2010 | Brown et al. |
| 7,739,126 | B1 | 6/2010 | Cave |
| 7,746,218 | B2 | 6/2010 | Collins, Jr. |
| D620,108 | S | 7/2010 | Eitenmueller et al. |
| 7,753,085 | B2 | 7/2010 | Tribble et al. |
| 7,758,560 | B2 | 7/2010 | Connell et al. |
| 7,766,873 | B2 | 8/2010 | Moberg et al. |
| 7,776,029 | B2 | 8/2010 | Whitehurst et al. |
| 7,776,031 | B2 | 8/2010 | Hartlaub et al. |
| 7,785,313 | B2 | 8/2010 | Mastrototaro |
| 7,788,369 | B2 | 8/2010 | McAllen et al. |
| 7,789,850 | B2 | 9/2010 | Roger |
| 7,806,852 | B1 | 10/2010 | Jurson |
| 7,806,886 | B2 | 10/2010 | Kanderian, Jr. et al. |
| 7,814,731 | B2 | 10/2010 | Bender et al. |
| 7,826,981 | B2 | 11/2010 | Goode, Jr. et al. |
| 7,835,927 | B2 | 11/2010 | Schlotterbeck et al. |
| 7,836,314 | B2 | 11/2010 | Chieu |
| 7,850,051 | B2 | 12/2010 | Py et al. |
| 7,856,276 | B2 | 12/2010 | Ripart et al. |
| 7,860,583 | B2 | 12/2010 | Condurso et al. |
| 7,864,771 | B2 | 1/2011 | Tavares et al. |
| 7,867,215 | B2 | 1/2011 | Akerlund et al. |
| 7,868,754 | B2 | 1/2011 | Salvat, Jr. |
| 7,871,394 | B2 | 1/2011 | Halbert et al. |
| 7,882,863 | B2 | 2/2011 | Pestotnik et al. |
| 7,886,231 | B2 | 2/2011 | Hopermann et al. |
| 7,895,053 | B2 | 2/2011 | Holland et al. |
| 7,896,842 | B2 | 3/2011 | Palmroos et al. |
| 7,899,546 | B2 | 3/2011 | Sieracki et al. |
| 7,900,658 | B2 | 3/2011 | Osborne et al. |
| 7,905,710 | B2 | 3/2011 | Wang et al. |
| 7,913,720 | B2 | 3/2011 | Tribble et al. |
| 7,920,061 | B2 | 4/2011 | Klein et al. |
| 7,933,780 | B2 | 4/2011 | De La Huerga |
| 7,938,796 | B2 | 5/2011 | Moubayed |
| 7,945,452 | B2 | 5/2011 | Fathallah et al. |
| 7,963,201 | B2 | 6/2011 | Willoughby et al. |
| 7,963,954 | B2 | 6/2011 | Kavazov |
| 7,967,202 | B2 | 6/2011 | Durrell et al. |
| 7,974,714 | B2 | 7/2011 | Hoffberg |
| 7,976,508 | B2 | 7/2011 | Hoag |
| 7,981,381 | B2 | 7/2011 | Lurvey et al. |
| 7,996,241 | B2 | 8/2011 | Zak |
| 8,034,026 | B2 | 10/2011 | Grant |
| 8,034,041 | B2 | 10/2011 | Domkowski et al. |
| 8,037,659 | B2 | 10/2011 | Osborne et al. |
| 8,038,593 | B2 | 10/2011 | Friedman et al. |
| 8,048,040 | B2 | 11/2011 | Kiani |
| 8,060,576 | B2 | 11/2011 | Chan et al. |
| 8,065,161 | B2 | 11/2011 | Howard et al. |
| 8,066,672 | B2 | 11/2011 | Mandro |
| 8,075,514 | B2 | 12/2011 | Butterfield et al. |
| 8,075,545 | B2 | 12/2011 | Moy et al. |
| 8,078,983 | B2 | 12/2011 | Davis et al. |
| 8,082,018 | B2 | 12/2011 | Duchon et al. |
| 8,082,312 | B2 | 12/2011 | Chan et al. |
| 8,091,727 | B2 | 1/2012 | Domkowski |
| 8,091,860 | B2 | 1/2012 | Thompson et al. |
| 8,095,692 | B2 | 1/2012 | Mehta et al. |
| 8,104,644 | B2 | 1/2012 | Py et al. |
| 8,117,809 | B2 | 2/2012 | McErlean et al. |
| 8,126,730 | B2 | 2/2012 | Dicks et al. |
| 8,140,351 | B2 | 3/2012 | Tribble et al. |
| 8,141,601 | B2 | 3/2012 | Fehr et al. |
| 8,147,448 | B2 | 4/2012 | Sundar et al. |
| 8,149,131 | B2 | 4/2012 | Blomquist |
| 8,151,835 | B2 | 4/2012 | Khan et al. |
| 8,162,903 | B2 | 4/2012 | Reilly et al. |
| 8,162,914 | B2 | 4/2012 | Kraushaar et al. |
| 8,162,915 | B2 | 4/2012 | Brandenburger et al. |
| D660,423 | S | 5/2012 | Hermle |
| 8,169,914 | B2 | 5/2012 | Bajpai |
| 8,171,094 | B2 | 5/2012 | Chan et al. |
| 8,172,798 | B2 | 5/2012 | Hungerford et al. |
| 8,172,823 | B2 | 5/2012 | Rondeau et al. |
| 8,182,744 | B2 | 5/2012 | Mlodzinski et al. |
| 8,185,322 | B2 | 5/2012 | Schroeder et al. |
| 8,195,478 | B2 | 6/2012 | Petersen et al. |
| 8,197,459 | B2 | 6/2012 | Jansen et al. |
| 8,206,350 | B2 | 6/2012 | Mann et al. |
| 8,206,367 | B2 | 6/2012 | Warren et al. |
| D664,647 | S | 7/2012 | Becker |
| D664,648 | S | 7/2012 | Becker |
| D664,649 | S | 7/2012 | Becker |
| 8,209,941 | B2 | 7/2012 | Osborne et al. |
| 8,216,207 | B2 | 7/2012 | Moy et al. |
| 8,219,413 | B2 | 7/2012 | Martinez et al. |
| 8,220,503 | B2 | 7/2012 | Tribble et al. |
| 8,220,504 | B2 | 7/2012 | Hartman et al. |
| 8,221,382 | B2 | 7/2012 | Moy et al. |
| 8,225,824 | B2 | 7/2012 | Eliuk et al. |
| 8,225,826 | B2 | 7/2012 | Horppu et al. |
| 8,231,567 | B2 | 7/2012 | Tennican et al. |
| 8,231,578 | B2 | 7/2012 | Fathallah et al. |
| 8,231,749 | B2 | 7/2012 | Dent et al. |
| 8,234,128 | B2 | 7/2012 | Martucci et al. |
| 8,241,265 | B2 | 8/2012 | Moy et al. |
| D667,946 | S | 9/2012 | Levesque et al. |
| 8,267,129 | B2 | 9/2012 | Doherty et al. |
| 8,267,892 | B2 | 9/2012 | Spencer et al. |
| 8,267,912 | B2 | 9/2012 | Ferris |
| 8,271,106 | B2 | 9/2012 | Wehba et al. |
| 8,287,495 | B2 | 10/2012 | Michaud et al. |
| 8,287,513 | B2 | 10/2012 | Ellstrom et al. |
| 8,291,337 | B2 | 10/2012 | Gannin et al. |
| 8,298,184 | B2 | 10/2012 | DiPerna et al. |
| 8,312,272 | B1 | 11/2012 | Serenyl et al. |
| 8,328,082 | B1 | 12/2012 | Bochenko et al. |
| 8,336,587 | B2 | 12/2012 | Rosenquist et al. |
| 8,352,290 | B2 | 1/2013 | Bartz et al. |
| 8,356,644 | B2 | 1/2013 | Chong et al. |
| 8,356,645 | B2 | 1/2013 | Chong et al. |
| 8,357,137 | B2 | 1/2013 | Yandell |
| 8,359,338 | B2 | 1/2013 | Butterfield et al. |
| 8,374,887 | B1 | 2/2013 | Alexander |
| 8,380,536 | B2 | 2/2013 | Howard et al. |
| 8,381,776 | B2 | 2/2013 | Horppu |
| 8,382,696 | B2 | 2/2013 | Beiriger et al. |
| 8,386,070 | B2 | 2/2013 | Eliuk et al. |
| 8,387,112 | B1 | 2/2013 | Ranjan et al. |

(56) References Cited

U.S. PATENT DOCUMENTS

| | | | |
|---|---|---|---|
| 8,394,077 | B2 | 3/2013 | Jacobson et al. |
| 8,398,592 | B2 | 3/2013 | Leibner-Druska |
| 8,403,905 | B2 | 3/2013 | Yow |
| 8,403,908 | B2 | 3/2013 | Jacobson et al. |
| 8,409,165 | B2 | 4/2013 | Niedospial, Jr. et al. |
| 8,414,554 | B2 | 4/2013 | Garfield et al. |
| 8,414,556 | B2 | 4/2013 | Garfield et al. |
| 8,425,487 | B2 | 4/2013 | Beiriger et al. |
| 8,430,859 | B2 | 4/2013 | McConnell |
| 8,435,206 | B2 | 5/2013 | Evans et al. |
| 8,449,521 | B2 | 5/2013 | Thorne, Jr. et al. |
| 8,449,523 | B2 | 5/2013 | Brukalo et al. |
| 8,452,953 | B2 | 5/2013 | Buck et al. |
| 8,453,645 | B2 | 6/2013 | Figueiredo et al. |
| 8,472,630 | B2 | 6/2013 | Konrad et al. |
| 8,480,648 | B2 | 7/2013 | Burnett et al. |
| 8,489,427 | B2 | 7/2013 | Simpson et al. |
| 8,494,879 | B2 | 7/2013 | Davis et al. |
| D687,948 | S | 8/2013 | Levesque et al. |
| 8,504,179 | B2 | 8/2013 | Blomquist |
| 8,506,548 | B2 | 8/2013 | Okiyama |
| 8,517,990 | B2 | 8/2013 | Teel et al. |
| 8,518,021 | B2 | 8/2013 | Stewart et al. |
| 8,522,832 | B2 | 9/2013 | Lopez et al. |
| 8,543,416 | B2 | 9/2013 | Palmroos et al. |
| 8,551,037 | B2 | 10/2013 | Suchecki et al. |
| 8,551,038 | B2 | 10/2013 | Tsoukalis et al. |
| 8,560,345 | B2 | 10/2013 | Wehba et al. |
| 8,562,583 | B2 | 10/2013 | Akerlund et al. |
| 8,567,235 | B2 | 10/2013 | Bojan et al. |
| 8,567,681 | B2 | 10/2013 | Borges et al. |
| 8,571,708 | B2 | 10/2013 | Rob et al. |
| 8,562,584 | B2 | 11/2013 | Beiriger et al. |
| 8,577,692 | B2 | 11/2013 | Silkaitis et al. |
| 8,579,884 | B2 | 11/2013 | Lanier et al. |
| 8,602,067 | B2 | 12/2013 | Kuhni et al. |
| 8,608,723 | B2 | 12/2013 | Lev et al. |
| 8,622,985 | B2 | 1/2014 | Ellstrom |
| 8,626,530 | B1 | 1/2014 | Tran et al. |
| 8,636,720 | B2 | 1/2014 | Truitt et al. |
| 8,639,525 | B2 | 1/2014 | Levine et al. |
| 8,655,676 | B2 | 2/2014 | Wehba et al. |
| 8,660,860 | B2 | 2/2014 | Wehba et al. |
| 8,662,388 | B2 | 3/2014 | Belkin |
| 8,666,769 | B2 | 3/2014 | Butler et al. |
| 8,667,293 | B2 | 3/2014 | Birtwhistle et al. |
| 8,679,075 | B2 | 3/2014 | Lurvey et al. |
| 8,684,994 | B2 | 4/2014 | Lev et al. |
| 8,687,811 | B2 | 4/2014 | Nierzwick et al. |
| 8,700,421 | B2 | 4/2014 | Feng et al. |
| 8,701,696 | B2 | 4/2014 | Guala |
| 8,702,675 | B2 | 4/2014 | Imai |
| 8,720,496 | B2 | 5/2014 | Huwiler et al. |
| 8,721,612 | B2 | 5/2014 | Domkowski et al. |
| 8,721,614 | B2 | 5/2014 | Takemoto et al. |
| 8,721,627 | B2 | 5/2014 | Alpert |
| 8,731,960 | B2 | 5/2014 | Butler et al. |
| D706,415 | S | 6/2014 | Levesque et al. |
| 8,753,325 | B2 | 6/2014 | Lev et al. |
| 8,763,798 | B2 | 7/2014 | Paul |
| 8,768,719 | B2 | 7/2014 | Wehba et al. |
| 8,771,251 | B2 | 7/2014 | Ruchti et al. |
| 8,777,894 | B2 | 7/2014 | Butterfield et al. |
| 8,777,895 | B2 | 7/2014 | Hsu et al. |
| 8,795,231 | B2 | 8/2014 | Chong et al. |
| 8,799,012 | B2 | 8/2014 | Butler et al. |
| 8,801,689 | B2 | 8/2014 | Moy et al. |
| 8,821,436 | B2 | 9/2014 | Mosler et al. |
| 8,834,444 | B2 | 9/2014 | Domkowski |
| 8,852,147 | B2 | 10/2014 | Callan et al. |
| 8,864,725 | B2 | 10/2014 | Ranalletta et al. |
| 8,864,737 | B2 | 10/2014 | Hasegawa et al. |
| 8,870,832 | B2 | 10/2014 | Raday et al. |
| 8,876,793 | B2 | 11/2014 | Ledford et al. |
| 8,882,739 | B2 | 11/2014 | Domkowski et al. |
| 8,886,316 | B1 | 11/2014 | Juels |
| 8,894,627 | B2 | 11/2014 | Garfield et al. |
| 8,911,421 | B2 | 12/2014 | Domkowski et al. |
| 8,922,330 | B2 | 12/2014 | Moberg et al. |
| D721,803 | S | 1/2015 | Dubach |
| 8,926,554 | B2 | 1/2015 | Okuda et al. |
| 8,936,565 | B2 | 1/2015 | Chawla |
| 8,945,043 | B2 | 2/2015 | Lee et al. |
| 8,952,794 | B2 | 2/2015 | Blomquist et al. |
| 8,958,112 | B2 | 2/2015 | Matsui et al. |
| 8,959,617 | B2 | 2/2015 | Newlin et al. |
| D724,198 | S | 3/2015 | Oostman et al. |
| 8,973,622 | B2 | 3/2015 | Lopez et al. |
| 8,979,792 | B2 | 3/2015 | Lev et al. |
| 8,998,100 | B2 | 4/2015 | Halbert et al. |
| 9,026,370 | B2 | 5/2015 | Rubalcaba et al. |
| 9,033,006 | B2 | 5/2015 | Perazzo et al. |
| 9,043,019 | B2 | 5/2015 | Eliuk et al. |
| 9,056,164 | B2 | 6/2015 | Tate et al. |
| 9,057,363 | B2 | 6/2015 | Capone |
| 9,057,370 | B2 | 6/2015 | Mundt et al. |
| 9,060,923 | B2 | 6/2015 | Hossainy |
| 9,061,130 | B2 | 6/2015 | Truitt et al. |
| 9,069,887 | B2 | 6/2015 | Gupta et al. |
| 9,076,115 | B2 | 7/2015 | Utech et al. |
| 9,077,544 | B2 | 7/2015 | Baker et al. |
| 9,079,686 | B2 | 7/2015 | Domkowski et al. |
| 9,089,474 | B2 | 7/2015 | Cederschiöld |
| 9,089,642 | B2 | 7/2015 | Murphy et al. |
| 9,089,647 | B2 | 7/2015 | Haenggi et al. |
| 9,101,717 | B2 | 8/2015 | Mansour et al. |
| 9,114,217 | B2 | 8/2015 | Sur et al. |
| 9,114,242 | B2 | 8/2015 | Fangrow, Jr. et al. |
| 9,123,077 | B2 | 9/2015 | Silkaitis et al. |
| 9,132,062 | B2 | 9/2015 | Fangrow |
| 9,132,063 | B2 | 9/2015 | Lev et al. |
| 9,139,316 | B2 | 9/2015 | Husnu et al. |
| 9,144,646 | B2 | 9/2015 | Barron, III et al. |
| 9,149,576 | B2 | 10/2015 | Bullington et al. |
| 9,192,712 | B2 | 11/2015 | DeBelser et al. |
| 9,198,832 | B2 | 12/2015 | Moy et al. |
| 9,211,231 | B2 | 12/2015 | Mansour et al. |
| 9,212,762 | B2 | 12/2015 | Duncan |
| 9,220,661 | B2 | 12/2015 | Garfield et al. |
| D747,472 | S | 1/2016 | Bradley et al. |
| 9,227,048 | B2 | 1/2016 | Frattini |
| 9,240,002 | B2 | 1/2016 | Hume et al. |
| 9,241,875 | B2 | 1/2016 | Davis et al. |
| 9,242,039 | B2 | 1/2016 | Valk et al. |
| 9,270,890 | B2 | 2/2016 | Okuma et al. |
| 9,292,692 | B2 | 3/2016 | Wallrabenstein |
| 9,302,035 | B2 | 4/2016 | Marseille et al. |
| 9,313,154 | B1 | 4/2016 | Son |
| 9,345,640 | B2 | 5/2016 | Mosler et al. |
| 9,345,643 | B2 | 5/2016 | Okiyama |
| 9,381,135 | B2 | 7/2016 | Reynolds et al. |
| 9,381,137 | B2 | 7/2016 | Garfield et al. |
| 9,381,296 | B2 | 7/2016 | Arrizza et al. |
| 9,382,021 | B2 | 7/2016 | Tribble et al. |
| 9,393,362 | B2 | 7/2016 | Cozmi et al. |
| 9,402,786 | B2 | 8/2016 | Petrone |
| 9,408,966 | B2 | 8/2016 | Kamen |
| 9,430,655 | B1 | 8/2016 | Stockton et al. |
| 9,466,088 | B2 | 10/2016 | Perazzo et al. |
| 9,474,690 | B2 | 10/2016 | Ranalletta et al. |
| 9,475,019 | B2 | 10/2016 | Kaucky et al. |
| 9,481,477 | B2 | 11/2016 | Kjar |
| 9,483,615 | B2 | 11/2016 | Roberts |
| 9,498,583 | B2 | 11/2016 | Sur et al. |
| D774,192 | S | 12/2016 | Fuchs |
| D775,325 | S | 12/2016 | Larson et al. |
| 9,511,989 | B2 | 12/2016 | Lopez et al. |
| 9,539,383 | B2 | 1/2017 | Kohlbrecher |
| 9,561,893 | B2 | 2/2017 | Root et al. |
| 9,572,923 | B2 | 2/2017 | Howard et al. |
| 9,579,255 | B2 | 2/2017 | Eliuk et al. |
| 9,594,875 | B2 | 3/2017 | Arrizza et al. |
| 9,604,000 | B2 | 3/2017 | Wehba et al. |
| 9,615,997 | B2 | 4/2017 | Fangrow |

(56) References Cited

U.S. PATENT DOCUMENTS 9,641,432 B2 5/2017 Jha et al.
9,649,431 B2 5/2017 Gray et al.
9,662,436 B2 5/2017 Belkin et al.
9,690,909 B2 6/2017 Stewart et al.
9,707,341 B2 7/2017 Dumas, III et al.
9,717,845 B2 8/2017 Istoc
9,724,470 B2 8/2017 Day et al.
9,744,102 B2 8/2017 Kubo
9,764,082 B2 9/2017 Day et al.
9,770,388 B2 9/2017 Noike et al.
9,775,778 B2 10/2017 Qiu et al.
9,801,787 B2 10/2017 Py
9,802,171 B2 10/2017 Konrad, Jr. et al.
9,802,172 B2 10/2017 Konrad, Jr. et al.
D803,396 S 11/2017 Oberkircher et al.
9,827,163 B2 11/2017 Lopez et al.
9,827,680 B2 11/2017 Davey et al.
D804,651 S 12/2017 Loonan
9,833,605 B2 12/2017 Sanders et al.
9,849,236 B2 12/2017 Hachey
9,883,987 B2 2/2018 Lopez et al.
9,886,550 B2 2/2018 Lee et al.
9,930,297 B2 3/2018 Alexander et al.
9,931,276 B2 4/2018 Lopez et al.
9,943,269 B2 4/2018 Muhsin et al.
9,967,739 B2 5/2018 Proennecke et al.
9,971,871 B2 5/2018 Arrizza et al.
D819,414 S 6/2018 Solomon
9,995,611 B2 6/2018 Ruchti et al.
10,022,498 B2 7/2018 Ruchti et al.
10,042,986 B2 8/2018 Ruchti et al.
10,046,112 B2 8/2018 Oruklu et al.
10,106,278 B2 10/2018 Chang et al.
10,143,985 B2 12/2018 Brown et al.
D837,983 S 1/2019 Fangrow
10,166,328 B2 1/2019 Oruklu et al.
10,173,008 B2 1/2019 Simpson et al.
10,181,186 B2 1/2019 Kriheli et al.
10,188,849 B2 1/2019 Fangrow
10,189,616 B2 1/2019 Kraft
10,233,179 B2 3/2019 Ng et al.
10,238,799 B2 3/2019 Kohlbrecher
10,238,801 B2 3/2019 Wehba et al.
10,242,060 B2 3/2019 Butler et al.
D846,146 S 4/2019 Amos et al.
10,259,608 B2 4/2019 Fianchini et al.
10,300,194 B2 5/2019 Day et al.
D851,745 S 6/2019 Shauver et al.
10,307,338 B2 6/2019 Hellenbrand
10,311,972 B2 6/2019 Kohlbrecher et al.
10,314,764 B2 6/2019 Lopez et al.
10,314,765 B2 6/2019 Lopez et al.
10,314,974 B2 6/2019 Day et al.
10,315,174 B2 6/2019 Konrad, Jr. et al.
10,327,987 B1 6/2019 Bochenko et al.
10,327,988 B2 6/2019 Tribble et al.
10,333,843 B2 6/2019 Jha et al.
10,336,477 B2 7/2019 Perazzo et al.
10,341,866 B1 7/2019 Spencer et al.
10,417,758 B1 9/2019 Alexander
10,420,927 B2 9/2019 Fangrow
10,430,761 B2 10/2019 Hume et al.
10,434,246 B2 10/2019 Silkaitis et al.
10,453,157 B2 10/2019 Kamen et al.
10,463,788 B2 11/2019 Day
10,494,126 B2 12/2019 Joplin
10,503,873 B2 12/2019 Prince et al.
10,512,885 B2 12/2019 Janders et al.
10,516,536 B2 12/2019 Rommel
D874,644 S 2/2020 Shauver et al.
10,554,937 B2 2/2020 Alexander et al.
10,556,062 B2 2/2020 Simpson et al.
10,576,211 B2 3/2020 Hang et al.
10,617,815 B2 4/2020 Day et al.
10,646,651 B2 5/2020 Day et al.
D887,577 S 6/2020 Shor et al.
10,681,207 B1 6/2020 Johnson et al.
10,692,595 B2 6/2020 Xavier et al.
10,740,436 B2 8/2020 Moskal et al.
10,741,280 B2 8/2020 Xavier et al.
10,757,219 B2 8/2020 Moskal
10,765,799 B2 9/2020 Belkin et al.
10,791,975 B2 10/2020 Wilkinson et al.
10,799,632 B2 10/2020 Kohlbrecher
10,812,380 B2 10/2020 Jha et al.
D905,228 S 12/2020 Shauver et al.
10,861,592 B2 12/2020 Xavier et al.
10,898,641 B2 1/2021 Day et al.
10,950,339 B2 3/2021 Xavier et al.
10,964,428 B2 3/2021 Xavier et al.
11,007,119 B2 5/2021 Lopez et al.
11,013,861 B2 5/2021 Wehba et al.
11,020,541 B2 6/2021 Fangrow et al.
11,033,459 B2 6/2021 Ariagno et al.
11,037,668 B2 6/2021 Ruchti et al.
11,052,193 B2 7/2021 Day et al.
11,139,058 B2 10/2021 Xavier et al.
11,151,290 B2 10/2021 Karakoyunlu et al.
11,152,108 B2 10/2021 Xavier et al.
11,152,109 B2 10/2021 Xavier et al.
11,152,110 B2 10/2021 Xavier et al.
11,194,810 B2 12/2021 Butler et al.
11,235,100 B2 2/2022 Howard et al.
11,289,183 B2 3/2022 Kohlbrecher
11,309,070 B2 4/2022 Xavier et al.
11,328,804 B2 5/2022 Xavier et al.
11,328,805 B2 5/2022 Xavier et al.
11,373,753 B2 6/2022 Xavier et al.
11,437,132 B2 9/2022 Xavier et al.
11,470,000 B2 10/2022 Jha et al.
11,483,402 B2 10/2022 Xavier et al.
11,483,403 B2 10/2022 Xavier et al.
11,501,877 B2 11/2022 Kohlbrecher et al.
11,571,508 B2 2/2023 Jacobson et al.
11,574,721 B2 2/2023 Kohlbrecher
11,574,737 B2 2/2023 Dharwad et al.
11,587,669 B2 2/2023 Xavier et al.
11,590,057 B2 2/2023 Tagliamento et al.
11,594,326 B2 2/2023 Xavier et al.
11,605,468 B2 3/2023 Jacobson et al.
11,626,205 B2 4/2023 Arrizza et al.
11,628,246 B2 4/2023 Day et al.
11,628,254 B2 4/2023 Day et al.
11,654,237 B2 5/2023 Wehba et al.
11,670,416 B2 6/2023 Xavier et al.
2001/0016056 A1 8/2001 Westphal et al.
2001/0029178 A1 10/2001 Criss et al.
2001/0031944 A1 10/2001 Peterson et al.
2001/0032099 A1 10/2001 Joao
2001/0037060 A1 11/2001 Thompson et al.
2001/0044731 A1 11/2001 Coffman et al.
2001/0048027 A1 12/2001 Walsh
2001/0051787 A1 12/2001 Haller et al.
2001/0056358 A1 12/2001 Dulong et al.
2002/0010595 A1 1/2002 Kapp
2002/0013551 A1 1/2002 Zaitsu et al.
2002/0013723 A1 1/2002 Mise
2002/0015018 A1 2/2002 Shimazu et al.
2002/0019584 A1 2/2002 Schulze et al.
2002/0021700 A1 2/2002 Hata et al.
2002/0026103 A1 2/2002 Norris et al.
2002/0029776 A1 3/2002 Blomquist
2002/0032583 A1 3/2002 Joao
2002/0040208 A1 4/2002 Flaherty et al.
2002/0040282 A1 4/2002 Bailey et al.
2002/0044043 A1 4/2002 Chaco et al.
2002/0044059 A1 4/2002 Reeder et al.
2002/0082728 A1 6/2002 Mueller et al.
2002/0085952 A1 7/2002 Ellingboe et al.
2002/0087115 A1 7/2002 Hartlaub
2002/0087116 A1 7/2002 Hartlaub
2002/0095486 A1 7/2002 Bahl
2002/0103675 A1 8/2002 Vanelli
2002/0123905 A1 9/2002 Goodroe et al.

(56) References Cited

U.S. PATENT DOCUMENTS

2002/0143580 A1 10/2002 Bristol et al.
2002/0152239 A1 10/2002 Bautista-Lloyd et al.
2002/0154600 A1 10/2002 Ido et al.
2002/0173702 A1 11/2002 Lebel et al.
2002/0173875 A1 11/2002 Wallace et al.
2002/0179544 A1 12/2002 Johnson et al.
2002/0193679 A1 12/2002 Malave et al.
2002/0194329 A1 12/2002 Alling
2003/0009244 A1 1/2003 Engleson
2003/0013959 A1 1/2003 Grunwald et al.
2003/0014222 A1 1/2003 Klass et al.
2003/0014817 A1 1/2003 Gallant et al.
2003/0025602 A1 2/2003 Medema et al.
2003/0028082 A1 2/2003 Thompson
2003/0036683 A1 2/2003 Kehr et al.
2003/0036744 A1 2/2003 Struys et al.
2003/0047126 A1 3/2003 Tomaschko
2003/0047600 A1 3/2003 Nakanishi et al.
2003/0050621 A1 3/2003 Lebel et al.
2003/0059750 A1 3/2003 Bindler et al.
2003/0060688 A1 3/2003 Ciarniello et al.
2003/0069963 A1 4/2003 Jayant et al.
2003/0079746 A1 5/2003 Hickle
2003/0097529 A1 5/2003 Arimilli et al.
2003/0104982 A1 6/2003 Wittmann et al.
2003/0105389 A1 6/2003 Noonan et al.
2003/0106553 A1 6/2003 Vanderveen
2003/0115358 A1 6/2003 Yun
2003/0120384 A1 6/2003 Haitin et al.
2003/0125662 A1 7/2003 Bui
2003/0130616 A1 7/2003 Steil
2003/0135087 A1 7/2003 Hickle et al.
2003/0139701 A1 7/2003 White et al.
2003/0140928 A1 7/2003 Bui et al.
2003/0140929 A1 7/2003 Wilkes et al.
2003/0141981 A1 7/2003 Bui et al.
2003/0143746 A1 7/2003 Sage, Jr.
2003/0144878 A1 7/2003 Wilkes et al.
2003/0158749 A1 8/2003 Olchanski et al.
2003/0187338 A1 10/2003 Say et al.
2003/0200116 A1 10/2003 Forrester
2003/0204416 A1 10/2003 Acharya
2003/0204781 A1 10/2003 Peebles et al.
2003/0212364 A1 11/2003 Mann et al.
2003/0212379 A1 11/2003 Bylund et al.
2003/0212821 A1 11/2003 Gillies et al.
2003/0217962 A1 11/2003 Childers et al.
2003/0236500 A1 12/2003 Scheu
2004/0008123 A1 1/2004 Carrender et al.
2004/0015132 A1 1/2004 Brown
2004/0019607 A1 1/2004 Moubayed et al.
2004/0030323 A1 2/2004 Ullestad et al.
2004/0031756 A1 2/2004 Suzuki et al.
2004/0035743 A1 2/2004 Tighe et al.
2004/0039257 A1 2/2004 Hickle
2004/0057226 A1 3/2004 Berthou et al.
2004/0064341 A1 4/2004 Langan et al.
2004/0064342 A1 4/2004 Browne et al.
2004/0064435 A1 4/2004 Moubayed et al.
2004/0073161 A1 4/2004 Tachibana
2004/0073811 A1 4/2004 Sanin
2004/0077934 A1 4/2004 Massad
2004/0078231 A1 4/2004 Wilkes et al.
2004/0078236 A1 4/2004 Stoodley et al.
2004/0085186 A1 5/2004 Eveland et al.
2004/0087888 A1 5/2004 Digianfilippo et al.
2004/0104271 A1 6/2004 Martucci et al.
2004/0116891 A1 6/2004 Curutcharry
2004/0118477 A1 6/2004 Desmond
2004/0122530 A1 6/2004 Hansen
2004/0128162 A1 7/2004 Schlotterbeck et al.
2004/0128163 A1 7/2004 Goodman et al.
2004/0133441 A1 7/2004 Brady et al.
2004/0139004 A1 7/2004 Cohen et al.
2004/0145480 A1 7/2004 Despotis
2004/0147034 A1 7/2004 Gore et al.
2004/0167464 A1 8/2004 Ireland et al.
2004/0167465 A1 8/2004 Kohler
2004/0167804 A1 8/2004 Simpson
2004/0172222 A1 9/2004 Simpson et al.
2004/0172283 A1 9/2004 Vanderveen
2004/0172301 A1 9/2004 Mihai et al.
2004/0172302 A1 9/2004 Martucci et al.
2004/0176667 A1 9/2004 Mihai et al.
2004/0176980 A1 9/2004 Bulitta et al.
2004/0176984 A1 9/2004 White et al.
2004/0181314 A1 9/2004 Zaleski
2004/0189708 A1 9/2004 Larcheveque et al.
2004/0193325 A1 9/2004 Bonderud
2004/0193328 A1 9/2004 Butterfield et al.
2004/0204673 A1 10/2004 Flaherty et al.
2004/0215278 A1 10/2004 Stegink et al.
2004/0220517 A1 11/2004 Starkweather et al.
2004/0225252 A1 11/2004 Gillespie et al.
2004/0236240 A1 11/2004 Kraus et al.
2004/0243438 A1 12/2004 Mintz
2004/0254434 A1 12/2004 Goodnow et al.
2005/0010269 A1 1/2005 Lebel et al.
2005/0020886 A1 1/2005 Hutchinson et al.
2005/0021006 A1 1/2005 Tonnies
2005/0027560 A1 2/2005 Cook
2005/0027567 A1 2/2005 Taha
2005/0038311 A1 2/2005 Kuth
2005/0038669 A1 2/2005 Sachdeva et al.
2005/0038680 A1 2/2005 McMahon
2005/0040226 A1 2/2005 Al-Sheikh
2005/0043620 A1 2/2005 Fallows et al.
2005/0049910 A1 3/2005 Lancaster et al.
2005/0055242 A1 3/2005 Bello et al.
2005/0055244 A1 3/2005 Mullan et al.
2005/0059952 A1 3/2005 Giuliano et al.
2005/0065465 A1 3/2005 Lebel et al.
2005/0065817 A1 3/2005 Mihai et al.
2005/0075544 A1 4/2005 Shapiro et al.
2005/0080801 A1 4/2005 Kothandaraman et al.
2005/0086071 A1 4/2005 Fox, Jr. et al.
2005/0086072 A1 4/2005 Fox
2005/0088704 A1 4/2005 Vaschillo et al.
2005/0090808 A1 4/2005 Malave et al.
2005/0096627 A1 5/2005 Howard
2005/0099624 A1 5/2005 Staehr
2005/0102162 A1 5/2005 Blumenfeld
2005/0102165 A1 5/2005 Oshita et al.
2005/0102167 A1 5/2005 Kapoor
2005/0102669 A1 5/2005 Marney et al.
2005/0107923 A1 5/2005 Vanderveen
2005/0108057 A1 5/2005 Cohen et al.
2005/0117529 A1 6/2005 Ramos-Escano
2005/0119788 A1 6/2005 Engleson et al.
2005/0119914 A1 6/2005 Batch
2005/0131357 A1 6/2005 Denton et al.
2005/0131739 A1 6/2005 Rabinowitz et al.
2005/0135306 A1 6/2005 McAllen et al.
2005/0137522 A1 6/2005 Aoki
2005/0137573 A1 6/2005 McLaughlin
2005/0138428 A1 6/2005 McAllen et al.
2005/0154769 A1 7/2005 Eckart et al.
2005/0160057 A1 7/2005 Wefers et al.
2005/0171503 A1 8/2005 Van Den Berghe et al.
2005/0171815 A1 8/2005 Vanderveen
2005/0177096 A1 8/2005 Bollish et al.
2005/0177395 A1 8/2005 Blomquist
2005/0182306 A1 8/2005 Sloan
2005/0182355 A1 8/2005 Bui
2005/0187950 A1 8/2005 Parker
2005/0192557 A1 9/2005 Brauker et al.
2005/0197554 A1 9/2005 Polcha
2005/0197621 A1 9/2005 Poulsen et al.
2005/0210037 A1 9/2005 Wefers et al.
2005/0216479 A1 9/2005 Wefers et al.
2005/0216480 A1 9/2005 Wefers et al.
2005/0223045 A1 10/2005 Funahashi et al.
2005/0224083 A1 10/2005 Crass
2005/0230575 A1 10/2005 Zelenski et al.

(56) References Cited

U.S. PATENT DOCUMENTS

| | | | |
|---|---|---|---|
| 2005/0234746 | A1 | 10/2005 | Funahashi |
| 2005/0240305 | A1 | 10/2005 | Bogash et al. |
| 2005/0246416 | A1 | 11/2005 | Blomquist |
| 2005/0251418 | A1 | 11/2005 | Fox, Jr. et al. |
| 2005/0252572 | A1 | 11/2005 | Khan et al. |
| 2005/0252574 | A1 | 11/2005 | Khan et al. |
| 2005/0261660 | A1 | 11/2005 | Choi |
| 2005/0273059 | A1 | 12/2005 | Mernoe et al. |
| 2005/0273367 | A1 | 12/2005 | Nourie et al. |
| 2005/0277873 | A1 | 12/2005 | Stewart et al. |
| 2005/0277890 | A1 | 12/2005 | Stewart et al. |
| 2005/0278194 | A1 | 12/2005 | Holland et al. |
| 2006/0004772 | A1 | 1/2006 | Hagan et al. |
| 2006/0009727 | A1 | 1/2006 | O'Mahony et al. |
| 2006/0009734 | A1 | 1/2006 | Martin |
| 2006/0010098 | A1 | 1/2006 | Goodnow et al. |
| 2006/0042139 | A1 | 3/2006 | Mendes |
| 2006/0047270 | A1 | 3/2006 | Shelton |
| 2006/0048844 | A1 | 3/2006 | Merrill |
| 2006/0053036 | A1 | 3/2006 | Coffman et al. |
| 2006/0064020 | A1 | 3/2006 | Burnes et al. |
| 2006/0064053 | A1 | 3/2006 | Bollish et al. |
| 2006/0074633 | A1 | 4/2006 | Mahesh et al. |
| 2006/0074920 | A1 | 4/2006 | Wefers et al. |
| 2006/0079831 | A1 | 4/2006 | Gilbert |
| 2006/0089854 | A1 | 4/2006 | Holland et al. |
| 2006/0089855 | A1 | 4/2006 | Holland et al. |
| 2006/0100746 | A1 | 5/2006 | Leibner-Druska |
| 2006/0100907 | A1 | 5/2006 | Holland et al. |
| 2006/0106649 | A1 | 5/2006 | Eggers et al. |
| 2006/0111943 | A1 | 5/2006 | Wu |
| 2006/0116904 | A1 | 6/2006 | Brem |
| 2006/0116907 | A1 | 6/2006 | Rhodes et al. |
| 2006/0122481 | A1 | 6/2006 | Sievenpiper et al. |
| 2006/0122867 | A1 | 6/2006 | Eggers et al. |
| 2006/0129140 | A1 | 6/2006 | Todd et al. |
| 2006/0129429 | A1 | 6/2006 | Moubayed et al. |
| 2006/0129434 | A1 | 6/2006 | Smitherman et al. |
| 2006/0129435 | A1 | 6/2006 | Smitherman et al. |
| 2006/0136266 | A1 | 6/2006 | Tarassenko et al. |
| 2006/0136271 | A1 | 6/2006 | Eggers et al. |
| 2006/0143051 | A1 | 6/2006 | Eggers et al. |
| 2006/0169348 | A1 | 8/2006 | Yigal |
| 2006/0173260 | A1 | 8/2006 | Gaoni et al. |
| 2006/0173406 | A1 | 8/2006 | Hayes et al. |
| 2006/0173715 | A1 | 8/2006 | Wang et al. |
| 2006/0173927 | A1 | 8/2006 | Beyer et al. |
| 2006/0190302 | A1 | 8/2006 | Eggers et al. |
| 2006/0195022 | A1 | 8/2006 | Trepagnier et al. |
| 2006/0200007 | A1 | 9/2006 | Brockway et al. |
| 2006/0200369 | A1 | 9/2006 | Batch et al. |
| 2006/0211404 | A1 | 9/2006 | Cromp et al. |
| 2006/0224141 | A1 | 10/2006 | Rush et al. |
| 2006/0229918 | A1 | 10/2006 | Fotsch et al. |
| 2006/0247606 | A1 | 11/2006 | Batch |
| 2006/0258985 | A1 | 11/2006 | Russell |
| 2006/0259195 | A1 | 11/2006 | Eliuk et al. |
| 2006/0259327 | A1 | 11/2006 | Hoag |
| 2006/0264895 | A1 | 11/2006 | Flanders |
| 2006/0267753 | A1 | 11/2006 | Hussey et al. |
| 2006/0268710 | A1 | 11/2006 | Appanna et al. |
| 2006/0270971 | A1 | 11/2006 | Gelfand et al. |
| 2006/0277206 | A1 | 12/2006 | Bailey et al. |
| 2006/0287885 | A1 | 12/2006 | Frick |
| 2007/0007478 | A1 | 1/2007 | Leinsing et al. |
| 2007/0015972 | A1 | 1/2007 | Wang et al. |
| 2007/0016443 | A1 | 1/2007 | Wachman et al. |
| 2007/0017583 | A1 | 1/2007 | Fangrow |
| 2007/0021715 | A1 | 1/2007 | Kohlbrenner et al. |
| 2007/0027506 | A1 | 2/2007 | Stender et al. |
| 2007/0060796 | A1 | 3/2007 | Kim |
| 2007/0060870 | A1 | 3/2007 | Tolle et al. |
| 2007/0060871 | A1 | 3/2007 | Istoc |
| 2007/0061393 | A1 | 3/2007 | Moore |
| 2007/0065363 | A1 | 3/2007 | Dalal et al. |
| 2007/0073419 | A1 | 3/2007 | Sesay |
| 2007/0078314 | A1 | 4/2007 | Grounsell |
| 2007/0079894 | A1 | 4/2007 | Kraus et al. |
| 2007/0083870 | A1 | 4/2007 | Kanakogi |
| 2007/0088252 | A1 | 4/2007 | Pestotnik et al. |
| 2007/0088333 | A1 | 4/2007 | Levin et al. |
| 2007/0093786 | A1 | 4/2007 | Goldsmith et al. |
| 2007/0100665 | A1 | 5/2007 | Brown |
| 2007/0100667 | A1 | 5/2007 | Bardy |
| 2007/0106126 | A1 | 5/2007 | Mannheimer et al. |
| 2007/0106244 | A1 | 5/2007 | Mosler et al. |
| 2007/0112298 | A1 | 5/2007 | Mueller et al. |
| 2007/0116037 | A1 | 5/2007 | Moore |
| 2007/0118405 | A1 | 5/2007 | Campbell et al. |
| 2007/0135866 | A1 | 6/2007 | Baker et al. |
| 2007/0136098 | A1 | 6/2007 | Smythe et al. |
| 2007/0142822 | A1 | 6/2007 | Remde |
| 2007/0151984 | A1 | 7/2007 | Baker et al. |
| 2007/0156282 | A1 | 7/2007 | Dunn |
| 2007/0156452 | A1 | 7/2007 | Batch |
| 2007/0169008 | A1 | 7/2007 | Varanasi et al. |
| 2007/0169836 | A1 | 7/2007 | Djurle et al. |
| 2007/0179448 | A1 | 8/2007 | Lim et al. |
| 2007/0186923 | A1 | 8/2007 | Poutiatine et al. |
| 2007/0191817 | A1 | 8/2007 | Martin |
| 2007/0191973 | A1 | 8/2007 | Holzbauer et al. |
| 2007/0213657 | A1 | 9/2007 | Jennewine et al. |
| 2007/0213684 | A1 | 9/2007 | Hickle et al. |
| 2007/0214003 | A1 | 9/2007 | Holland et al. |
| 2007/0215545 | A1 | 9/2007 | Bissler et al. |
| 2007/0232867 | A1 | 10/2007 | Hansmann |
| 2007/0233035 | A1 | 10/2007 | Wehba et al. |
| 2007/0233049 | A1 | 10/2007 | Wehba et al. |
| 2007/0233206 | A1 | 10/2007 | Frikart |
| 2007/0251835 | A1 | 11/2007 | Mehta et al. |
| 2007/0253021 | A1 | 11/2007 | Mehta et al. |
| 2007/0254593 | A1 | 11/2007 | Jollota et al. |
| 2007/0255125 | A1 | 11/2007 | Moberg et al. |
| 2007/0257788 | A1 | 11/2007 | Carlson |
| 2007/0258395 | A1 | 11/2007 | Jollota et al. |
| 2007/0299687 | A1 | 12/2007 | Palmer et al. |
| 2007/0299695 | A1 | 12/2007 | Jung et al. |
| 2008/0001771 | A1 | 1/2008 | Faoro et al. |
| 2008/0004904 | A1 | 1/2008 | Tran |
| 2008/0009684 | A1 | 1/2008 | Corsetti et al. |
| 2008/0033361 | A1 | 2/2008 | Evans et al. |
| 2008/0033966 | A1 | 2/2008 | Wahl |
| 2008/0034323 | A1 | 2/2008 | Blomquist |
| 2008/0041942 | A1 | 2/2008 | Aissa |
| 2008/0052704 | A1 | 2/2008 | Wysocki |
| 2008/0059228 | A1 | 3/2008 | Bossi et al. |
| 2008/0065006 | A1 | 3/2008 | Roger et al. |
| 2008/0065007 | A1 | 3/2008 | Peterson et al. |
| 2008/0065417 | A1 | 3/2008 | Jung et al. |
| 2008/0071217 | A1 | 3/2008 | Moubayed et al. |
| 2008/0071251 | A1 | 3/2008 | Moubayed et al. |
| 2008/0077116 | A1 | 3/2008 | Dailey et al. |
| 2008/0086088 | A1 | 4/2008 | Malcolm |
| 2008/0086094 | A1 | 4/2008 | Peters |
| 2008/0091466 | A1 | 4/2008 | Butler et al. |
| 2008/0095339 | A1 | 4/2008 | Elliott |
| 2008/0097289 | A1 | 4/2008 | Steil et al. |
| 2008/0097552 | A1 | 4/2008 | Dicks et al. |
| 2008/0114328 | A1 | 5/2008 | Doherty et al. |
| 2008/0125897 | A1 | 5/2008 | DiGianfilippo et al. |
| 2008/0126969 | A1 | 5/2008 | Blomquist |
| 2008/0139907 | A1 | 6/2008 | Rao et al. |
| 2008/0148047 | A1 | 6/2008 | Appenzeller et al. |
| 2008/0149117 | A1 | 6/2008 | Raghuram |
| 2008/0154177 | A1 | 6/2008 | Moubayed et al. |
| 2008/0169043 | A1 | 7/2008 | Osborne et al. |
| 2008/0169044 | A1 | 7/2008 | Osborne et al. |
| 2008/0172337 | A1 | 7/2008 | Banfield et al. |
| 2008/0177222 | A1 | 7/2008 | Marco et al. |
| 2008/0184219 | A1 | 7/2008 | Matsumoto |
| 2008/0188796 | A1 | 8/2008 | Steil et al. |
| 2008/0195416 | A1 | 8/2008 | Tribble et al. |
| 2008/0199353 | A1 | 8/2008 | Mlodzinski et al. |
| 2008/0214919 | A1 | 9/2008 | Harmon et al. |

(56) References Cited

U.S. PATENT DOCUMENTS

| | | | |
|---|---|---|---|
| 2008/0246748 | A1 | 10/2008 | Cassidy et al. |
| 2008/0256305 | A1 | 10/2008 | Kwon |
| 2008/0259926 | A1 | 10/2008 | Tavares et al. |
| 2008/0262469 | A1 | 10/2008 | Bristol et al. |
| 2008/0269714 | A1 | 10/2008 | Mastrototaro et al. |
| 2008/0269723 | A1 | 10/2008 | Mastrototaro et al. |
| 2008/0275384 | A1 | 11/2008 | Mastrototaro et al. |
| 2008/0287920 | A1 | 11/2008 | Fangrow et al. |
| 2008/0300572 | A1 | 12/2008 | Rankers et al. |
| 2008/0301298 | A1 | 12/2008 | Bernardi et al. |
| 2008/0320387 | A1 | 12/2008 | Sasaki et al. |
| 2008/0320466 | A1 | 12/2008 | Dias |
| 2009/0003554 | A1 | 1/2009 | Katis et al. |
| 2009/0005703 | A1 | 1/2009 | Fasciano |
| 2009/0005728 | A1 | 1/2009 | Weinert et al. |
| 2009/0006061 | A1 | 1/2009 | Thukral et al. |
| 2009/0006129 | A1 | 1/2009 | Thukral |
| 2009/0006133 | A1 | 1/2009 | Weinert |
| 2009/0012449 | A1 | 1/2009 | Lee et al. |
| 2009/0018495 | A1 | 1/2009 | Panduro |
| 2009/0036750 | A1 | 2/2009 | Weinstein et al. |
| 2009/0050216 | A1 | 2/2009 | Trocki et al. |
| 2009/0051560 | A1 | 2/2009 | Manning et al. |
| 2009/0054743 | A1 | 2/2009 | Stewart |
| 2009/0054754 | A1 | 2/2009 | McMahon et al. |
| 2009/0057399 | A1 | 3/2009 | Sajkowsky |
| 2009/0063187 | A1 | 3/2009 | Johnson et al. |
| 2009/0067973 | A1 | 3/2009 | Eliuk et al. |
| 2009/0069743 | A1 | 3/2009 | Krishnamoorthy et al. |
| 2009/0069785 | A1 | 3/2009 | Miller et al. |
| 2009/0082649 | A1 | 3/2009 | Muller et al. |
| 2009/0088687 | A1 | 4/2009 | Yardimci et al. |
| 2009/0099547 | A1 | 4/2009 | Radmer |
| 2009/0099867 | A1 | 4/2009 | Newman |
| 2009/0101576 | A1 | 4/2009 | Rohde et al. |
| 2009/0126825 | A1 | 5/2009 | Eliuk et al. |
| 2009/0135196 | A1 | 5/2009 | Holland et al. |
| 2009/0143662 | A1 | 6/2009 | Estes et al. |
| 2009/0145509 | A1 | 6/2009 | Baker et al. |
| 2009/0149743 | A1 | 6/2009 | Barron et al. |
| 2009/0150174 | A1 | 6/2009 | Buck et al. |
| 2009/0150439 | A1 | 6/2009 | Gejdos et al. |
| 2009/0150878 | A1 | 6/2009 | Pathak et al. |
| 2009/0154764 | A1 | 6/2009 | Khan et al. |
| 2009/0157695 | A1 | 6/2009 | Roberts |
| 2009/0158274 | A1 | 6/2009 | Roberts |
| 2009/0163860 | A1 | 6/2009 | Patrick et al. |
| 2009/0177146 | A1 | 7/2009 | Nesbitt et al. |
| 2009/0177149 | A1 | 7/2009 | Childers et al. |
| 2009/0177769 | A1 | 7/2009 | Roberts |
| 2009/0183147 | A1 | 7/2009 | Davis et al. |
| 2009/0198215 | A1 | 8/2009 | Chong et al. |
| 2009/0209938 | A1 | 8/2009 | Aalto-Setala |
| 2009/0210250 | A1 | 8/2009 | Prax et al. |
| 2009/0221890 | A1 | 9/2009 | Saffer et al. |
| 2009/0223592 | A1 | 9/2009 | Procyshyn et al. |
| 2009/0223990 | A1 | 9/2009 | Bailey et al. |
| 2009/0231249 | A1 | 9/2009 | Wang et al. |
| 2009/0254031 | A1 | 10/2009 | Lee |
| 2009/0270832 | A1 | 10/2009 | Vancaillie et al. |
| 2009/0270833 | A1 | 10/2009 | DeBelser |
| 2009/0275886 | A1 | 11/2009 | Blomquist et al. |
| 2009/0275896 | A1 | 11/2009 | Kamen et al. |
| 2009/0284691 | A1 | 11/2009 | Marhefka et al. |
| 2009/0292340 | A1 | 11/2009 | Mass et al. |
| 2009/0306573 | A1 | 12/2009 | Gagner et al. |
| 2009/0306621 | A1 | 12/2009 | Thome, Jr. et al. |
| 2009/0326340 | A1 | 12/2009 | Wang |
| 2009/0326516 | A1 | 12/2009 | Bangera et al. |
| 2010/0008377 | A1 | 1/2010 | Hasti et al. |
| 2010/0022988 | A1 | 1/2010 | Wochner |
| 2010/0024904 | A1 | 2/2010 | Hoffman et al. |
| 2010/0036310 | A1 | 2/2010 | Hillman |
| 2010/0049157 | A1 | 2/2010 | Fangrow |
| 2010/0056992 | A1 | 3/2010 | Hayter |
| 2010/0083060 | A1 | 4/2010 | Rahman |
| 2010/0095229 | A1 | 4/2010 | Dixon et al. |
| 2010/0121170 | A1 | 5/2010 | Rule |
| 2010/0121246 | A1 | 5/2010 | Peters et al. |
| 2010/0121415 | A1 | 5/2010 | Skelton et al. |
| 2010/0121654 | A1 | 5/2010 | Portnoy et al. |
| 2010/0121752 | A1 | 5/2010 | Banigan et al. |
| 2010/0130933 | A1 | 5/2010 | Holland et al. |
| 2010/0131434 | A1 | 5/2010 | Magent et al. |
| 2010/0138523 | A1 | 6/2010 | Umess et al. |
| 2010/0146137 | A1 | 6/2010 | Wu et al. |
| 2010/0156633 | A1 | 6/2010 | Buck et al. |
| 2010/0160854 | A1 | 6/2010 | Gauthier |
| 2010/0160860 | A1 | 6/2010 | Celentano et al. |
| 2010/0174266 | A1 | 7/2010 | Estes |
| 2010/0191525 | A1 | 7/2010 | Rabenko et al. |
| 2010/0198034 | A1 | 8/2010 | Thomas et al. |
| 2010/0198196 | A1 | 8/2010 | Wei |
| 2010/0200506 | A1 | 8/2010 | Ware et al. |
| 2010/0209268 | A1 | 8/2010 | Davis |
| 2010/0212675 | A1 | 8/2010 | Walling et al. |
| 2010/0217621 | A1 | 8/2010 | Schoenberg |
| 2010/0234708 | A1 | 9/2010 | Buck et al. |
| 2010/0245056 | A1 | 9/2010 | Braun et al. |
| 2010/0250732 | A1 | 9/2010 | Bucknell |
| 2010/0271479 | A1 | 10/2010 | Heydlauf |
| 2010/0273738 | A1 | 10/2010 | Valcke et al. |
| 2010/0274218 | A1 | 10/2010 | Yodfat et al. |
| 2010/0276034 | A1 | 11/2010 | Gonnelli et al. |
| 2010/0280430 | A1 | 11/2010 | Caleffi et al. |
| 2010/0280486 | A1 | 11/2010 | Khair et al. |
| 2010/0292634 | A1 | 11/2010 | Kircher |
| 2010/0298765 | A1 | 11/2010 | Budiman et al. |
| 2010/0318025 | A1 | 12/2010 | John |
| 2011/0001605 | A1 | 1/2011 | Kiani et al. |
| 2011/0004143 | A1 | 1/2011 | Beiriger et al. |
| 2011/0021898 | A1 | 1/2011 | Wei et al. |
| 2011/0028885 | A1 | 2/2011 | Eggers et al. |
| 2011/0040158 | A1 | 2/2011 | Katz et al. |
| 2011/0060758 | A1 | 3/2011 | Schlotterbeck et al. |
| 2011/0067781 | A1 | 3/2011 | Osborne |
| 2011/0071844 | A1 | 3/2011 | Cannon et al. |
| 2011/0072379 | A1 | 3/2011 | Gannon |
| 2011/0078253 | A1 | 3/2011 | Chan et al. |
| 2011/0078608 | A1 | 3/2011 | Gannon et al. |
| 2011/0087164 | A1 | 4/2011 | Mosler et al. |
| 2011/0093284 | A1 | 4/2011 | Dicks et al. |
| 2011/0099313 | A1 | 4/2011 | Bolanowski |
| 2011/0125095 | A1 | 5/2011 | Lebel et al. |
| 2011/0138185 | A1 | 6/2011 | Ju et al. |
| 2011/0152757 | A1 | 6/2011 | Beck et al. |
| 2011/0166628 | A1 | 7/2011 | Jain |
| 2011/0175728 | A1 | 7/2011 | Baker, Jr. |
| 2011/0178462 | A1 | 7/2011 | Moberg et al. |
| 2011/0178493 | A1 | 7/2011 | Okiyama |
| 2011/0185010 | A1 | 7/2011 | Shatsky et al. |
| 2011/0196304 | A1 | 8/2011 | Kramer et al. |
| 2011/0196748 | A1 | 8/2011 | Caron et al. |
| 2011/0204144 | A1 | 8/2011 | Waugh et al. |
| 2011/0229517 | A1 | 9/2011 | Strahlendorf et al. |
| 2011/0231216 | A1 | 9/2011 | Fyke et al. |
| 2011/0257496 | A1 | 10/2011 | Terashima et al. |
| 2011/0257798 | A1 | 10/2011 | Ali et al. |
| 2011/0259954 | A1 | 10/2011 | Bartz et al. |
| 2011/0264043 | A1 | 10/2011 | Kotnick et al. |
| 2011/0264044 | A1 | 10/2011 | Bartz et al. |
| 2011/0266221 | A1 | 11/2011 | Ware et al. |
| 2011/0270045 | A1 | 11/2011 | Lebel et al. |
| 2011/0275904 | A1 | 11/2011 | Lebel et al. |
| 2011/0276031 | A1 | 11/2011 | Hoang et al. |
| 2011/0286457 | A1 | 11/2011 | Ee |
| 2011/0289314 | A1 | 11/2011 | Whitcomb |
| 2011/0289497 | A1 | 11/2011 | Kiaie et al. |
| 2011/0295196 | A1 | 12/2011 | Chazot et al. |
| 2011/0295341 | A1 | 12/2011 | Estes et al. |
| 2011/0296051 | A1 | 12/2011 | Vange |
| 2011/0296411 | A1 | 12/2011 | Tang et al. |
| 2011/0305545 | A1 | 12/2011 | Davis et al. |
| 2011/0313789 | A1 | 12/2011 | Karmen et al. |

(56) References Cited

U.S. PATENT DOCUMENTS

| | | | |
|---|---|---|---|
| 2011/0319813 | A1 | 12/2011 | Kamen et al. |
| 2011/0320049 | A1 | 12/2011 | Chossat et al. |
| 2012/0005680 | A1 | 1/2012 | Dolby et al. |
| 2012/0011253 | A1 | 1/2012 | Friedman et al. |
| 2012/0016305 | A1 | 1/2012 | Jollota |
| 2012/0157914 | A1 | 1/2012 | Stroup |
| 2012/0029941 | A1 | 2/2012 | Malave et al. |
| 2012/0036102 | A1 | 2/2012 | Fletcher et al. |
| 2012/0066501 | A1 | 3/2012 | Xiong |
| 2012/0067429 | A1 | 3/2012 | Mosler et al. |
| 2012/0070045 | A1 | 3/2012 | Vesper et al. |
| 2012/0095437 | A1 | 4/2012 | Hemmerling |
| 2012/0109077 | A1 | 5/2012 | Ryan |
| 2012/0112903 | A1 | 5/2012 | Kaib et al. |
| 2012/0123298 | A1 | 5/2012 | Mendels et al. |
| 2012/0130198 | A1 | 5/2012 | Beaule |
| 2012/0143116 | A1 | 6/2012 | Ware et al. |
| 2012/0150556 | A1 | 6/2012 | Galasso et al. |
| 2012/0157920 | A1 | 6/2012 | Flachbart et al. |
| 2012/0179135 | A1 | 7/2012 | Rinehart et al. |
| 2012/0179136 | A1 | 7/2012 | Rinehart et al. |
| 2012/0185267 | A1 | 7/2012 | Kamen et al. |
| 2012/0203177 | A1 | 8/2012 | Lanier |
| 2012/0245554 | A1 | 9/2012 | Kawamura |
| 2012/0259978 | A1 | 10/2012 | Petersen et al. |
| 2012/0260012 | A1 | 10/2012 | Gao-Saari et al. |
| 2012/0277716 | A1 | 11/2012 | Ali et al. |
| 2012/0283630 | A1 | 11/2012 | Lee et al. |
| 2012/0284734 | A1 | 11/2012 | McQuaid et al. |
| 2012/0302986 | A1 | 11/2012 | Brem et al. |
| 2012/0323212 | A1 | 12/2012 | Murphy |
| 2012/0330380 | A1 | 12/2012 | Corndorf |
| 2013/0006214 | A1 | 1/2013 | Garfield et al. |
| 2013/0006666 | A1 | 1/2013 | Schneider |
| 2013/0006702 | A1 | 1/2013 | Wu |
| 2013/0012877 | A1 | 1/2013 | Debelser et al. |
| 2013/0012879 | A1 | 1/2013 | Debelser et al. |
| 2013/0012880 | A1 | 1/2013 | Blomquist |
| 2013/0015980 | A1 | 1/2013 | Evans et al. |
| 2013/0018356 | A1 | 1/2013 | Prince et al. |
| 2013/0036403 | A1 | 2/2013 | Geist |
| 2013/0036412 | A1 | 2/2013 | Birtwhistle et al. |
| 2013/0053815 | A1 | 2/2013 | Mucientes et al. |
| 2013/0066265 | A1 | 3/2013 | Grant |
| 2013/0072872 | A1 | 3/2013 | Yodfat et al. |
| 2013/0085439 | A1 | 4/2013 | Sansoucy et al. |
| 2013/0096444 | A1 | 4/2013 | Condurso et al. |
| 2013/0096648 | A1 | 4/2013 | Benson |
| 2013/0102772 | A1 | 4/2013 | Eshima et al. |
| 2013/0102963 | A1 | 4/2013 | Marsh et al. |
| 2013/0114594 | A1 | 5/2013 | Van Zijst |
| 2013/0138452 | A1 | 5/2013 | Cork et al. |
| 2013/0150824 | A1 | 6/2013 | Estes et al. |
| 2013/0167245 | A1 | 6/2013 | Birtwhistle et al. |
| 2013/0173473 | A1 | 7/2013 | Birtwhistle et al. |
| 2013/0191770 | A1 | 7/2013 | Bartz et al. |
| 2013/0204188 | A1 | 8/2013 | Kamen et al. |
| 2013/0211332 | A1 | 8/2013 | Beiriger et al. |
| 2013/0218080 | A1 | 8/2013 | Peterfreund et al. |
| 2013/0218121 | A1 | 8/2013 | Waller et al. |
| 2013/0220484 | A1 | 8/2013 | De Marco |
| 2013/0274669 | A1 | 10/2013 | Stempfle et al. |
| 2013/0275539 | A1 | 10/2013 | Gross et al. |
| 2013/0291116 | A1 | 10/2013 | Homer |
| 2013/0292004 | A1 | 11/2013 | Ducret et al. |
| 2013/0296823 | A1 | 11/2013 | Melker et al. |
| 2013/0296984 | A1 | 11/2013 | Burnett et al. |
| 2013/0317753 | A1 | 11/2013 | Kamen et al. |
| 2013/0346108 | A1 | 12/2013 | Kamen et al. |
| 2014/0020790 | A1 | 1/2014 | Yuyama et al. |
| 2014/0025392 | A1 | 1/2014 | Chandrasenan |
| 2014/0039392 | A1 | 2/2014 | Geipel et al. |
| 2014/0124087 | A1 | 5/2014 | Anderson et al. |
| 2014/0135732 | A1 | 5/2014 | Spronken et al. |
| 2014/0136229 | A1 | 5/2014 | Levine et al. |
| 2014/0142963 | A1 | 5/2014 | Hill et al. |
| 2014/0150925 | A1 | 6/2014 | Sjogren et al. |
| 2014/0163517 | A1 | 6/2014 | Finan et al. |
| 2014/0180711 | A1 | 6/2014 | Kamen et al. |
| 2014/0197950 | A1 | 7/2014 | Shupp et al. |
| 2014/0215490 | A1 | 7/2014 | Mathur et al. |
| 2014/0257251 | A1 | 9/2014 | Bush et al. |
| 2014/0261727 | A1 | 9/2014 | Mansour et al. |
| 2014/0261860 | A1 | 9/2014 | Heath |
| 2014/0261877 | A1 | 9/2014 | Ivosevic et al. |
| 2014/0263614 | A1 | 9/2014 | Keefe et al. |
| 2014/0266790 | A1 | 9/2014 | Al-Ali et al. |
| 2014/0266794 | A1 | 9/2014 | Brown et al. |
| 2014/0269643 | A1 | 9/2014 | Sun |
| 2014/0276386 | A1 | 9/2014 | Mansour et al. |
| 2014/0276571 | A1 | 9/2014 | Ludolph |
| 2014/0276649 | A1 | 9/2014 | Ivosevic et al. |
| 2014/0280522 | A1 | 9/2014 | Watte |
| 2014/0294177 | A1 | 10/2014 | Shastry et al. |
| 2014/0297329 | A1 | 10/2014 | Rock |
| 2014/0316819 | A1 | 10/2014 | Dunsirn et al. |
| 2014/0318639 | A1 | 10/2014 | Peret et al. |
| 2014/0323970 | A1 | 10/2014 | Duncan |
| 2014/0350949 | A1 | 11/2014 | Utech et al. |
| 2014/0366878 | A1 | 12/2014 | Baron |
| 2015/0000784 | A1 | 1/2015 | Jamaledine |
| 2015/0005935 | A1 | 1/2015 | Bae et al. |
| 2015/0006907 | A1 | 1/2015 | Brouwer et al. |
| 2015/0008664 | A1 | 1/2015 | Tachizaki |
| 2015/0025453 | A1 | 1/2015 | Ledford et al. |
| 2015/0040987 | A1 | 2/2015 | Reichert et al. |
| 2015/0040988 | A1 | 2/2015 | Reichert et al. |
| 2015/0041531 | A1 | 2/2015 | Vavala et al. |
| 2015/0045729 | A1 | 2/2015 | Denzer et al. |
| 2015/0045772 | A1 | 2/2015 | Reichert et al. |
| 2015/0058960 | A1 | 2/2015 | Schmoyer et al. |
| 2015/0066531 | A1 | 3/2015 | Jacobson et al. |
| 2015/0082746 | A1 | 3/2015 | Ivosevic et al. |
| 2015/0100038 | A1 | 4/2015 | McCann et al. |
| 2015/0100787 | A1 | 4/2015 | Westin et al. |
| 2015/0101707 | A1 | 4/2015 | Ranalletta et al. |
| 2015/0117234 | A1 | 4/2015 | Raman et al. |
| 2015/0119820 | A1 | 4/2015 | Kanamoto |
| 2015/0123398 | A1 | 5/2015 | Sanders et al. |
| 2015/0126958 | A1 | 5/2015 | Sanders et al. |
| 2015/0133879 | A1 | 5/2015 | Kanamoto et al. |
| 2015/0151041 | A1 | 6/2015 | Yodfat et al. |
| 2015/0151051 | A1 | 6/2015 | Tsoukalis |
| 2015/0157536 | A1 | 6/2015 | Qiu et al. |
| 2015/0161354 | A1 | 6/2015 | Blomquist |
| 2015/0199192 | A1 | 7/2015 | Borges et al. |
| 2015/0199485 | A1 | 7/2015 | Borges et al. |
| 2015/0202382 | A1 | 7/2015 | Juretich et al. |
| 2015/0202383 | A1 | 7/2015 | Juretich et al. |
| 2015/0202384 | A1 | 7/2015 | Juretich et al. |
| 2015/0202385 | A1 | 7/2015 | Juretich et al. |
| 2015/0209230 | A1 | 7/2015 | Lev et al. |
| 2015/0209233 | A1 | 7/2015 | Fukuoka |
| 2015/0209495 | A1 | 7/2015 | Biset et al. |
| 2015/0209510 | A1 | 7/2015 | Burkholz et al. |
| 2015/0230760 | A1 | 8/2015 | Schneider |
| 2015/0250680 | A1 | 9/2015 | Browka et al. |
| 2015/0250681 | A1 | 9/2015 | Lev et al. |
| 2015/0257977 | A1 | 9/2015 | Bochenko et al. |
| 2015/0265500 | A1 | 9/2015 | Russo et al. |
| 2015/0281128 | A1 | 10/2015 | Sindhu |
| 2015/0297451 | A1 | 10/2015 | Mariei et al. |
| 2015/0297453 | A1 | 10/2015 | Kim et al. |
| 2015/0297454 | A1 | 10/2015 | Sanders et al. |
| 2015/0297456 | A1 | 10/2015 | Mariei et al. |
| 2015/0297459 | A1 | 10/2015 | Sanders et al. |
| 2015/0297460 | A1 | 10/2015 | Mansour et al. |
| 2015/0297839 | A1 | 10/2015 | Sanders et al. |
| 2015/0297881 | A1 | 10/2015 | Sanders et al. |
| 2015/0314066 | A1 | 11/2015 | Shimizu |
| 2015/0320992 | A1 | 11/2015 | Bonnet et al. |
| 2015/0328396 | A1 | 11/2015 | Adams et al. |
| 2015/0346013 | A1 | 12/2015 | Feng et al. |
| 2015/0359709 | A1 | 12/2015 | Kriheli et al. |

(56) References Cited

U.S. PATENT DOCUMENTS

2015/0366758 A1 12/2015 Noguchi et al.
2015/0371004 A1 12/2015 Jones
2015/0379237 A1 12/2015 Mills et al.
2016/0000653 A1 1/2016 Kramer
2016/0001003 A1 1/2016 Perazzo et al.
2016/0006695 A1 1/2016 Prodoehl et al.
2016/0015885 A1 1/2016 Pananen et al.
2016/0034655 A1 2/2016 Gray et al.
2016/0038373 A1 2/2016 Ohlin
2016/0038374 A1 2/2016 Merhold et al.
2016/0045661 A1 2/2016 Gray et al.
2016/0051446 A1 2/2016 Lev et al.
2016/0058666 A1 3/2016 Strahlendorf et al.
2016/0058667 A1 3/2016 Kriheli
2016/0063471 A1 3/2016 Kobres et al.
2016/0081878 A1 3/2016 Marks et al.
2016/0101020 A1 4/2016 Guala
2016/0114922 A1 4/2016 Bonhora et al.
2016/0136051 A1 5/2016 Lavi
2016/0136412 A1 5/2016 McKinnon et al.
2016/0140315 A1 5/2016 Diaz et al.
2016/0158104 A1 6/2016 Ali et al.
2016/0158437 A1 6/2016 Biasi et al.
2016/0206511 A1 7/2016 Garfield et al.
2016/0213861 A1 7/2016 Whitaker et al.
2016/0213862 A1 7/2016 Whitaker et al.
2016/0228633 A1 8/2016 Welsch et al.
2016/0241391 A1 8/2016 Fenster
2016/0256632 A1 9/2016 Fangrow
2016/0262981 A1 9/2016 Carrez et al.
2016/0277152 A1 9/2016 Xiang et al.
2016/0285876 A1 9/2016 Perez et al.
2016/0310362 A1 10/2016 Lane et al.
2016/0317742 A1 11/2016 Gannon et al.
2016/0331893 A1 11/2016 Yeh et al.
2016/0350513 A1 12/2016 Jacobson et al.
2016/0354281 A1 12/2016 O'Neill et al.
2017/0007501 A1 1/2017 Schuldt-Lieb et al.
2017/0020428 A1 1/2017 Rogers et al.
2017/0034277 A1 2/2017 Jackson et al.
2017/0063559 A1 3/2017 Wallrabenstein
2017/0081168 A1 3/2017 Seay et al.
2017/0099148 A1 4/2017 Ochmanski et al.
2017/0104645 A1 4/2017 Wooton et al.
2017/0111301 A1 4/2017 Robinson
2017/0128666 A1 5/2017 Davis
2017/0129763 A1 5/2017 Fangrow, Jr.
2017/0146381 A1 5/2017 Eckel et al.
2017/0149567 A1 5/2017 Moskal
2017/0165435 A1 6/2017 Green
2017/0165436 A1 6/2017 Haddad et al.
2017/0214762 A1 7/2017 Swain et al.
2017/0255760 A1 9/2017 Lee et al.
2017/0258401 A1 9/2017 Volpe
2017/0262590 A1 9/2017 Karakosta et al.
2017/0312716 A1 11/2017 Konrad, Jr. et al.
2017/0325091 A1 11/2017 Freeman et al.
2017/0351841 A1 12/2017 Moskal
2017/0354571 A1 12/2017 David et al.
2018/0043323 A1 2/2018 Janders et al.
2018/0055738 A1 3/2018 Chen et al.
2018/0063724 A1 3/2018 Zhang et al.
2018/0065097 A1 3/2018 Konrad, Jr. et al.
2018/0121613 A1 5/2018 Connely, IV et al.
2018/0126067 A1 5/2018 Ledford et al.
2018/0133667 A1 5/2018 Lee et al.
2018/0168930 A1 6/2018 Tunesi
2018/0168935 A1 6/2018 Chen et al.
2018/0177940 A1 6/2018 Hachey
2018/0181712 A1 6/2018 Ensey et al.
2018/0194505 A1 7/2018 Amano et al.
2018/0232497 A1 8/2018 Hoffman et al.
2018/0247712 A1 8/2018 Muhsin et al.
2018/0263850 A1 9/2018 Schneider et al.
2018/0272117 A1 9/2018 Fangrow
2018/0317826 A1 11/2018 Muhsin et al.
2018/0322948 A1 11/2018 Drost et al.
2018/0344572 A1 12/2018 Zollinger et al.
2018/0353381 A1 12/2018 Pak et al.
2018/0353382 A1 12/2018 Zollinger et al.
2018/0354662 A1 12/2018 Feith et al.
2018/0357476 A1 12/2018 Klumph
2018/0359085 A1 12/2018 Dervyn
2018/0360689 A1 12/2018 Zollinger et al.
2019/0006044 A1 1/2019 Brask
2019/0019576 A1 1/2019 DeCiccio et al.
2019/0021947 A1 1/2019 Bomgaars et al.
2019/0036688 A1 1/2019 Wasily et al.
2019/0056419 A1 2/2019 Procyshyn et al.
2019/0091639 A1 3/2019 Brown et al.
2019/0096518 A1 3/2019 Pace
2019/0105619 A1 4/2019 Wilson et al.
2019/0132196 A1 5/2019 Trivedi et al.
2019/0151569 A1 5/2019 Fangrow
2019/0152663 A1 5/2019 Kraft
2019/0163876 A1 5/2019 Remme et al.
2019/0166501 A1 5/2019 Debates et al.
2019/0170663 A1 6/2019 Pirkle et al.
2019/0172590 A1 6/2019 Vesto et al.
2019/0216683 A1 7/2019 Yaegashi
2019/0228863 A1 7/2019 Dharwad et al.
2019/0229982 A1 7/2019 Ikuta et al.
2019/0244466 A1 8/2019 Berg et al.
2019/0244689 A1 8/2019 Atkin
2019/0245942 A1 8/2019 Moskal
2019/0247280 A1 8/2019 Hellenbrand
2019/0262790 A1 8/2019 Konrad, Jr. et al.
2019/0275243 A1 9/2019 Deck et al.
2019/0307643 A1 10/2019 Tribble et al.
2019/0311803 A1 10/2019 Kohlbrecher et al.
2019/0348160 A1 11/2019 Heavelyn et al.
2019/0388302 A1 12/2019 Schobel et al.
2019/0392929 A1 12/2019 Gassman
2020/0016037 A1 1/2020 Oda et al.
2020/0023127 A1 1/2020 Simpson et al.
2020/0054825 A1 2/2020 Kamen et al.
2020/0066389 A1 2/2020 Prince et al.
2020/0093699 A1 3/2020 Oda et al.
2020/0113784 A1 4/2020 Lopez et al.
2020/0113785 A1 4/2020 Lopez
2020/0153627 A1 5/2020 Wentz
2020/0206413 A1 7/2020 Silkaitis et al.
2020/0206492 A1 7/2020 Fangrow
2020/0220865 A1 7/2020 Finger et al.
2020/0282139 A1 9/2020 Susi
2020/0289370 A1 9/2020 Lopez
2020/0297581 A1 9/2020 Lopez
2020/0334497 A1 10/2020 Barrett et al.
2020/0335194 A1 10/2020 Jacobson et al.
2020/0351376 A1 11/2020 Moskal
2020/0353167 A1 11/2020 Vivek et al.
2020/0353168 A1 11/2020 Keenan et al.
2021/0014259 A1 1/2021 Harris et al.
2021/0045640 A1 2/2021 Poltorak
2021/0085855 A1 3/2021 Belkin et al.
2021/0375421 A1 12/2021 Ruchti et al.
2021/0375438 A1 12/2021 Xavier et al.
2021/0409362 A1 12/2021 Katis et al.
2022/0037011 A1 2/2022 Fryman
2022/0037012 A1 2/2022 Fryman
2022/0051777 A1 2/2022 Xavier et al.
2022/0062541 A1 3/2022 Kamen et al.
2022/0129452 A1 4/2022 Butler et al.
2022/0150307 A1 5/2022 Walsh et al.
2022/0165404 A1 5/2022 Vivek et al.
2022/0189605 A1 6/2022 Kelly et al.
2022/0223283 A1 7/2022 Biasi et al.
2022/0328175 A1 10/2022 Arrizza et al.
2022/0331513 A1 10/2022 Howard et al.
2022/0344023 A1 10/2022 Xavier et al.
2022/0375565 A1 11/2022 Xavier et al.
2022/0384059 A1 12/2022 Xavier et al.
2023/0009405 A1 1/2023 Xavier et al.
2023/0009417 A1 1/2023 Xavier et al.

(56) References Cited

U.S. PATENT DOCUMENTS

| | | | |
|---|---|---|---|
| 2023/0139360 A1 | 5/2023 | Kohlbrecher et al. |
| 2023/0145267 A1 | 5/2023 | Xavier et al. |
| 2023/0147762 A1 | 5/2023 | Xavier et al. |
| 2023/0166026 A1 | 6/2023 | Jacobson et al. |

FOREIGN PATENT DOCUMENTS

| | | | |
|---|---|---|---|
| CA | 2 898 825 | | 7/2014 |
| CN | 1707379 | | 12/2005 |
| CN | 101244297 | | 8/2008 |
| CN | 102521474 | | 6/2012 |
| CN | 106860003 | A | 6/2017 |
| CN | 107198658 | A | 9/2017 |
| CN | 108210332 | A | 6/2018 |
| CN | 107810536 | | 1/2023 |
| DE | 31 12 762 | | 1/1983 |
| DE | 34 35 647 | | 7/1985 |
| DE | 198 44 252 | | 3/2000 |
| DE | 199 32 147 | | 1/2001 |
| DE | 202 16 791 | U | 2/2003 |
| DE | 20 2004 014 868 | | 11/2004 |
| DE | 103 52 456 | | 7/2005 |
| EP | 0 319 267 | | 6/1989 |
| EP | 0 380 061 | | 8/1990 |
| EP | 0 384 155 | | 8/1990 |
| EP | 0 460 533 | | 12/1991 |
| EP | 0 564 127 | | 6/1993 |
| EP | 0 633 035 | | 1/1995 |
| EP | 0 652 528 | | 5/1995 |
| EP | 0 521 460 | B1 | 9/1995 |
| EP | 0 672 427 | | 9/1995 |
| EP | 0 683 465 | | 11/1995 |
| EP | 0 880 936 | | 12/1998 |
| EP | 0 974 330 | | 1/2000 |
| EP | 1 157 711 | | 11/2001 |
| EP | 1 174 817 | | 1/2002 |
| EP | 0 664 102 | | 4/2002 |
| EP | 1 197 178 | | 4/2002 |
| EP | 0 830 775 | | 8/2002 |
| EP | 1 500 025 | | 4/2003 |
| EP | 1 533 597 | | 5/2005 |
| EP | 1 563 819 | | 8/2005 |
| EP | 1 933 497 | | 6/2008 |
| EP | 1 997 471 | | 12/2008 |
| EP | 2 026 223 | | 2/2009 |
| EP | 2 113 842 | | 11/2009 |
| EP | 2 228 004 | | 9/2010 |
| EP | 2 243 506 | | 10/2010 |
| EP | 2 410 448 | | 1/2012 |
| EP | 2 742 961 | | 6/2014 |
| EP | 2 874 087 | | 5/2015 |
| EP | 3 375 427 | A1 | 9/2018 |
| ES | 2 371 995 | | 1/2012 |
| FR | 2 717 919 | | 9/1995 |
| GB | 2 285 135 | | 6/1995 |
| JP | S55-156750 | | 11/1980 |
| JP | 55-173339 | | 12/1980 |
| JP | 56-95247 | A | 8/1981 |
| JP | 62-189072 | A | 8/1987 |
| JP | 04-161139 | | 6/1992 |
| JP | 06-343706 | | 12/1994 |
| JP | 07-502678 | | 3/1995 |
| JP | 10-118158 | A | 5/1998 |
| JP | 11-500643 | | 1/1999 |
| JP | 2000-316820 | | 11/2000 |
| JP | 2001-190689 | A | 7/2001 |
| JP | 2002-238979 | A | 8/2002 |
| JP | 2002-531154 | | 9/2002 |
| JP | 2002-355318 | | 12/2002 |
| JP | 2003-016183 | | 1/2003 |
| JP | 2003-144546 | | 5/2003 |
| JP | 2003-199823 | | 7/2003 |
| JP | 2003-225305 | A | 8/2003 |
| JP | 2003-296173 | | 10/2003 |
| JP | 2004-049497 | | 2/2004 |
| JP | 2005-021463 | | 1/2005 |
| JP | 2005-527284 | | 9/2005 |
| JP | 2005-284846 | | 10/2005 |
| JP | 2006-047319 | | 2/2006 |
| JP | 2006-520949 | | 9/2006 |
| JP | 2007-14618 | | 1/2007 |
| JP | 2007-518479 | | 7/2007 |
| JP | 2007-215775 | A | 8/2007 |
| JP | 2007-525256 | | 9/2007 |
| JP | 2008-080036 | | 4/2008 |
| JP | 2008-516303 | | 5/2008 |
| JP | 2008-158622 | | 7/2008 |
| JP | 2008-529675 | | 8/2008 |
| JP | 2009-163534 | | 7/2009 |
| JP | 2010-502361 | | 1/2010 |
| JP | 2011-506048 | | 3/2011 |
| JP | 2012-011204 | | 1/2012 |
| JP | 2012-070991 | | 4/2012 |
| JP | 2012-523895 | | 10/2012 |
| JP | 2014-068283 | | 4/2014 |
| JP | 5647644 | | 1/2015 |
| KR | 2011-0019800 | | 3/2011 |
| KR | 10-1574194 | B1 | 12/2015 |
| TW | 200426656 | | 12/2004 |
| TW | I631966 | | 8/2018 |
| WO | WO 84/001719 | | 5/1984 |
| WO | WO 91/016416 | | 10/1991 |
| WO | WO 92/010985 | | 7/1992 |
| WO | WO 92/013322 | | 8/1992 |
| WO | WO 94/005355 | | 3/1994 |
| WO | WO 96/008755 | | 3/1996 |
| WO | WO 96/025186 | | 8/1996 |
| WO | WO 96/025963 | | 8/1996 |
| WO | WO 1997/14493 | | 4/1997 |
| WO | WO 98/012670 | | 3/1998 |
| WO | WO 98/019263 | | 5/1998 |
| WO | WO 1998/23353 | | 6/1998 |
| WO | WO 1999/19012 | | 4/1999 |
| WO | WO 99/051003 | | 10/1999 |
| WO | WO 1999/63547 | | 12/1999 |
| WO | WO 00/013580 | | 3/2000 |
| WO | WO 2000/41751 | | 7/2000 |
| WO | WO 00/053243 | | 9/2000 |
| WO | WO 2001/03757 | | 1/2001 |
| WO | WO 01/014974 | | 3/2001 |
| WO | WO 01/033484 | | 5/2001 |
| WO | WO 01/045014 | | 6/2001 |
| WO | WO 2001/039874 | | 6/2001 |
| WO | WO 02/005702 | | 1/2002 |
| WO | WO 2002/04065 | | 1/2002 |
| WO | WO 02/036044 | | 5/2002 |
| WO | WO 02/049153 | | 6/2002 |
| WO | WO 02/049279 | | 6/2002 |
| WO | WO 02/069099 | | 9/2002 |
| WO | WO 02/081015 | | 10/2002 |
| WO | WO 02/088875 | | 11/2002 |
| WO | WO 03/006091 | | 1/2003 |
| WO | WO 03/023551 | | 3/2003 |
| WO | WO 03/050917 | | 6/2003 |
| WO | WO 03/091836 | | 11/2003 |
| WO | WO 03/094092 | | 11/2003 |
| WO | WO 2004/060455 | | 7/2004 |
| WO | WO 2004/070557 | | 8/2004 |
| WO | WO 2004/070562 | | 8/2004 |
| WO | WO 2004/072828 | | 8/2004 |
| WO | WO 2005/036447 | | 4/2005 |
| WO | WO 2005/041846 | | 5/2005 |
| WO | WO 2005/057175 | | 6/2005 |
| WO | WO 2005/066872 | | 7/2005 |
| WO | WO 2005/110007 | | 11/2005 |
| WO | WO 2005/123162 | | 12/2005 |
| WO | WO 2007/033013 | | 3/2007 |
| WO | WO 2007/061424 | | 5/2007 |
| WO | WO 2007/062315 | | 5/2007 |
| WO | WO 2007/079305 | | 7/2007 |
| WO | WO 2007/087443 | | 8/2007 |
| WO | WO 2007/117705 | | 10/2007 |
| WO | WO 2007/127879 | | 11/2007 |
| WO | WO 2007/127880 | | 11/2007 |

(56) References Cited

FOREIGN PATENT DOCUMENTS

| | | |
|---|---|---|
| WO | WO 2007/148708 | 12/2007 |
| WO | WO 2008/051998 | 5/2008 |
| WO | WO 2008/052140 | 5/2008 |
| WO | WO 2008/067245 | 6/2008 |
| WO | WO 2008/082854 | 7/2008 |
| WO | WO 2008/088490 | 7/2008 |
| WO | WO 2008/097316 | 8/2008 |
| WO | WO 2008/103915 | 8/2008 |
| WO | WO 2008/124478 | 10/2008 |
| WO | WO 2008/128074 | 10/2008 |
| WO | WO 2008/134146 | 11/2008 |
| WO | WO 2008/144447 | 11/2008 |
| WO | WO 2009/016504 | 2/2009 |
| WO | WO 2009/023406 | 2/2009 |
| WO | WO 2009/023407 | 2/2009 |
| WO | WO 2009/023634 | 2/2009 |
| WO | WO 2009/036327 | 3/2009 |
| WO | WO 2009/049252 | 4/2009 |
| WO | WO 2009/060419 | 5/2009 |
| WO | WO 2009/130147 | 10/2009 |
| WO | WO 2009/140511 | 11/2009 |
| WO | WO 2010/017279 | 2/2010 |
| WO | WO 2010/033919 | 3/2010 |
| WO | WO 2010/053703 | 5/2010 |
| WO | WO 2010/075371 | 7/2010 |
| WO | WO 2010/099313 | 9/2010 |
| WO | WO 2010/111546 | 9/2010 |
| WO | WO 2010/114929 | 10/2010 |
| WO | WO 2010/119409 | 10/2010 |
| WO | WO 2010/124127 | 10/2010 |
| WO | WO 2010/130992 | 11/2010 |
| WO | WO 2010/135646 | 11/2010 |
| WO | WO 2010/135654 | 11/2010 |
| WO | WO 2010/135686 | 11/2010 |
| WO | WO 2011/002853 | 1/2011 |
| WO | WO 2011/005633 | 1/2011 |
| WO | WO 2011/012313 | 2/2011 |
| WO | WO 2011/014525 | 2/2011 |
| WO | WO 2011/022549 | 2/2011 |
| WO | WO 2011/058545 | 5/2011 |
| WO | WO 2011/058548 | 5/2011 |
| WO | WO 2011/091542 | 8/2011 |
| WO | WO 2011/091543 | 8/2011 |
| WO | WO 2011/104711 | 9/2011 |
| WO | WO 2011/104712 | 9/2011 |
| WO | WO 2011/150037 | 12/2011 |
| WO | WO 2012/048833 | 4/2012 |
| WO | WO 2012/049214 | 4/2012 |
| WO | WO 2012/049218 | 4/2012 |
| WO | WO 2012/119225 | 9/2012 |
| WO | WO 2012/120078 | 9/2012 |
| WO | WO 2012/140547 | 10/2012 |
| WO | WO 2012/164556 | 12/2012 |
| WO | WO 2012/170942 | 12/2012 |
| WO | WO 2013/045506 | 4/2013 |
| WO | WO 2013/096911 | 6/2013 |
| WO | WO 2014/100736 | 6/2014 |
| WO | WO 2014/122643 | 8/2014 |
| WO | WO 2014/126473 | 8/2014 |
| WO | WO 2014/131729 | 9/2014 |
| WO | WO 2014/131730 | 9/2014 |
| WO | WO 2014/177347 | 11/2014 |
| WO | WO 2014/181320 | 11/2014 |
| WO | WO 2015/029020 | 3/2015 |
| WO | WO 2015/077184 | 5/2015 |
| WO | WO 2015/077466 | 5/2015 |
| WO | WO 2015/122921 | 8/2015 |
| WO | WO 2015/124569 | 8/2015 |
| WO | WO 2016/010909 | 1/2016 |
| WO | WO 2016/179389 | 11/2016 |
| WO | WO 2017/096072 | 6/2017 |
| WO | WO 2018/009996 | 1/2018 |
| WO | WO 2018/022640 | 2/2018 |
| WO | WO 2019/018195 | 1/2019 |
| WO | WO 2019/219290 | 11/2019 |
| WO | WO 00/003344 | 1/2020 |
| WO | WO 2020/227403 | 11/2020 |
| WO | WO 2021/201884 | 10/2021 |
| WO | WO 2022/006014 | 1/2022 |
| WO | WO 2022/051230 | 3/2022 |

OTHER PUBLICATIONS

Akridge, Jeannie, "New Pumps Outsmart User Error", Healthcare Purchasing News, Apr. 2011, pp. 10, <http://web.archive.org/web/20110426122450/http://www.hpnonline.com/inside/2011-04/1104-OR-Pumps.html>.

Alur et al., "Formal Specifications and Analysis of the Computer-Assisted Resuscitation Algorithm(CARA) Infusion Pump Control System", International Journal on Software Tools for Technology Transfer, Feb. 2004, vol. 5, No. 4, pp. 308-319.

Aragon, Daleen RN, Ph.D., CCRN, "Evaluation of Nursing Work Effort and Perceptions About Blood Glucose Testing in Tight Glycemic Control", American Journal of Critical Care, Jul. 2006, vol. 15, No. 4, pp. 370-377.

ASHP Advantage, "Improving Medication Safety in Health Systems Through Innovations in Automation Technology", Proceedings of Educational Symposium and Educational Sessions during the 39th ASHP Midyear Clinical Meeting, Dec. 5-9, 2004, Orlando, FL, pp. 28.

Beard et al., "Total Quality Pain Management: History, Background, Resources", Abbott Laboratories, TQPM Survey History, available Feb. 2015 or earlier, pp. 1-3.

Bektas et al., "Bluetooth Communication Employing Antenna Diversity", Proceedings of Eight IEEE International Symposium on Computers and Communication, Jul. 2003, pp. 6.

Bellare et al., "Security Proofs for Identity-Based Identification and Signature Schemes", Lecture Notes in Computer Science, Jan. 2009, vol. 22, No. 1, pp. 18.

Bequette, Ph.D., "A Critical Assessment of Algorithms and Challenges in the Development of a Closed-Loop Artificial Pancreas", Diabetes Technology & Therapeutics, Feb. 28, 2005, vol. 7, No. 1, pp. 28-47.

Bequette, B. Wayne, Ph.D., "Analysis of Algorithms for Intensive Care Unit Blood Glucose Control", Journal of Diabetes Science and Technology, Nov. 2007, vol. 1, No. 6, pp. 813-824.

Block, Alexander, "Secret Sharing and 1-11 Threshold Signatures with BLS", Jul. 2, 2018, https://blog.dash.org/secret-sharing-and-threshold-signatures-with-bls-954d1587b5f, in 8 pages.

Braun, "Infusomat® Space and Accessories", Instructions for Use, Nov. 2010, pp. 68. <http://corp.bbraun.ee/Extranet/Infusionipumbad/Kasutusjuhendid/Vanad/Kasutusjuhend-Infusomat_Space(vers688J,inglise_k).pdf>.

Brownlee, Seth, "Product Spotlight: The Plum A+ with Hospira MedNet Infusion System", PP&P Magazine, Dec. 2005, vol. 2, No. 7, pp. 2.

Cannon, MD et al., "Automated Heparin-Delivery System to Control Activated Partial Thromboplastin Time", Circulation, Feb. 16, 1999, vol. 99, pp. 751-756.

Cardinal Health, "Alaris® Syringe Pumps" Technical Service Manual, Copyright 2002-2006, Issue 9, pp. 1-88, <http://www.frankshospitalworkshop.com/equipment/documents/infusion_pumps/service_manuals/Cardinal Alaris_-_Service_Manual.pdf>.

"CareAware® Infusion Management", Cerner Store, as printed May 12, 2011, pp. 3, <https://store.cerner.com/items/7>.

Chen et al., "Enabling Location-Based Services on Wireless LANs", The 11th IEEE International Conference on Networks, ICON 2003, Sep. 28-Oct. 1, 2003, pp. 567-572.

"Computer Dictionary", Microsoft Press, Third Edition, Microsoft Press, 1997, pp. 430 & 506.

"Context-Free Grammar", Wikipedia.org, as last modified Mar. 5, 2010 in 11 pages, <https://en.wikipedia.org/w/index.php/?title=Context-free_grammar&oldid=347915989>.

Crawford, Anne J., MSN, RNC, "Building a Successful Quality Pain Service: Using Patient Satisfaction Data and the Clinical Practice Guideline", USA, 1995, pp. 1-6.

(56) References Cited

OTHER PUBLICATIONS

Crocker et al., "Augmented BNF for Syntax Specifications: ABNF", Network Working Group, Standards Track, Jan. 2008, pp. 16.
Davidson et al., "A Computer-Directed Intravenous Insulin System Shown to be Safe, Simple, and Effective in 120,618 h of Operation", Diabetes Care, Oct. 2005, vol. 28, No. 10, pp. 2418-2423.
Davies, T., "Cordless Data Acquisition in a Hospital Environment", IEE Colloquium on Cordless Computing—Systems and User Experience, 1993, pp. 4.
Dayhoff et al., "Medical Data Capture and Display: The Importance of Clinicians' Workstation Design", AMIA, Inc., 1994, pp. 541-545.
Diabetes Close Up, Close Concerns AACE Inpatient Management Conference Report, Consensus Development Conference on Inpatient Diabetes and Metabolic Control, Washington, D.C., Dec. 14-16, 2003, pp. 1-32.
Doesburg et al., "Improved Usability of a Multi-Infusion Setup Using a Centralized Control Interface: A Task-Based Usability Test", Aug. 11, 2017, PLoS One, vol. 12, No. 8, pp. 10.
"Download", Free On-Line Dictionary of Computing, as archived Jun. 16, 2010 in 1 page, http://web.archive.org/web/20100616010314/https://foldoc.org/download.
East PhD et al., "Digital Electronic Communication Between ICU Ventilators and Computers and Printers", Respiratory Care, Sep. 1992, vol. 37, No. 9, pp. 1113-1122.
Edworthy, Judy, "Medical Audible Alarms: A Review", Journal of the American Medical Informatics Association, vol. 20, No. 3, 2013, pp. 584-589.
Einhorn, George W., "Total Quality Pain Management: A Computerized Quality Assessment Tool for Postoperative Pain Management", Abbott Laboratories, Chicago, IL, Mar. 2, 2000, pp. 1-4.
Eskew et al., "Using Innovative Technologies to Set New Safety Standards for the Infusion of Intravenous Medications", Hospital Pharmacy, 2002, vol. 37, No. 11, pp. 1179-1189.
Felleiter et al., "Data Processing in Prehospital Emergency Medicine", International journal of Clinical Monitoring and Computing, Feb. 1995, vol. 12, No. 1, pp. 37-41.
"File Verification", Wikipedia.org, as last modified Oct. 11, 2011 in 2 pages, <https://en.wikipedia.org/w/index.php?title=File_verification&oldid=455048290>.
Fogt et al., Development and Evaluation of a Glucose Analyzer for a Glucose-Controlled Insulin Infusion System (Biostator®), Clinical Chemistry, 1978, vol. 24, No. 8, pp. 1366-1372.
Gabel et al., "Camp: A Common API for Measuring Performance", 21st Large Installations System Administration Conference (LISA '07), 2007, pp. 49-61.
Gage et al., "Automated Anesthesia Surgery Medical Record System", International Journal of Clinical Monitoring and Computing, Dec. 1990, vol. 7, No. 4, pp. 259-263.
Galt et al., "Personal Digital Assistant-Based Drug Information Sources: Potential to Improve Medication Safety", Journal of Medical Library Association, Apr. 2005, vol. 93, No. 2, pp. 229-236.
Gardner, Ph.D et al., "Real Time Data Acquisition: Recommendations for the Medical Information Bus (MIB)", 1992, pp. 813-817.
"General-Purpose Infusion Pumps", Health Devices, EXRI Institute, Oct. 1, 2002, vol. 31, No. 10, pp. 353-387.
Givens et al., "Exploring the Internal State of User Interfaces by Combining Computer Vision Techniques with Grammatical Inference", Proceedings of the 2013 International Conference on Software Engineering, San Francisco, CA, May 18-26, 2013, pp. 1165-1168.
Glaeser, "A Hierarchical Minicomputer System for Continuous Post-Surgical Monitoring", Computers and Biomedical Research, Aug. 31, 1975, pp. 336-361.
Goldberg et al., "Clinical Results of an Updated Insulin Infusion Protocol in Critically Ill Patients", Diabetes Spectrum, 2005, vol. 18, No. 3, pp. 188-191.
Gomez et al., "CLAM: Connection-Less, Lightweight, and Multiway Communication Support for Distributed Computing", Computer Science, 1997, vol. 1199, pp. 227-240.
"GPS Tracker for Medical Equipment", <http://www.trackingsystem.com/forbusinesses/corporate-trackingsystem/1098-gps-tracker-formedicalequipment.html>, Mar. 15, 2015, pp. 2.
Graseby, "Model 3000/500 and Micro 3100/505: Volumetric Infusion Pump", Technical Service Manual, Graseby Medical Ltd., Apr. 2002, Issue A, pp. 160.
Graseby, "Model 3000/500 and Micro 3100/505: Volumetric Infusion Pump: Illustrated Parts List for Pump Serial Nos. from 3000 to 59,999", Technical Service Manual, Graseby Medical Ltd., Apr. 2002, Issue A, pp. 71.
Gutwin et al., "Gone But Not Forgotten: Designing for Disconnection in Synchronous Groupware", CSCW 2010, Feb. 6-10, 2010, Savannah, Georgia, USA., pp. 179-188.
Halpern et al., "Changes in Critical Care Beds and Occupancy in the United States 1985-2000: Differences Attributable to Hospital Size", Critical Care Medical, Aug. 2006, vol. 34, No. 8, pp. 2105-2112.
Hamann et al., "Pumpsim: A Software Package for Simulating Computer-Controlled Drug InfusionPumps", Annual International Conference of the IEEE Engineering in Medicine and Biology Society, 1990, vol. 12, No. 5, pp. 2019-2020.
Hasegawa et al., "On a Portable Memory Device for Physical Activities and Informations of Maternal Perception", Journal of Perinatal Medicine, 1988, vol. 16, No. 4, pp. 349-356.
Hawley et al., "Clinical Implementation of an Automated Medical Information Bus in an Intensive Care Unit", Proceedings of the Annual Symposium on Computer Application in Medical Care, Nov. 9, 1988, pp. 621-624.
Hayes-Roth et al., "Guardian: A Prototype Intelligent Agent for Intensive-Care Monitoring", Artificial Intelligence in Medicine, vol. 4, Dec. 31, 1992, pp. 165-185.
Hospira, GemStar® Pain Management Infusion System 9-084-PR1-2-2, <www.hospira.com/products/gemstar_painmanagement.aspx>, Jan. 28, 2010, pp. 1-2.
Huang et al., "Secure Identity-Based Data Sharing and Profile Matching for Mobile Healthcare Social Networks in Cloud Computing", vol. 6, Jul. 2018, pp. 36584-36594.
Introducing Abbott TQPM (Total Quality Pain Management), Abbott Laboratories, Abbott Park, IL, May 2000, pp. 1-4.
"Infusion Pump", Wikipedia.org, as last modified Mar. 27, 2014, in 3 pages, <https://web.archive.org/web/20140703024932/https://en.wikipedia.org/wiki/Infusion_pump>.
Isaka et al., "Control Strategies for Arterial Blood Pressure Regulation", IEEE Transactions on Biomedical Engineering, Apr. 1993, vol. 40, No. 4, pp. 353-363.
Johnson et al., "Using BCMA Software to Improve Patient Safety in Veterans Administration Medical Centers", Journal of Healthcare Information Management, Dec. 6, 2004, vol. 16, No. 1, pp. 46-51.
Kent Displays, "Reflex™ Electronic Skins", Product Brief 25127B, 2009, pp. 2.
Kent Displays, "Reflex Electronic Skins Engineering Evaluation Kit", 25136A, Mar. 10, 2009.
Lefkowitz et al., "A Trial of the Use of Bar Code Technology to Restructure a Drug Distribution and Administration System", Hospital Pharmacy, Mar. 31, 1991, vol. 26, No. 3, pp. 239-242.
Lenssen et al., "Bright Color Electronic Paper Technology and Applications", IDS '09 Publication EP1-2 (Phillips Research), 2009, pp. 529-532.
Leveson, Nancy, "Medical Devices: The Therac-25", Appendix A, University of Washington, 1995, pp. 49.
Li et al., "Hijacking an Insulin Pump: Security Attacks and Defenses for a Diabetes Therapy System", 2011 IEEE 13th International Conference on e-Health Networking, Applications and Services, 2011, pp. 150-156.
Linkens, D.A. "Computer Control for Patient Care", Computer Control of Real-Time Processes, IEE Control Engineering Series 41, 1990, Ch. 13, pp. 216-238.
Mako Hill et al., "The Official Ubuntu Book", Shoeisha Co., Ltd., 1st Edition, Jun. 11, 2007, pp. 115 to 125.
Marshall, et al., "New Microprocessor-Based Insulin Controller", IEEE Transactions on Biomedical Engineering, Nov. 1983, vol. BME-30, No. 11, pp. 689-695.
Martino et al., "Automation of a Medical Intensive Care Environment with a Flexible Configuration of Computer Systems", Pro-

(56) References Cited

OTHER PUBLICATIONS ceedings of the Annual Symposium on Computer Application in Medical Care, Nov. 5, 1980, vol. 3, pp. 1562-1568.
Matsunaga et al., "On the Use of Machine Learning to Predict the Time and Resources Consumedby Applications", 2010 10th IEEE/ACM International Conference on Cluster, Cloud and Grid Computing (CCGrid), May 17-20, 2010, pp. 495-504.
Mauseth et al., "Proposed Clinical Application for Tuning Fuzzy Logic Controller of Artificial Pancreas Utilizing a Personalization Factor", Journal of Diabetes Science and Technology, Jul. 2010, vol. 4, No. 4, pp. 913-922.
"McKesson Automation and ALARIS Medical Systems Developing Point-of-Care Bar Coding Solution to Improve IV Medication Safety", PR Newswire, NY, Dec. 9, 2002, pp. 4.
Medfusion™, "Medfusion Syringe Infusion Pump Model 4000", Operator's Manual, Software Version V1.1, Sep. 2011, pp. 154. <http://www.medfusionpump.com/assets/literature/manuals/Operators_Manual_4000_40-5760-51A.pdf>.
Metnitz et al., "Computer Assisted Data Analysis in Intensive Care: the ICDEV Project-Developmentof a Scientific Database System for Intensive Care", International Journal of Clinical Monitoring and Computing, Aug. 1995, vol. 12, No. 3, pp. 147-159.
Michienzi, Kelly, "Managing Drug Library Updates", Pharmacy Purchasing Products, https://www.pppmag.com/article/1061, Feb. 2012, vol. 9, pp. 22-23.
Micrel Medical Devices, "MP Daily +"<http://web.archive.org/web/20130803235715/http://www.micrelmed.com/index.aspx?productid=9> as archived Aug. 3, 2013 in 1 page.
Moghissi, Etie, MD, FACP, FACE, "Hyperglycemia in Hospitalized Patients", A Supplement to ACP Hospitalist, Jun. 15, 2008, pp. 32.
Murray, Jr .et al., "Automated Drug Identification System (during surgery)", IEEE Proceedings of Southeastcon '91, Apr. 7-10, 1991, pp. 265.
Nicholson et al., "Smart' Infusion Apparatus for Computation and Automated Delivery of Loading, Tapering, and Maintenance Infusion Regimens of Lidocaine, Procainamide, and Theophylline", Proceedings of the Seventh Annual Symposium on Computer Applications in Medical Care, Oct. 1983, pp. 212-213.
Nojoumian et al., "Social Secret Sharing in Cloud Computing Using a New Trust Function", 2012 Tenth Annual International Conference on Privacy, Security and Trust, pp. 161-167.
Nolan et al., "The P1073 Medical Information Bus Standard: Overview and Benefits for Clinical Users", 1990, pp. 216-219.
Omnilink Systems, Inc., "Portable Medical Equipment Tracking", <http://www.omnilink.com/portablemedicalequipmenttracking/>, Mar. 15, 2015, pp. 2.
O'Shea, Kristen L., "Infusion Management: Working Smarter, Not Harder", Hospital Pharmacy, Apr. 2013, vol. 48, No. 3, pp. S1-S14.
Package Management in Debian GNU/Linux, Debian GNU/Linux Expert Desktop Use Special, Giutsu-Hyohron Co., Ltd., First Edition, Sep. 25, 2004, pp. 183-185.
Passos et al., "Distributed Software Platform for Automation and Control of General Anaesthesia", Eighth International Symposium on Parallel and Distributed Computing, ISPDC '09, Jun. 30-Jul. 4, 2009, pp. 8.
Philips, "IntelliSpace Event Management and IntelliVue Patient Monitoring", Release 10, 2011, <http://incenter.medical.philips.com/doclib/enc/fetch/2000/4504/577242/577243/577247/582646/583147/8359175/Philips_Patient_Monitoring_and_IntelliSpace_Event_Management_Interoperability.pdf%3fnodeid%3d8508574%26vernum%3d-2>, pp. 2.
Pretty et al., "Hypoglycemia Detection in Critical Care Using Continuous Glucose Monitors: An in Silico Proof of Concept Analysis", Journal of Diabetes Science and Technology, Jan. 2010, vol. 4, No. 1, pp. 15-24.
Rahmani et al., "Smart e-Health Gateway: Bringing Intelligence to Internet-of-Things Based Ubiquitous Healthcare Systems", 2015 12th Annual IEEE Consumer Communications and Networking Conference (CCNC), Jul. 2015, pp. 826-834.
Rappoport, Arthur E., "A Hospital Patient and Laboratory machine-Readable Identification System (MRIS) Revisited", Journal of Medical Systems, Apr. 1984, vol. 8, Nos. 1/2, pp. 133-156.
Ritchie et al., "A Microcomputer Based Controller for Neuromuscular Block During Surgery", Annals of Biomedical Engineering, Jan. 1985, vol. 13, No. 1, pp. 3-15.
Saager et al., "Computer-Guided Versus Standard Protocol for Insulin Administration in Diabetic Patients Undergoing Cardiac Surgery", Annual Meeting of the American Society of Critical Care Anesthesiologists, Oct. 13, 2006.
Sanders et al., "The Computer in a Programmable Implantable Medication System (PIMS)", Proceedings of the Annual Symposium on Computer Application in Medical Care, Nov. 2, 1982, pp. 682-685.
Schilling et al., "Optimizing Outcomes! Error Prevention and Evidence-Based Practice with IV Medications", A Pro-Ce Publication, Hospira, Inc., Feb. 6, 2012, pp. 56.
Schulze et al., "Advanced Sensors Technology Survey", Final Report, Feb. 10, 1992, pp. 161.
Scott, et al., "Using Bar-Code Technology to Capture Clinical Intervention Data in a Hospital with a Stand-Alone Pharmacy Computer System", Mar. 15, 1996, American Journal of Health-System Pharmacy, vol. 53, No. 6, pp. 651-654.
Sebald et al., "Numerical Analysis of a Comprehensive in Silico Subcutaneous Insulin Absorption Compartmental Model", 31st Annual International Conference of the IEEE Engineering in Medicine and Biology Society, Sep. 2-6, 2009, pp. 3901-3904.
Shabot, M. Michael, "Standardized Acquisition of Bedside Data: The IEEE P1073 Medical InformationBus", International Journal of Clinical Monitoring and Computing, vol. 6, Sep. 27, 1989, pp. 197-204.
Sheppard, Louis, Ph.D., "Automation of the Infusion of Drugs Using Feedback Control", Journal of Cardiothoracic and Vascular Anesthesia, Feb. 28, 1989, vol. 3, No. 1, pp. 1-3.
Sheppard, Louis, Ph.D., "Computer Control of the Infusion of Vasoactive Drugs", Annals of Biomedical Engineering, Jul. 1980, vol. 8, No. 4-6, pp. 431-444.
Sheppard, Louis, Ph.D., "The Application of Computers to the Measurement, Analysis, and Treatment of Patients Following Cardiac Surgical Procedures", The University of Alabama in Birmingham, Oct. 31, 1977, pp. 297-300.
Sheppard, Louis, Ph.D., "The Computer in the Care of Critically Ill Patients", Proceedings of the IEEE, Sep. 1979, vol. 67, No. 9, pp. 1300-1306.
"Sigma Spectrum: Operator's Manual", May 15, 2008, pp. 63. <https://usme.com/content/manuals/sigma-spectrum-operator-manual.pdf>.
"Sigma Spectrum: Operator's Manual", Oct. 2009, pp. 72. <http://static.medonecapital.com/manuals/userManuals/Sigma-Spectrum-Operator-Manual-October-2009.pdf>.
Simonsen, Michael Ph.D., POC Testing, New Monitoring Strategies on Fast Growth Paths in European Healthcare Arenas, Biomedical Business & Technology, Jan. 2007, vol. 30, No. 1, pp. 1-36.
Siv-Lee et al., "Implementation of Wireless 'Intelligent' Pump IV Infusion Technology in a Not-for-Profit Academic Hospital Setting", Hospital Pharmacy, Sep. 2007, vol. 42, No. 9, pp. 832-840. <http://www.thomasland.com/hpj4209-832.pdf>.
Slack, W.V., "Information Technologies for Transforming Health Care", <https://www.andrew.cmu.edu/course/90-853/medis.dir/otadocs.dir/03ch2.pdf>, Ch. 2, 1995, pp. 29-78.
Smith, Joe, "Infusion Pump Informatics", CatalyzeCare: Transforming Healthcare, as printed May 12, 2011, pp. 2.
Sodders, Lisa, "VA Center Keeps Medicine in Right Hands", The Capital-Journal, Dec. 4, 1999, pp. 1-2.
"Software Versioning", Wikipedia.org, dated Oct. 16, 2011 in 11 pages, <https://en.wikipedia.org/w/index.php?title=Software_versioning&oldid=455859110>.
Solapurkar et al., "Building Secure Healthcare Services Using OAuth 2.0 and JSON Web Token in IOT Cloud Scenario", Dec. 2016, 2nd International Conference on Contemporary Computing and Informatics, pp. 99-10.

(56) References Cited

OTHER PUBLICATIONS

Stitt, F.W., "The Problem-Oriented Medical Synopsis: a Patient-Centered Clinical Information System", Proceedings of the Annual Symposium on Computer Application in Medical Care, 1994, pp. 88-92.
Stokowski, Laura A. RN, MS, "Using Technology to Improve Medication Safety in the Newborn Intensive Care Unit", Advances in Neonatal Care, Dec. 2001, vol. 1, No. 2, pp. 70-83.
Sutton et al., "The Syntax and Semantics of the PROforma Guideline Modeling Language", Journal of the American Medical Informatics Association, Sep./Oct. 2003, vol. 10, No. 5, pp. 433-443.
Szeinbach et al., "Automated Dispensing Technologies: Effect on Managed Care", Journal of Managed Care Pharmacy (JMCP), Sep./Oct. 1995, vol. 1, No. 2, pp. 121-127.
Szolovits et al., "Guardian Angel: Patient-Centered Health Information Systems", Technical Report MIT/LCS/TR-604, Massachusetts Institute of Technology Laboratory for Computer Science, May 1994, pp. 39.
"TCG TPM v2.0 Provisioning Guidance", Reference, Version 1, Revision 1, Mar. 15, 2017, pp. 1-43.
Van Den Berghe, M.D., Ph.D., et al., "Intensive Insulin Therapy in Critically Ill Patients", The New England Journal of Medicine, Nov. 8, 2001, vol. 345, No. 19, pp. 1359-1367.
Van Den Berghe, M.D., Ph.D., et al., "Intensive Insulin Therapy in the Medical ICU", The New England Journal of Medicine, Feb. 2, 2006, vol. 354, No. 5, pp. 449-461.
Van Der Maas et al., "Requirements for Medical Modeling Languages", Journal of the American Medical Informatics Association, Mar./Apr. 2001, vol. 8, No. 2, pp. 146-162.
Villalobos et al., "Computerized System in Intensive Care medicine", Medical Informatics, vol. 11, No. 3, 1986, pp. 269-275.
Wilkins et al., "A Regular Language: The Annotated Case Report Form", PPD Inc., PharmaSUG2011—Paper CD18, 2011, pp. 1-9.
Ying et al., "Regulating Mean Arterial Pressure in Postsurgical Cardiac Patients. A Fuzzy Logic System to Control Administration of Sodium Nitroprusside", IEEE Engineering in Medicine and Biology Magazine, vol. 13, No. 5, Nov.-Dec. 1994, pp. 671-677.
Yoo et al., "Code-Based Authentication Scheme for Lightweight Integrity Checking of Smart Vehicles", IEEE Access, 2018, vol. 6, pp. 46731-46741.
Yue, Ying Kwan, "A Healthcare Failure Mode and Effect Analysis on the Safety of Secondary Infusions", Thesis, Institute of Biomaterials and Biomedical Engineering, University of Toronto, 2012, pp. 168.
Yurkonis et al., "Computer Simulation of Adaptive Drug Infusion", IEEE Transactions on Biomedical Engineering, vol. BME-34, No. 8, Aug. 1987, pp. 633-635.
Zakariah et al., "Combination of Biphasic Transmittance Waveform with Blood Procalcitonin Levels for Diagnosis of Sepsis in Acutely Ill Patients", Critical Care Medicine, 2008, vol. 36, No. 5, pp. 1507-1512.
International Search Report and Written Opinion received in PCT Application No. PCT/US2020/026703, dated Jun. 23, 2020 in 17 pages.
International Preliminary Report on Patentability and Written Opinion received in PCT Application No. PCT/US2020/026703, dated Oct. 13, 2022 in 16 pages.
Abbott "Plum A+," System Operating Manual (For use with List 11971-04) in 85 pages, May 2001.
Autoyec 50, from KRZ, Dec. 6, 2007.
B. Braun Medical Inc. Two-Bag Irrigation Set, Two Non-vented Spikes, dated Jul. 2012, in 1 page.
*Baxa Corp*. v. *McGaw Inc*. 981 F. Supp. 1348 (1997), Memorandum Opinion and Order, 14 pages.
BioExpert International Inc., Company overview, credentials for Rabih Jamaleddine, Nabil Kereknawi, and Danica Robillard Corso, copyright 2010 BioExpert International Inc. in 3 pages [retrieved on Jan. 6, 2015; Publication Date Unknown]; accessed on the world wide web at http://bioexpert.ca/about.html.
Burrows, et al., "Intravenous (IV) Fluidmaker IV. A Disposable Device for Preparation of Sterile Water for Injection in a Field Setting," Fort Detrick, US Army Biomedical Research & Development Laboratory, Sep. 1991. https://apps.dtc.mil/dtic/tr/fulltest/u2/a247385.pdf.
Cato (Computer Aided Therapy for Oncology)—Reference Manual—Vienna, May 2005, 255 pgs.
Clearlink Needleless IV Access System, dated Aug. 2007, in 2 pages.
Cytocare, by Health Robotics, Brochure, Date Unknown, downloaded on May 25, 2012 from http://www.health-robotics.com/smartedit/downloads/en/cytocare7.pdf, 6 pages.
Exacta-Mix 2400, from Baxa, which appears to have a date of 2007, 2 pages.
Flickinger, Bruce, "Misperceptions Cloud the Issue of Sterile Drug Compounding," Jun. 2007.
Fox, Brent I., "Pharmacy Automation and Technology: Automated Intravenous Preparation: Robots for the Pharmacy," Hospital Pharmacy, vol. 44, Mar. 2009, pp. 255-257.
Grifols International, S.A., "PHOCUS Rx, Remote IV Compounding Validation" product brochure and "Product Description Sheet" in 13 pages [Publication Date unknown but may be May 29, 2013].
Healthmark, "Hospital Medication Preparation, Packaging and Dispensing" in 1 page [retrieved on Jan. 6, 2015; Publication Date Unknown]; accessed on the world wide web at http://www.healthmark.ca/2-en-Hospital-Medication-Preparation-Packaging-and-Dispensing.html.
Healthmark, "Hospital Medication Preparation, Packaging and Dispensing," Chemo Drug Preparation/Administration in 2 pages [retrieved on Jan. 6, 2015; Publication Date Unknown]; accessed on the world wide web at http://www.healthmark.ca/2-36-88-Chemo-Drug-Preparation-Administration_en.html.
Healthmark, "Hospital Medication Preparation, Packaging and Dispensing," Chemosphere, Sterile Chemo Compounding (Isolator) in 1 page [retrieved on Jan. 6, 2015; Publication Date Unknown]; accessed on the world wide web at http://www.healthmark.ca/2-36-10-ChemoSphere_en.html?ProduitID=244.
Healthmark, "Hospital Medication Preparation, Packaging and Dispensing," Oncology Preparation and Administration in 1 page [retrieved on Jan. 6, 2015; Publication Date Unknown]; accessed on the world wide web at http://www.healthmark.ca/2-36-10-COMPANY-PROFILEHospital-en.html.
Healthmark, "Hospital Medication Preparation, Packaging and Dispensing," Phocus RX (Camera Verification System), Remote Rx Checking of admixtures in 2 pages [retrieved on Jan. 6, 2015; Publication Date Unknown]; accessed on the world wide web at http://www.healthmark.ca/2-36-10-PHOCUS-Rx-Camera-Verification-System-_en.html?ProduitID=229.
Healthmark, "New Product Items" in 1 page [retrieved on Jan. 6, 2015; Publication Date Unknown]; accessed on the world wide web at http://www.healthmark.ca/home.html.
Healthmark, "Introducing the Precifill Dispensing Pump" product brochure in 2 pages [Publication Date Unknown].
Integra Brochure, from Eurospital, Brochure acquired in Mar. 2012.
International Search Report and Written Opinion, re PCT Application No. PCT/US2020/026703, mailed Jun. 23, 2020.
ISO/Tech Design, QC, Canada, "Chemosphere," product brochure, in 2 pages [Publication Date Unknown].
Neo Care Medical Products: Product Catalog, dated Jun. 2008, in 38 pages.
Pinnacle TPN Management System, from B Braun, downloaded May 5, 2009 from http://www.bbraunusa.com/index. cfm?uuid=7386ADF065B05CD0D22AF700339AA4092, 1 page.
"Precifill," Trademark search (TESS) in 1 page, [retrieved on Jan. 6, 2015; Application Filing Date of Sep. 30, 2011]; accessed on the world wide web at http://tmsearch.uspto.gov/bin/showfield?f=doc&state=4807:gz67gx.3.1.
Product detail for "NAMIC® Closed Fluid Systems" from Navilyst Medical, downloaded on May 11, 2010 from http://www.navilystmedical.com/Products/index.cfm/19, 2 pages.

(56) References Cited

OTHER PUBLICATIONS

Product detail for "RapidFill™ Automated Syringe Filler," from Baxa, downloaded on Mar. 31, 2010 from http://www.baxa/com/PharmacyProducts/AutomatedFillingSystems/ProductDetail/?id=B1, 2 pages.
Product detail for "Summit Medical DirectFlow" micro infusion extension set from Summit Medical Technologies, downloaded on May 10, 2010 from http://summitmedtech.com/p6line.php, 1 page.
Riva, downloaded in Apr. 2009 from http://www.rivasystem.com, 6 pages.
SmartSite Safety Disposables, with copyright notice dated 2004.
Smith, "Lifesaving Cancer Drugs May Put Workers' Lives at Risk," downloaded on Jul. 12, 2010 from http://www.msnbc.msn.com/id/38114586/ns/health-cancer, 7 pages.
Spiros—Closed Male Connector, published Jan. 22, 2008.
Technical Data sheet for Analog Amplifiers Type VA, models V8-C and V8-D, STM Sensors dated Dec. 2007, 4 pages.
Technical Data sheet for Through Beam Sensors Type G2, 1480 nm, STM Sensors dated Dec. 2009, 2 pages.
Technical Data sheet for Through Beam Sensors Type G2, 645 nm, STM Sensors dated Sep. 2008, 2 pages.
User Guide for medOC 1xx Basic, Neo Care Medical Products GmbH, Version Jun. 2008, 23 pages.
User Manual for medOC 3xx /6xx /8xx, Neo Care Medical Products GmbH, Version May 2008, 44 pages.

SYSTEMS, METHODS, AND COMPONENTS FOR TRANSFERRING MEDICAL FLUIDS

CROSS-REFERENCE TO RELATED APPLICATIONS

This application is a division of U.S. patent application Ser. No. 16/840,010, filed on Apr. 3, 2020, and issued as U.S. Pat. No. 11,590,057 on Feb. 28, 2023, the entire contents of which are incorporated by reference herein and made a part of this specification.

BACKGROUND

Field

This disclosure relates generally to medical fluid transfer systems, methods, and components; and specifically to electronically controlled medical fluid transfer systems, methods, and components.

Description of the Related Art

Many types of medical fluids are routinely used to treat patients, including chemotherapy drugs, antibiotics, immunosuppressive drugs, antiviral drugs, hydrating fluids, nourishing fluids, anticoagulants, pain management drugs, contrast fluids for medical imaging, etc. All of these fluids, in turn, come in many different varieties with advantages and disadvantages for various types of diseases, conditions, injuries, or therapies. Moreover, particular patients require optimized dosages, concentrations, and combinations of these drugs or other medical fluids to address their specific medical needs. As a result, medical facilities are required to provide many different types of customized medical fluids on a continual basis to meet individual patient needs.

SUMMARY

In some embodiments, an electronic medical fluid transfer device is provided. The electronic medical fluid transfer device may comprise one or more supports configured to receive a fluid transfer module comprising a first inlet fluid connector, a second outlet fluid connector, a multidirectional flow control valve, and an intermediate container or pumping region. The electronic medical fluid transfer device may comprise a sensor configured to detect whether a cavitation is present (e.g., one or more regions of at least one of a vacuum, a partial vacuum, or a gas such as air) in the fluid transfer module. The electronic medical fluid transfer device may comprise a first electromechanical driver configured to interface with and control the multidirectional flow control valve on the fluid transfer module. The electronic medical fluid transfer device may comprise a second electromechanical driver configured to be mechanically linked to and control the intermediate container or pumping region according to an operational parameter. The electronic medical fluid transfer device can include one or more sensors or monitors configured to determine the position of each of the first and/or second electromechanical drivers, and/or an amount of energy, force, or torque required to actuate or move each of the first and/or second electromechanical drivers, and/or any other information relating to the performance of the electronic medical fluid transfer device. In some embodiments, a sensor can be configured to capture and transmit information about one or more physical characteristics of a system or device, including one or more physical characteristics measured or calculated during use; and a monitor can be configured to record and store one or a series of commands, instructions, and/or process steps over time received by or given to any component or subsystem of the electronic medical fluid transfer device and any feedback provided by such component or subsystem. The electronic medical fluid transfer device may comprise one or more computer processors configured to communicate electronically with the one or more sensors or monitors and the first and second electromechanical drivers to determine one or more of the operational parameters of the electronic medical fluid transfer device based on a flow characteristic of medical fluid to be transferred, and to dynamically adjust one or more of the operational parameter based on one or more outputs of the one or more sensors or monitors.

In some embodiments, an electronic medical fluid transfer system is provided. The electronic medical fluid transfer system may comprise one or more supports configured to receive a fluid transfer module comprising a first inlet fluid connector, a second outlet fluid connector, a multidirectional flow control valve, and an intermediate container or pumping region. The electronic medical fluid transfer system may comprise a camera configured to capture an image of the intermediate container or pumping region. The electronic medical fluid transfer system may comprise a first electromechanical driver configured to interface with and control the multidirectional flow control valve on the fluid transfer module. The electronic medical fluid transfer system may comprise a second electromechanical driver configured to be mechanically linked to and control the intermediate container or pumping region according to an operational parameter. The electronic medical fluid transfer system may comprise one or more computer processors configured to communicate electronically with the first and second electromechanical drivers to transfer medical fluid to and from the intermediate container or pumping region. The electronic medical fluid transfer system may comprise a user interface configured to communicate electronically with the camera to determine an augmentation to be applied to the image based at least partly on a volume of medical fluid transferred to the intermediate container or pumping region, and display the image with the augmentation.

BRIEF DESCRIPTION OF THE DRAWINGS

Embodiments will now be described with reference to the following drawings, which are provided by way of example, and not limitation. Like reference numerals indicate identical or functionally similar elements.

DETAILED DESCRIPTION OF ILLUSTRATIVE EMBODIMENTS

Various systems, methods, and components can be used in different embodiments of the inventions. Some embodiments are illustrated in the accompanying figures; however, the figures are provided for convenience of illustration only, and should not be interpreted to limit the inventions to the particular combinations of features shown. Rather, any feature, structure, material, step, or component of any embodiment described and/or illustrated in this specification can be used by itself, or with or instead of any other feature, structure, material, step, or component of any other embodiment described and/or illustrated in this specification. Nothing in this specification is essential or indispensable.

Figure 1A:
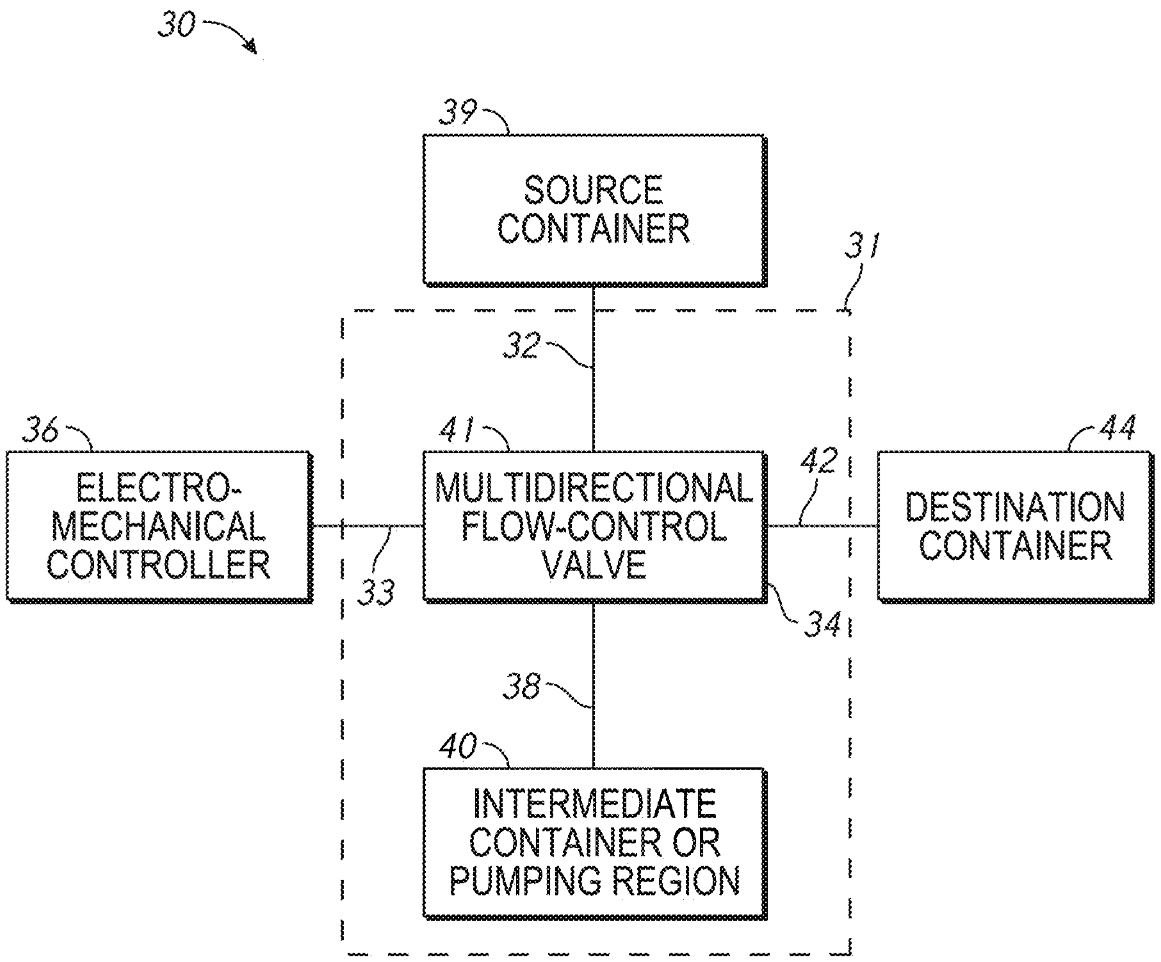
FIG. 1A is a schematic illustration of an example of a fluid transfer device removably attached to and/or in selective communication with other components of a fluid transfer system.

FIG. 1A is an example of a schematic illustration of a fluid transfer device 30 removably attached to and/or in selective communication with other components of a fluid transfer system. In some embodiments, a fluid transfer device 30 can comprise a source container 39, a fluid transfer module 31, an electromechanical controller 36, and a destination container 44. The source container 39 and the fluid destination container 44 can each comprise any suitable device for holding or supplying medical fluids, such as a vial, a bottle, a bag, a hose, a tube, a tank, a canister, etc. In some embodiments, the fluid destination container 44 is a type of container that is selected to be particularly well suited in size and structure for easy and convenient storage or transportation from a fluid transfer station to a patient treatment location, such as an intravenous fluid storage bag or IV bag, to provide an individual-patient, single-dosage supply of medical fluid. In some embodiments, the source container 39 is a type of container that is sufficiently large to provide multiple single-patient doses to be transferred into multiple destination containers 44 (either serially or in parallel). Some examples of fluid transfer devices 30 are illustrated and described in U.S. Pat. Nos. 8,522,832; 9,883,987B2; PCT International Application No. US2015/040174; and U.S. Pat. No. 9,849,236, all of which are incorporated by reference in their entireties and made a part of this specification, and any feature, structure, material, step, or component of any embodiment described and/or illustrated in any of these can be used with or instead of any other feature, structure, material, step, or component of any embodiment described and/or illustrated elsewhere in this specification.

The fluid transfer module 31 can comprise a multidirectional flow-control valve 41 and an intermediate container or pumping region 40, as well as any connector(s) and/or conduit(s) that may extend between or among these or any other components of the fluid transfer module 31, and/or any connectors and/or conduits that may extend between or among the fluid transfer module 31 and the source container 39 and/or the destination container 44. For example, the fluid transfer module 31 can comprise an inlet fluid connector 32 and tubing that can be configured to removably attach the multidirectional flow-control valve 41 to the source container 39; and/or the fluid transfer module 31 can comprise an outlet fluid connector 42 and tubing that can be configured to removably attach the multidirectional flow control valve 41 to the destination container 44.

As shown in FIG. 1A, the fluid transfer module 31 can comprise an intermediate fluid connector 38 that fluidly connects the multidirectional flow-control valve 41 and the intermediate container or pumping region 40. In some embodiments, the intermediate fluid connector 38 is a conduit and/or a tube attached by an appropriate permanent, fluid-tight method (e.g., adhesive, bonding, ultrasonic welding, etc.) between the multidirectional flow-control valve 41 and the intermediate container or pumping region 40. The intermediate container or pumping region 40 can comprise any suitable container or region that is configured to hold and measure fluids and/or to assist in providing an impetus for fluid-flow along a fluid conveying path. For example, in some embodiments, the intermediate container or pumping region 40 can be a syringe or a region of a conduit that is configured to interface with a peristaltic pump, or any other suitable intermediate device. Not all fluid transfer modules 31 will include all of the components or features illustrated or described in this specification; rather, one or more components or features can be omitted in any suitable embodiment.

The multidirectional flow-control valve 41 can be configured to mechanically attach to or interface with the electromechanical controller 36. For example, in some embodiments, the multidirectional flow-control valve 41 can comprise a driving interface 33 that is configured to attach with and/or interface with a corresponding electromechanical driver (see, e.g., FIGS. 2A and 2D) of the electromechanical controller 36. The electromechanical controller 36 can actuate the multidirectional flow-control valve 41 under the control of one or more algorithms or instructions provided by a computer processor or a plurality of computer processors in the fluid transfer management system 74 (see FIG. 1B) that is or are configured to send one or more electronic signals to the electromechanical controller 36 to select among a plurality of functional positions on the multidirectional flow-control valve 41; however, any suitable computer processing arrangement capable of controlling the multidirectional flow-control valve 41 can be used and is envisioned and contemplated herein. Any disclosure in this specification of a single computer processor applies to and can be used with a plurality of computer processors.

In some embodiments, the multidirectional flow-control valve 41 can comprise a stopcock with a plurality of functional positions, such as a first position that enables fluid communication between the outlet fluid connector 42 and the intermediate container or pumping region 40 (but not the inlet fluid connector 32, in some embodiments); a second position that enables fluid communication between the inlet fluid connector 32 and the intermediate container or pumping region 40 (but not the outlet fluid connector 42, in some embodiments); and a third position that enables fluid communication between the outlet fluid connector 42 and the inlet fluid connector 32 (but not the intermediate container or pumping region 40, in some embodiments). For example, in some embodiments, when the stopcock is in the first position, fluid can flow from the intermediate container or pumping region 40 to the destination container 44 or vice versa; when the stopcock is in the second position, fluid can flow from the source container 39 to the intermediate container or pumping region 40 or vice versa; and when the stopcock is in the third position, fluid can flow from the source container 39 to the destination container 44 or vice versa. Further, in some embodiments, when the stopcock is in the first position, the intermediate fluid connector 38, the stopcock, and the outlet fluid connector 42 can comprise at least a portion of a flow path between the intermediate container or pumping region 40 and the destination container 44; when the stopcock is in the second or fourth position, the inlet fluid connector 32, the stopcock, and the intermediate fluid connector 38 can comprise at least a portion of a flow path between the source container 39 and the intermediate container or pumping region 40; and when the stopcock is in the third position, the inlet fluid connector 32, the stopcock, and the outlet fluid connector 42 can comprise at least a portion of a flow path between the source container 39 and the destination container 44. In some embodiments, the stopcock can comprise at least a portion of one or more flow paths between or among two or more containers (e.g., the source container 39, the intermediate container or pumping region 40, and/or the destination container 44) without the use of any connectors (e.g., the inlet fluid connector 32, the intermediate fluid connector 38, and/or the outlet fluid connector 42) when in the first, second, third, and/or fourth position. Other arrangements that can be used are also appreciated and contemplated herein, including, for example, stopcocks configured to have more or less than three positions (e.g., stopcocks configured to have 2, 4, 5, or more positions).

In some embodiments, the fluid transfer module 31 can be a single-use or limited-use, disposable device that is configured to be periodically removed from and replaced within the fluid transfer device 30, such as after a single dosage of medication for a particular patient has been transferred and/or after one particular type of medication has passed through the fluid transfer module 31 (e.g., to avoid mixing of medications when not desired).

Figure 1B:
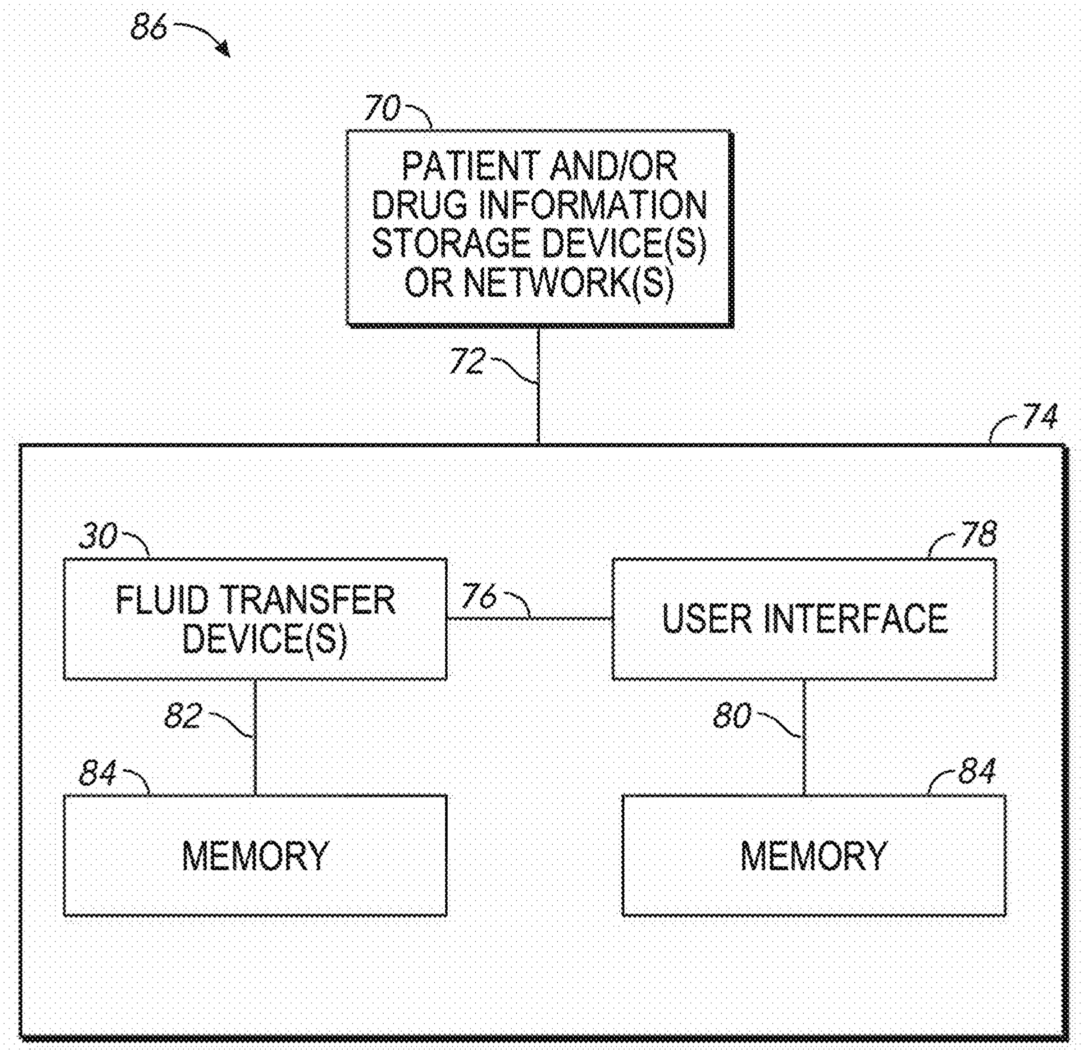
FIG. 1B is a schematic illustration of an example of a system for transferring medical fluid that includes the fluid transfer device of FIG. 1A.

FIG. 1B is a schematic illustration of a fluid transfer system 86 for transferring medical fluid that includes the fluid transfer device 30 of FIG. 1A, according to some embodiments. For example, as shown in FIG. 1B, one or more fluid transfer devices 30 can form part of a fluid transfer system 86 that can include one or more of the following components that can be selectively positioned in electronic communication between or among each other: one or more electronic patient and/or drug information storage devices or networks 70; one or more fluid transfer management systems 74 comprising one or more fluid transfer devices 30, a user interface 78, and/or one or more memories 84. In some embodiments, the one or more electronic patient and/or drug information storage devices or networks 70 can be physically remote from the fluid transfer management system 74. For example, in a health clinic or hospital, the one or more electronic patient and/or drug information storage devices or networks 70 can comprise a remote patient information management system with a database that can be queried to provide information about a particular patient's needs for medical fluids (e.g., a drug prescription) that may include the type, dosage, lot number, expiration date, and/or concentration of one or more drugs or other medical fluids to be provided to a patient, and/or identifying information regarding one or more health care provider who prescribed, requested, and/or filled the destination container, and/or the time and/or date associated with any or all of these activities. Any medical information, such as any of the foregoing medical information, can be provided by the one or more fluid transfer devices 30 for recording and storage in the patient information management system.

The various components of the fluid transfer system 86 can communicate between or among themselves in any suitable manner. For example, as illustrated, the one or more patient and/or drug information storage device(s) or network(s) 70 can electronically communicate with the fluid transfer management system 74, or any components thereof, by way of an electronic communication link 72, formed by any suitable electronic communication device, such as a wired connection, a local area network, a wide area network, the Internet, and/or a wireless connection (including, e.g., Wi-Fi, Bluetooth, Ant+, ZigBee, cellular, etc.), or any other electronic communication device (collectively referred to as "electronic communicators"). As shown in FIG. 2E, the fluid transfer management system 74 may comprise a wireless communication console 299, such as a Wi-Fi transceiver that is configured to send and/or receive data, including patient data, data regarding a fluid transfer, data regarding the type, dosage, concentration, volume, image, technician, physician, and/or time of a fluid transfer, and/or data to control the electronic fluid transfer system 86, etc. The fluid transfer device 30 can communicate with a memory 84 by any suitable electronic connection, such as a wired connection, or any other electronic communicators. In some embodiments, the memory 84 is part of the fluid transfer device 30, in that a common housing is provided for containing or supporting both.

The user interface 78 can communicate with one or more fluid transfer devices 30 and/or with one or more patient and/or drug information storage device(s) or network(s) 70 by way of any suitable electronic communication device 76, including by way of any wireless device or by way of any other of the electronic communicators. In some embodiments of the fluid transfer management system 74 in which there are multiple fluid transfer devices 30, a single user interface 78 can electronically communicate with a plurality of fluid transfer devices 30 to control and/or monitor multiple fluid transfers operating generally simultaneously or generally in parallel. In some embodiments of the fluid transfer management system 74 in which there are multiple fluid transfer devices 30, one or more user interfaces 78 can electronically communicate with a plurality of fluid transfer devices 30 to control and/or monitor multiple fluid transfers operating generally simultaneously or generally in parallel. The user interface 78, like the fluid transfer device 30, can electronically communicate with or include a memory 84 by way of a wired connector 80 or any other of the electronic communicators. The memory 84 of the user interface 78 can be part of the user interface 78 in that a common housing can be provided for containing or supporting both. Each of the components of the fluid transfer management system 74 as shown in FIG. 1B (e.g., the fluid transfer device(s) 76, the user interface 78, and the memory or memories 84) can be provided in a single housing, or can be provided as discrete components or discrete collections of components.

Figure 2A:
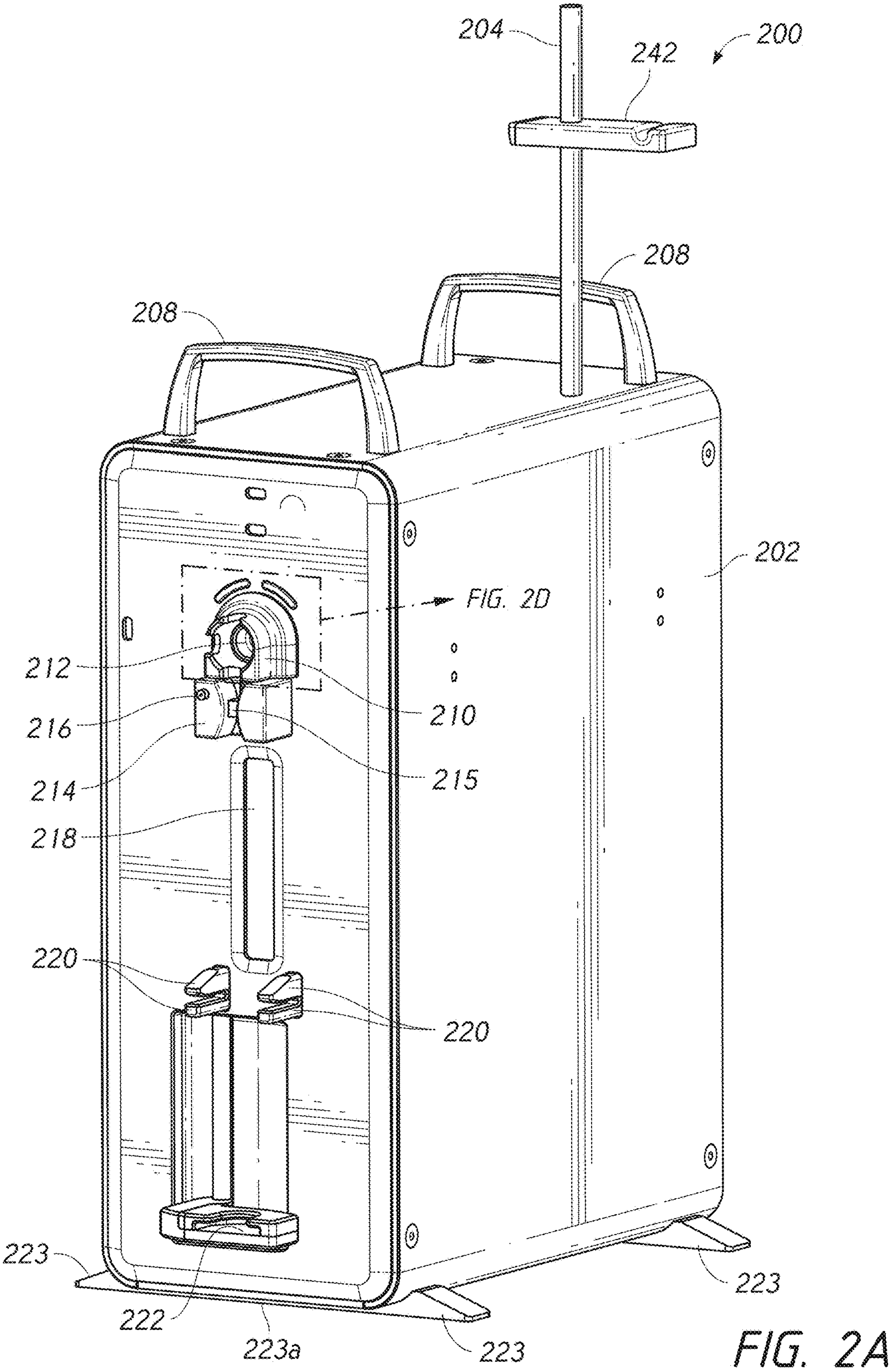
FIG. 2A is a front perspective view of an example of an electromechanical system for transferring medical fluid.
Figure 2B:
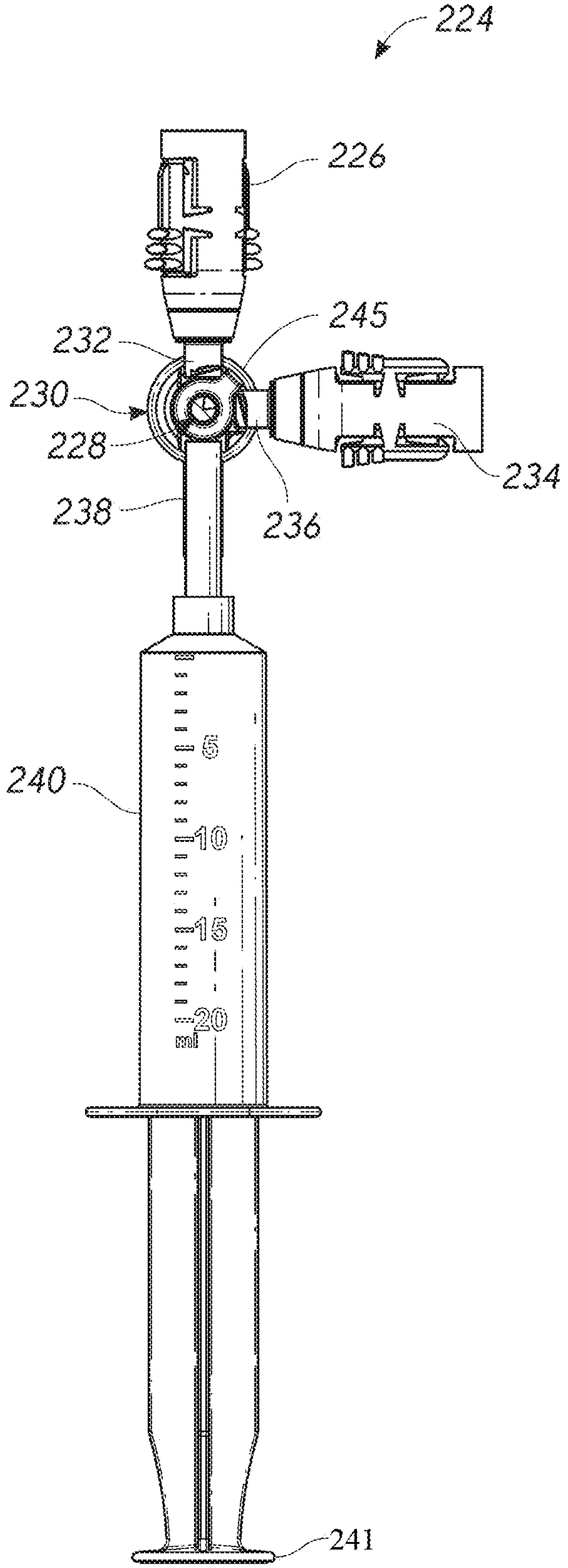
FIG. 2B is a rear view of an example of a fluid transfer device.
Figure 2C:
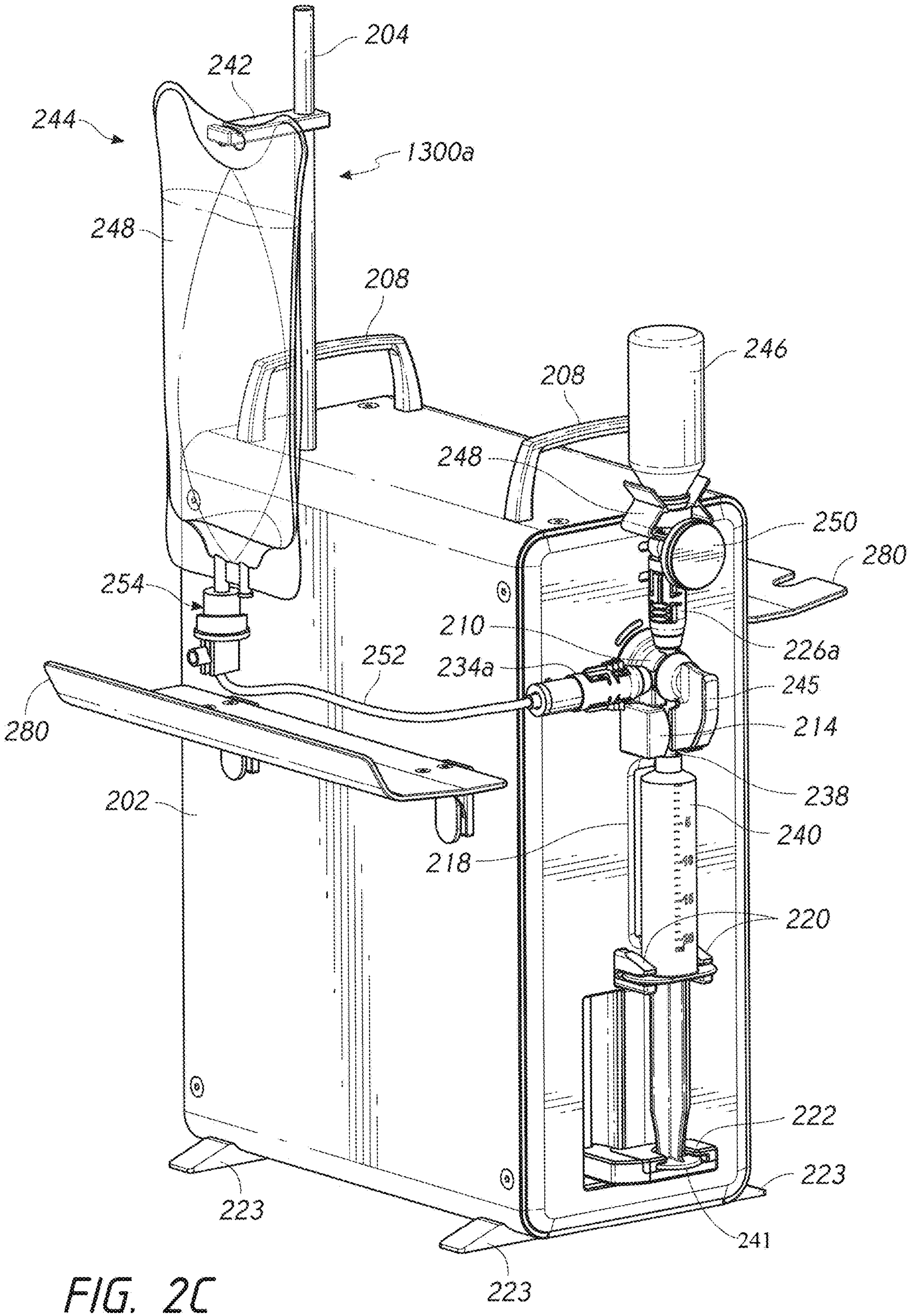
FIG. 2C is a front perspective view of the electromechanical system for transferring medical fluid of FIG. 2A with the fluid transfer device of FIG. 2B attached to it.
Figure 2D:
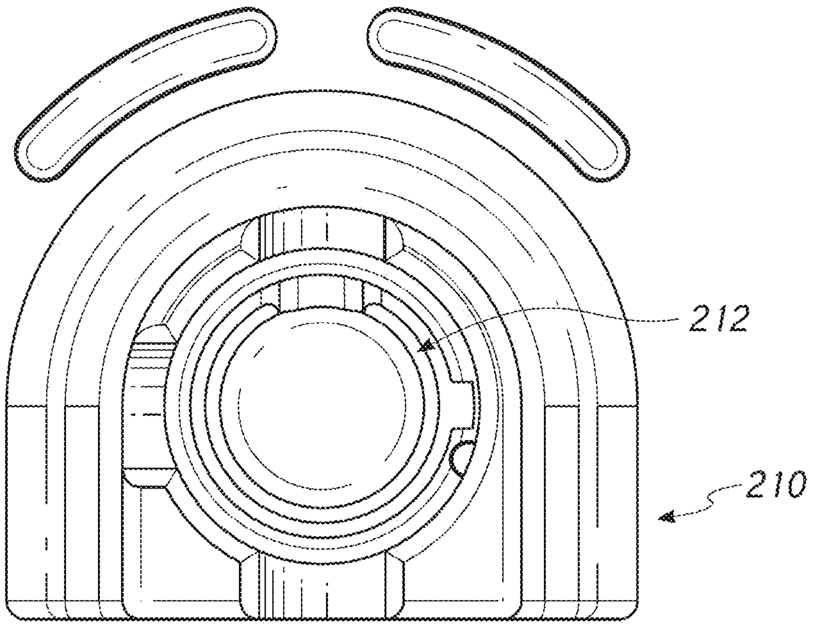
FIG. 2D is a magnified partial front view of the electromechanical system of FIG. 2A which illustrates an example of a driver.
Figure 2E:
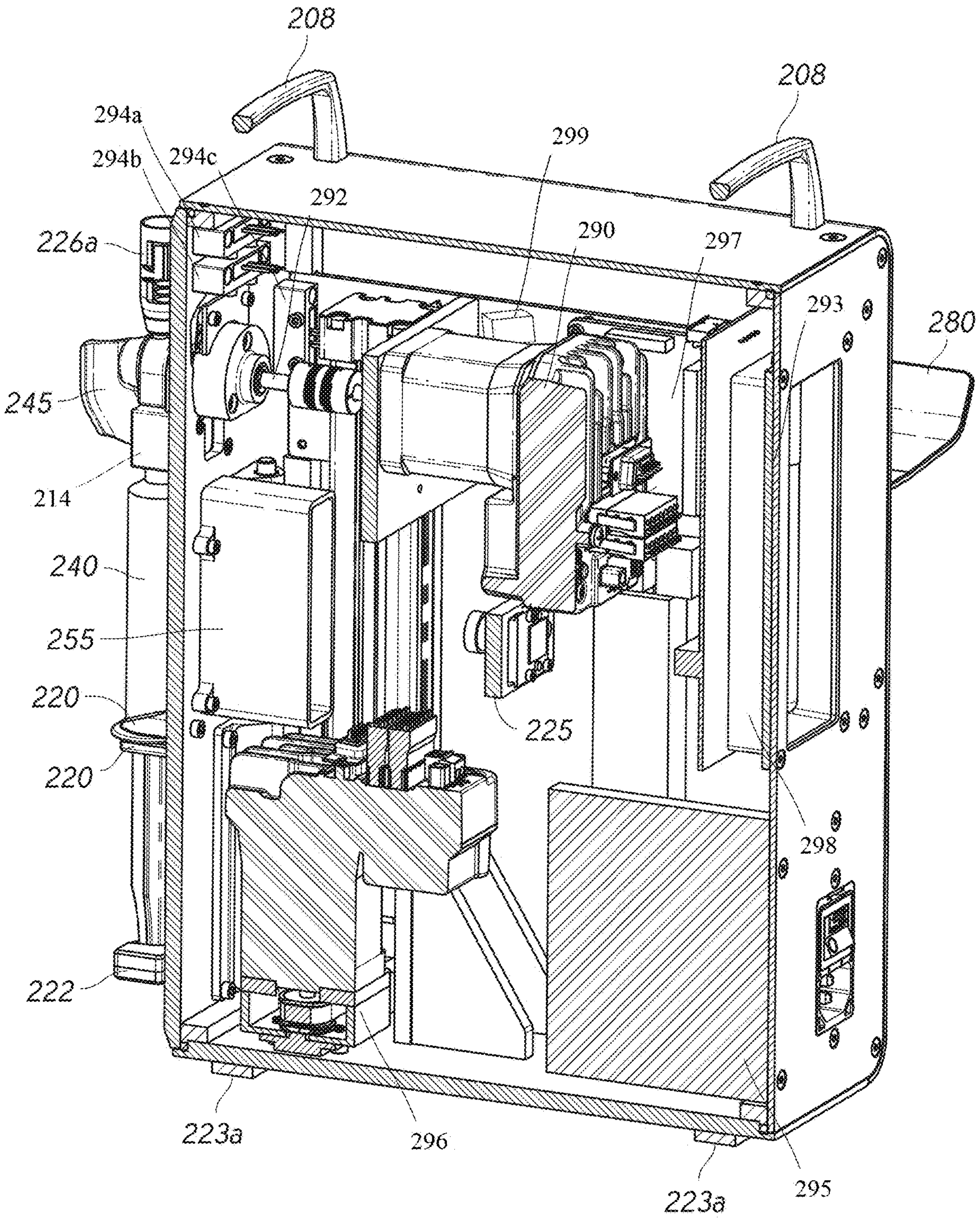
FIG. 2E is a rear perspective cross-sectional view of the electromechanical system and fluid transfer device shown FIG. 2C.

FIGS. 2A-2D illustrate various features, components, and arrangements that can be included in some embodiments of the fluid transfer device 30 and fluid transfer module 31 shown in FIG. 1A and the fluid transfer management system 74 shown in FIG. 1B. As will be described in more detail below, FIG. 2A illustrates an example of an electromechanical system 200 (also referred to as a fluid transfer unit 200); FIG. 2B illustrates an example of a fluid transfer module 31 in the form in this example of a fluid pump assembly 224; FIG. 2C illustrates the fluid pump assembly 224 of FIG. 2B removably attached to the fluid transfer unit 200 of FIG. 2A; and FIG. 2D illustrates an example of a portion of an electro-mechanical controller 36 in the form in this example of a driver 212. Unless otherwise noted, like reference numerals among FIGS. 2A-2D indicate identical or functionally and/or structurally similar elements, and reference numerals in the below discussion corresponding to elements labeled in FIGS. 1A and 1B refer to elements that are the same as or generally similar to the elements of FIGS. 1A and 1B.

Turning to FIG. 2A, this figure illustrates an example of a portion of a fluid transfer management system 74 with a remote user interface 78, as identified in FIG. 1B. For example, in some embodiments, FIG. 2A illustrates a front perspective view of a fluid transfer unit 200 for transferring medical fluid. In some embodiments, the fluid transfer unit 200 is an example of a portion of the fluid transfer device 30 shown in FIG. 1A or the fluid transfer system 86 shown in FIG. 1B. As shown in the figures, the fluid transfer management system 74 can comprise a fluid transfer unit 200 that comprises a housing 202, one or more carrying handles 208, one or more base supports 223, a destination-container support (e.g., a generally vertical pole stand 204 and/or a generally horizontal support arm 242), and one or more supports configured to receive and retain at least a portion of the fluid transfer module 31 (e.g., the intermediate container or pumping region 40). In some embodiments, the supports can include one or more protruding holders 220, one or more receptacles 218 (such as a recess 218, as illustrated); one or more sensor devices 214 with one or more channels that include one or more sensors 215; one or more movable platforms 222 for receiving at least a portion of the fluid transfer module 31 and/or for facilitating the transfer of fluid; and/or one or more attachment regions 210 for attaching to or receiving a multidirectional flow-control valve 41. As will be described in more detail below, the fluid transfer device 30 or the fluid transfer unit 200 can include a driver 212, which can form part of the electro-mechanical controller 36 of FIG. 1A, and the one or more sensor devices 214 can include one or more indicators 216. The one or more base supports 223 can be attached to or integrally formed with the housing 202 to help stabilize the fluid transfer unit 200 (e.g., to help prevent it from tipping over). Although the one or more base supports 223 are shown extending across an underside of the housing 202, in some embodiments the one or more base supports may not extend across the underside.

In some embodiments, at least one or more portions of the housing 202, such as the one or more receptacles 218 (e.g., the recess 218 illustrated in FIG. 2A), can be transparent to enable one or more measuring instruments positioned inside of the housing 202 to capture an image or other data on the outside of the housing. For example, a volume sensor (see FIG. 2E) can determine the volume of liquid being transferred to one or more containers (e.g., source container 39, intermediate container or pumping region 40, and/or destination container 44). For example, in some embodiments, the volume sensor can be configured to sense the volume in the intermediate container or pumping region 40 through the transparent recess 218. It will be understood that this same volume sensor or one or more other volume sensors can be configured to sense the volume of one or more other containers in addition to or in lieu of the intermediate container or pumping region 40 (e.g., the source container 39 and/or the destination container 44, among others), for example, through one or more transparent receptacles 218 and/or through one or more other sections of the housing 202 that are transparent. The volume sensor can comprise, for example, any appropriate sensor or combination of sensors to provide information about the volume of the liquid in a container, such as an optical sensor (e.g., a camera or a break-beam sensor), an infrared sensor, an acoustic sensor (e.g., an ultrasonic sensor), and/or a mass or weight sensor, among others.

The volume sensor can be used, for example, to control and/or to provide a record of the volume and/or type of fluid transferred to a patient, such as, for example, by sensing and/or recording the volume and/or one or more other characteristics (e.g., color, viscosity, concentration, lot number, expiration date, etc.) of the liquid in a container (e.g., the intermediate container, or pumping region 40, and/or the source container 39 and/or the destination container 44) before, during, and/or after it is transferred to a patient. For example, in some embodiments, a camera can be used to capture an image of the intermediate container or pumping region 40 to confirm or measure the volume therein. A data file can then be created and stored in a memory 84 which has one of more items of information, such as patient identifying information, the date and time the liquid was transferred and/or the volume or other characteristic(s) of the liquid was or were confirmed and recorded, the type (name, brand, and/or concentration, etc.) of medical fluid transferred, the volume of medical fluid transferred, and/or one or more images of the intermediate container or pumping region 40 with liquid inside, etc. The same or a similar data file can be created for any one of the suitable volume sensors described above. In some embodiments, the fluid transfer unit 200, the fluid transfer device 30, and/or the fluid transfer system 86 can include one or more measuring instruments, such as one or more volume sensors. In some embodiments, the one or more measuring instruments or volume sensors can be internal and/or external to the fluid transfer unit 200, or partially external and partially internal, such as when a portion of the instrument or sensor is inside of the housing 202 and a portion of the sensor protrudes from the housing 202.

FIG. 2B illustrates a rear view of an example of a fluid transfer module 31 of FIG. 1A in the form in this example of a fluid pump assembly 224, such as a multi-stroke fluid pump assembly 224. As shown in the figures, in some embodiments, the fluid pump assembly 224 comprises: an inlet fluid connector 32 in the form in this example of a conduit 232 and a selectively openable and closeable fluid connector 226; a multidirectional flow-control valve 41 in the form in this example of a fluid stopcock 230; an outlet fluid connector 42 in the form in this example of a conduit 236 and a selectively openable and closeable fluid connector 234; and an intermediate container 40 in the form in this example of a syringe pump 240 that is attached (e.g., bonded) to the fluid stopcock 230 via a conduit 238. The fluid pump assembly 224 can be a limited-use or single-use, disposable device that is configured to be routinely removed, discarded, and replaced with a new disposable device in position on the fluid transfer unit 200.

A multidirectional flow-control valve 41, such as a fluid stopcock 230, can be particularly useful in some embodiments because it can permit variability and control of the direction and/or orientation of the fluid pathway within the fluid transfer module 31. In some embodiments, the flow-control valve 41 can be configured, as illustrated throughout this specification, to selectively enable a plurality of discrete settings, each setting enabling fluid connections within the fluid pathway of the fluid transfer module 31 among two or more different components of the fluid transfer module 31, and closing-off or isolating one or more other fluid connections of one or more other components from the fluid pathway of the fluid transfer module 31. The flow-control valve 41 can be configured to change between the plurality of discrete settings.

In some embodiments, as illustrated, such change or changes of settings or connections within the flow-control valve 41 can be accomplished electronically and independently of changes to fluid pressure within the fluid transfer module 31. For example, in some embodiments, a pressure differential can arise between two or more parts or components of the fluid transfer module 31 without causing any change of connections within the fluid transfer module 31 and/or without enabling fluid communication between different portions of the fluid transfer module 31 that, before such pressure differential, were not previously in fluid communication with each other.

In some embodiments, the multidirectional flow-control valve 41 is not a one-way valve or a series of one-way valves; rather, the multidirectional flow-control valve 41, in each particular electronically selectable setting, can provide a full two-way fluid pathway between two or more components of the fluid transfer module 31. For example, in some embodiments, in one or a plurality of discrete, electronically selectable settings, the flow-control valve 41 can provide a two-way fluid pathway between the inlet fluid connector 226 and the outlet fluid connector 234; and/or a two-way fluid pathway between the inlet fluid connector 226 and the intermediate container 40 or syringe pump 240; and/or a two-way fluid pathway between the intermediate container 40 or syringe pump 240 and the outlet fluid connector 234. In some embodiments, the multidirectional flow-control valve 41 can enable fluid withdrawn from a source container 39 to be partially or fully returned to a source container 39, in some situations, which can be particularly advantageous, such as, for example, during priming and/or purging of a fluid transfer module 31, although other situations in which this type of fluid flow are also contemplated and can be used.

In some embodiments, either or both of the fluid connectors 226, 234 can be industry standard medical connectors (e.g., luer connectors complaint with ISO 594 or compliant with any other industry standard) that are resealable and fluid-tight, such as the Clave® female medical connector or the Spiros® male medical connector or either of the male or female sides of a Chemolock® medical connector system, all sold by ICU Medical, Inc. Examples of embodiments of these and other devices, among many others, that can be used as fluid connectors 226, 234, or as any portions thereof, are included in U.S. Pat. Nos. 5,873,862; 7,998,134; and 9,933,094, all of which are incorporated by reference in this specification in their entireties. Any feature, structure, material, step, or component described and/or illustrated in any of the foregoing patents or published application can be used with or instead of any feature, structure, material, step, or component described and/or illustrated in any other portion of this specification.

In some embodiments, the fluid stopcock 230 can comprise a device that selectively permits fluid communication between and/or among multiple apertures and/or channels in the stopcock 230. For example, as shown in FIG. 2B and as described above, the fluid stopcock 230 can selectively permit fluid communication between any two of the inlet fluid connector 226, the outlet fluid connector 234, and the intermediate container 40 or syringe pump 240. The selection between and/or among the multiple apertures and/or channels in the stopcock 230 can be accomplished by actuating the stopcock 230, such as by utilizing an electromechanical controller 36 in the fluid transfer unit 200 to actuate a driving interface 33 on the stopcock 230, such as in the form in this example of a rotatable actuator 228. As described above, the electromechanical controller 36 can be controlled by sending one electronic signal or a series of electronic signals from one or more computer processors associated with the fluid transfer device 30. As shown in FIG. 2B, the rotatable actuator 228 can include one or more recesses and/or protrusions that are configured to interface with a driver 212 of a fluid transfer unit, such as a driver 212 that includes one or more recesses and/or protrusions that comprise one or more shapes that are complementary with or generally match or correspond with the recesses and/or protrusions of the actuator 228. As shown in FIG. 2E, the driver 212 may be controlled via a driver motor 290 and driver shaft 292. The electromechanical controller 36 may send a signal activating driver motor 290 and driver shaft 292 to initiate driver 212 movement, and/or to continue and/or stop driver 212 movement. When a rotatable actuator 228 interfaces with the driver 212, the driver 212 may allow the electromechanical controller to select between and/or among the multiple apertures and/or channels in the stopcock 230. As in every embodiment in this specification, any component, structure, feature, or step that is illustrated and/or described in connection with FIG. 2E (including the internal components) can be used with or instead of any component, structure, feature, or step that is illustrated and/or described in connection with any other figure or embodiment in this specification.

FIG. 2D is a magnified partial front view of the fluid transfer unit 200 of FIG. 2A, which illustrates an attachment region 210 and the recesses and/or protrusions of the driver 212, according to some embodiments. However, it will be understood that many different types and/or patterns of recesses and/or protrusions can be used, depending, for example, upon functional and aesthetic preferences. In some embodiments, one or more of the types and/or patterns of recesses and/or protrusions, and/or one or more of the types of materials (such as a tacky or slide-resistant material with a high coefficient of friction) can provide resistance to rotational disengagement or slipping during actuation.

Returning to FIG. 2B, this figure also illustrates an example of a syringe pump 240. In some embodiments, the syringe pump 240 includes an actuator, such as an actuating stem 241, that can be reciprocated back-and-forth or up-and-down to move an internal plunger, thereby decreasing or increasing the fluid-carrying volume inside of the syringe pump 240. A first stroke of the multi-stroke fluid pump assembly 224 in the form in this example of a syringe pump 240 can be accomplished by drawing the actuating stem 241 at least partially out of the body of the syringe pump 240, thereby drawing fluid into the syringe pump 240, and then reversing the direction of the syringe pump 240, pushing the actuating stem 241 back toward the body of the syringe pump 240, thereby expelling the drawn-in fluid out of the syringe pump 240.

In some embodiments, as shown, for example, in FIG. 2B, the conduit 238 of the multi-stroke pump assembly 224 can be longer than the conduits 232, 236 extending between the fluid stopcock 230 and the fluid connectors 226, 235. The conduit 238 can be permanently coupled to the fluid stopcock 230 on one end, and to the syringe pump 240 on the other end. Other arrangements are also contemplated and can be used.

As illustrated, in some embodiments, the fluid transfer module 31 (such as the fluid pump assembly 224) can form part of or constitute a closed system, in that: (i) liquid, or fluid, and/or vapors contained or sealed within the fluid transfer module 31 are prevented from exiting or escaping from the fluid transfer module 31, and/or (ii) the exiting or escaping of liquid, or fluid, and/or vapors is resisted in a clinically significant manner to diminish or avoid one or more clinical risks or negative outcomes, when the fluid transfer module 31 is disconnected from other components of the fluid transfer device 30. As shown, in some embodiments, the entire fluid pathway within the fluid transfer device 30 can constitute a closed system or a seal system. As used in this specification, the term “closed system” or “sealed” or any similar terms are used in accordance with their customary meanings in the field of medical infusion, and these terms include the requirement that fluids stay inside of the fluid transfer module 31 or the fluid transfer device 30 (or components thereof) under normal conditions or use such that any small amount of escaping fluid or vapors would not have any significant adverse clinical effects under normal conditions or use. In some embodiments, as shown in FIGS. 1A and 2B, the fluid transfer module 31 can be automatically closeable and resealable at each terminal end of the module 31 (e.g., at the inlet fluid connector 32, at the intermediate fluid connector 38, and/or at the outlet fluid connector 42). When either or both of the fluid transfer module 31 and/or the fluid transfer device 30 are sealed and/or constitute part of a closed system, the risk of ingress of harmful substances (e.g., bacteria or viruses or other microbes) into the fluid pathway is diminished, and the risk of egress of harmful substances (e.g., chemotherapy or immunosuppressive drugs) from the fluid transfer device 30 or the fluid transfer module 31 into the surrounding environment of a healthcare facility is diminished.

FIG. 2C is a front perspective view of another type of fluid transfer module 31 that is removably attached to the fluid transfer unit 200 of FIG. 2A. The fluid transfer module 31 is identical to the fluid pump assembly 224 of FIG. 2B, except that Chemolock connectors 234*a*, 226*a* are used rather than Spiros connectors, in this example. Any suitable type of connector or combination of connectors can be used. As illustrated in FIG. 2C, the fluid transfer module 31 (also referred to as a multi-stroke fluid pump assembly 224) can be removably attached to the fluid transfer unit 200, such as by using one or more of the supports on the fluid transfer unit 200. For example, as shown in FIG. 2C, a flat portion or end of the actuating stem 241 can be inserted into or coupled with a receiving region of the movable platform 222; one or more tabs on the syringe pump 240 can be positioned on or inserted between one or more of the protruding holders 220; the body of the syringe pump 240 can be received in the receptacle 218; the conduit 238 can be inserted into or on the sensor device 214, such as in a channel within the sensor device 214 that includes one or more sensors 215 (also referred to as one or more sensing regions 215 (shown in FIG. 2A); and/or the body of the fluid stopcock 230 can be positioned in or on or inserted into the attachment region 210 of the fluid transfer unit 200. In some embodiments, the fluid transfer device 30, such as in the form in this example of a multi-stroke fluid pump assembly 224, can be attached to the fluid transfer unit 200 in a single motion by simply advancing the transfer device 30 into contact with a face on the fluid transfer unit 200 that includes one or more of the supports 223. The fluid transfer device 30 can be removably retained on the fluid transfer unit 200 by any suitable attachment structure, including a snap-fit, a friction fit, a clasp, a clip, a retaining arm or door, an elastic band, or any other attachment structure.

When the fluid transfer module 31 (e.g., the fluid pump assembly 224) is removably attached to the fluid transfer unit 200, a fluid-observation region on the conduit 238 of the fluid transfer device 30 can be positioned adjacent to or within an appropriate sensing distance from the one or more sensors 215. In the illustrated example, the fluid-observation region of the fluid transfer device 30 is at least a portion of the conduit 238 positioned between the multidirectional flow-control valve 41 (e.g., the fluid stopcock 230) and/or the intermediate container or pumping region 40 (e.g., the syringe pump 240). In some embodiments, the fluid-observation region of the fluid transfer device 30 can comprise a portion of the conduit 238 positioned between the multidirectional flow-control valve 41 (e.g., the fluid stopcock 230) and/or the intermediate container or pumping region 40 (e.g., the syringe pump 240). In some embodiments, the fluid-observation region can be positioned in another position on the fluid transfer device 30, or there can be multiple fluid-observation regions 30 located at a plurality of positions on the fluid transfer device 30.

In some embodiments, the one or more sensors 215 can be configured to determine whether there is liquid, gas (e.g., one or more bubbles), and/or a vacuum or partial vacuum, within a particular region or regions of the fluid transfer module 31 (e.g., fluid pump assembly 224). For example, as illustrated in the figures, the one or more sensors 215 can be configured to determine whether there is a medical fluid within at least a portion of the conduit 238 or whether there is a gas (e.g., ambient air or air bubbles) or a vacuum or partial vacuum within the conduit 238. In some embodiments, the one or more sensors 215 can determine whether there is a medical fluid within a portion of the conduit 238 or whether there is a gas (e.g., ambient air) or a vacuum or partial vacuum within a portion of the conduit 238. The one or more sensors 215 can be any suitable type of sensor, including but not limited to one or more acoustic sensors (e.g., ultrasonic sensors), infrared sensors, laser sensors, visual-spectrum optical sensors, motion flow sensors, or any other suitable sensors. One or more indicators 216 (shown in FIG. 2A), such as an indicator light or indicator speaker or other indicator, can be positioned on the sensor device 214 to indicate when the sensor device 214 is sensing a particular condition, such as when liquid is present in the fluid observation-region.

FIG. 2C also illustrates a fluid source container 39 in the form in this example of an inverted vial 246 attached to a vial adaptor 248 that is in turn attached to an inlet connector 32 in the form in this example of a male fluid connector 226*a* with a longitudinal locking mechanism. In some embodiments, the vial adaptor 248 comprises a filtered fluid inlet and/or outlet 250 and securing arms that are configured to securely receive the vial. FIG. 2C also illustrates a fluid destination container 44 in the form in this example of an IV bag 244 attached to a conduit or hose 252 (in this example by way of a bag spike 254 or other fluid connection point) that is in turn attached to the outlet connector 42 of the fluid transfer module 31. The outlet connector in FIG. 2C is in the form in this example of a male fluid connector 234*a* with a longitudinal locking mechanism. The IV bag 244 is suspended from the pole stand 204 by the support arm 242.

FIG. 2C also illustrates one or more trays 280 attached to the housing 202 configured to support one or more containers and/or conduits described and contemplated herein. The one or more trays 280 may comprise any one of various structures to support containers and/or conduits. For example, in some embodiments, the one or more trays 280 may comprise one or more racks with one or more slots capable of holding vials. In some embodiments, the one or more trays 280 may be configured to support a source bag and/or an IV bag, such as a saline or diluent bag and/or a bag containing therapeutic or medicinal liquid. The one or more trays 280 may be removably attached to the housing 202. In some embodiments, one tray 280 can be configured to support a saline or diluent source container and another tray 280 can be configured to support a source container with therapeutic or medicinal liquid.

FIGS. 2B and 2C also illustrate an example of a stopcock handle 245. In particular, FIG. 2B illustrates a rear view of the stopcock handle 245 attached to the fluid pump assembly 224 and FIG. 2C illustrates a front perspective view of the stopcock handle 245 attached to the fluid pump assembly 224 and removably attached to the fluid transfer unit 200. In some embodiments, the stopcock handle 245 comprises an aid for grasping the fluid pump assembly and/or positioning the fluid pump assembly 224 relative to the fluid transfer unit 200. For example, in some embodiments, the stopcock handle 245 can be configured to help position (e.g., attach, engage, remove, and/or disengage) the fluid pump assembly 224 to and/or from one or more features of the fluid transfer unit 200. The stopcock handle 245 can, for example, help engage or disengage the rotatable actuator 228 to or from the driver 212, help push the conduit 238 into or on the sensor device 214, help remove the conduit 238 from the sensor device 214, help attach or remove the actuating stem 241 to or from the receiving region of the movable platform 222, help position the one or more tabs on the syringe pump 240 on or between one or more of the protruding holders 220, help position the body of the syringe pump 240 into the one or more receptacles 218, and/or help position the body of the stopcock 230 into or on the attachment region 210, among any other suitable uses.

In some embodiments, the stopcock handle 245 can be removably attached to the stopcock 230. In some embodiments, the handle is configured to be manipulated (e.g., rotated, slid, pushed, and/or pulled) to manually actuate the stopcock into the various positions described above with reference to, for example, FIG. 1A.

FIG. 2E is a rear perspective cross-sectional view of the fluid transfer unit 200 and the fluid pump assembly 224 shown in FIG. 2C, and illustrates various internal and external functional components. For example, as shown in FIG. 2E, in some embodiments, a measuring instrument such as a sensor 225 (e.g., a camera) can be positioned within the housing 202 to determine one or more features of the contents of the fluid transfer module 31 or fluid pump assembly 224, such as the volume, or type, or concentration, or color, and/or viscosity of fluid in the intermediate container or pumping region 40 (e.g., by capturing an image of the fluid transfer module 31 or fluid pump assembly 224) to provide a data file as described above. In some embodiments, a shroud 255 can be positioned adjacent to or near or generally around the one or more transparent receptacles 218 to advantageously resist the entry of undesired light from aberrant sources in order to increase the accuracy of the sensor 225. For example, in some embodiments, the shroud 255 can be configured to direct light that passes through the one or more transparent receptacles 218 toward the sensor 225, thereby increasing the amount of light available to the sensor 225. When the sensor 225 is a camera, the shroud 255 can help make the images more accurate and easier and faster to process by the processor(s) of the fluid transfer unit 200.

The fluid transfer unit 200 may comprise one or more computer processors 297, 298, which can form part of or be in electronic communication with any or all of the electromechanical controller 36 of FIG. 1A, the sensor 214, the volume sensor 225, the stopcock motor 290, and/or the platform motor 296, etc. In some embodiments, the one or more computer processors 297, 298 may comprise a pi box and/or a control board. The fluid transfer unit 200 may contain or support a power supply 295 configured to provide power to one or more components of the fluid transfer unit 200. The housing 202 may comprise a seal 293 configured to resist or prevent the entrance into and/or escape of fluid from the housing 202.

In some embodiments, the fluid transfer unit 200 may comprise one or more presence sensors 294*a*, 294*b*, 294*c*. The one or more sensors 294*a*, 294*b*, 294*c* can be positioned within and/or on the housing 202 and can determine the presence or absence of one or more structures. In some embodiments, one or more of the sensors 294*a*, 294*b*, 294*c* can be infrared sensors or any other suitable sensor. One or more of the sensors 294*a*, 294*b* can determine whether the fluid source container 39 (such as vial 246), the source adapter 250, and/or the source fluid connector are present and/or connected to the fluid transfer unit 200. In some embodiments, sensor 294*a* may determine if a source container 246 connector, such as a male or female side of a Chemolock® medical connector system, is properly engaged with a corresponding connector on the fluid transfer unit 200, such as a Chemolock® connector 226*a*. The sensor 294*b* may determine if an intermediate container 40, such as fluid pump assembly 224, and/or connector 226*a*, such as a male or female side of a Chemolock® connector, is present and/or properly engaged with the housing 202 and/or a corresponding connector on a source container 246. The sensor 294*c* may determine whether the destination container 44, such as IV bag 244, and/or destination fluid connector are present and/or connected to the fluid transfer unit 200. In some embodiments, sensor 294*c* may determine if a destination container 44 connector, such as a male or female side of a Chemolock® medical connector system, is properly engaged with a corresponding connector on the fluid transfer unit 200, such as a Chemolock® connector 234*a*. In some embodiments, if any of sensor 294*a*, 294*b*, 294*c* determine that a component of the fluid transfer unit 200 is not present, the sensor 294*a*, 294*b*, 294*c* may send a signal to the controller 36 to prevent initiation of the fluid transfer process and/or terminate an ongoing fluid transfer. The sensor 294*a*, 294*b*, 294*c* may trigger an indicator signaling to a user that not all components are present or properly engaged with the fluid transfer unit 200.

As shown in FIGS 2A and 2C, in some embodiments, one or more apertures in the housing can permit one or more of the presence sensors 294*a*, 294*b*, 294*c* to communicate essentially or completely unimpeded from within the housing to a region outside of the housing. As illustrated, one or more of the presence sensors 294*a*, 294*b*, 294*c* can be positioned in substantially a collinear manner with each other and/or with the primary longitudinal axis of the fluid transfer module 31 (e.g., presence sensors 294*a*, 294*b*), and/or one or more other of the presence sensors 294*a*, 294*b*, 294*c* can be positioned in a non-collinear manner or at an angle or perpendicular to the primary longitudinal axis of the fluid transfer module 31 (e.g., presence sensor 294*c*). In some embodiments, as shown, one or more or all of the sensors are positioned and/or recessed inside of the housing of the electronic fluid transfer system, such that a panel through which the sensors are configured to detect items is essentially or substantially or entirely planar. As illustrated, one or more of the sensors does not include and/or is not attached by any external wires outside of the housing of the electronic fluid transfer system.

In some embodiments, one or more of the sensors 294*a*, 294*b*, 294*c* can be configured to detect the presence or absence of at least a portion of a fluid transfer module attached to the electronic fluid transfer device, such as a connector on the fluid transfer device. In some embodiments, one or more of the sensors (e.g., 294*a*, 294*b*) can be configured to additionally or alternatively detect the presence or absence of or connection with at least a portion of a fluid source system, such as a connector or vial adaptor or vial or bag or conduit that forms part of or is connected to a fluid source system. In some embodiments, one or more of the sensors (e.g., 294*c*) can be configured to additionally or alternatively detect the presence or absence of or connection with at least a portion of a fluid destination system, such as a connector or bag or conduit that forms part of or is connected to a fluid destination system. In some embodiments, the detection of one or more of the fluid transfer module 31, the detection of the connection to the fluid source system, and/or the detection to the connection to the fluid destination system can be a gating step or a required step for the computer processor or other component of the electro-mechanical controller to permit fluid transfer to begin or continue.

Figure 2F:
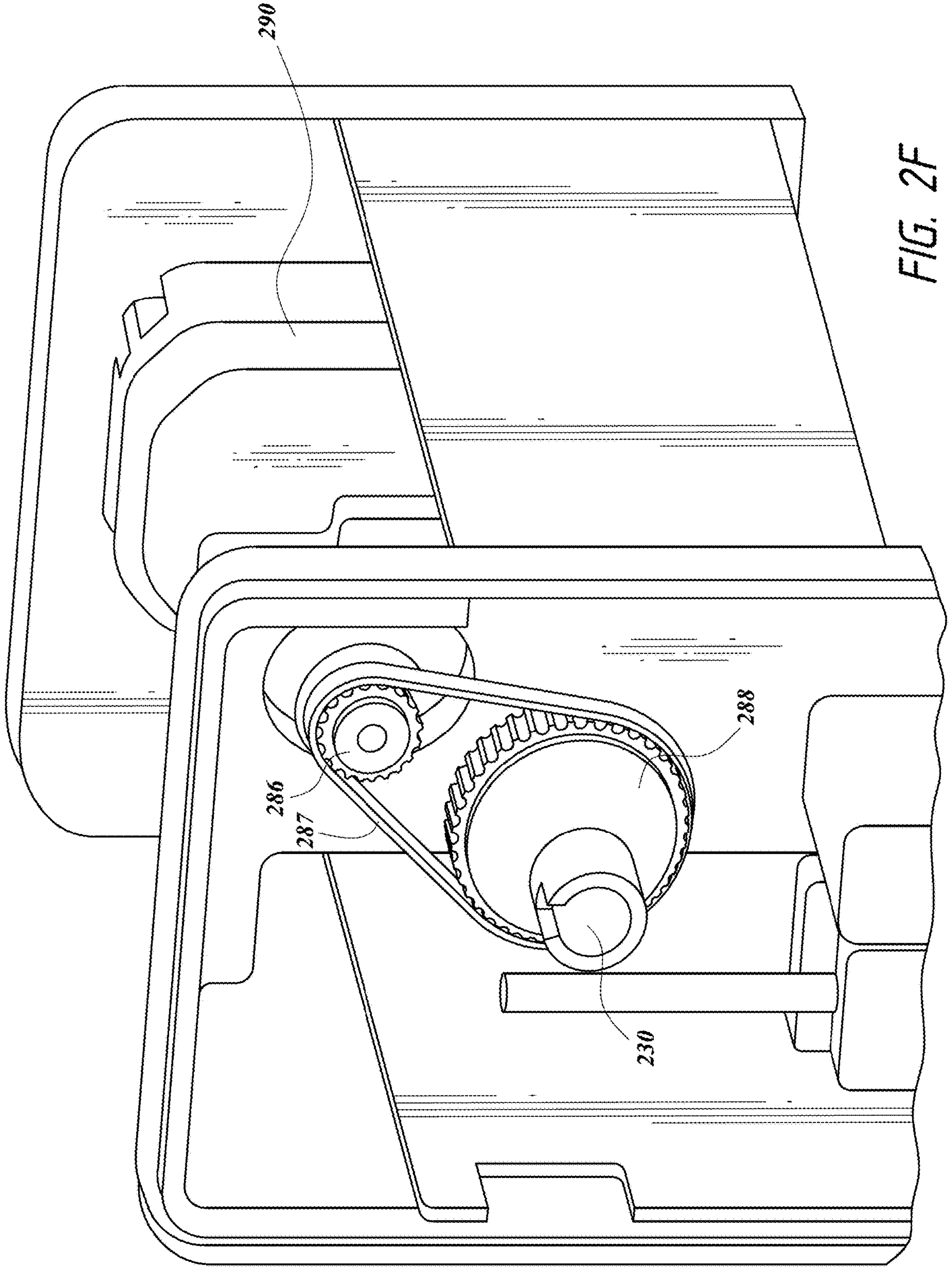
FIG. 2F is a front perspective cross-sectional view of another embodiment of an electromechanical system and fluid transfer device with a driving structure that can be used with or instead of any structure shown in FIG. 2C.

FIG. 2F illustrates a multi-gear, offset-shaft, belt-driven configuration for the driver motor 290 and driver shaft 292. In some embodiments the driver shaft 292 (not shown in FIG. 2F) may not be a direct-drive shaft for the stopcock 230. Rather, the driver shaft 292 may be coupled to a first gear 286, and the stopcock may be coupled to or placed in mechanical communication with a second gear 288. The first gear 286 may interact with the second gear 288 directly, or via a drive belt 287. This configuration allows the driver motor 290 and driver shaft 292 to be positioned in an offset orientation with respect to the stopcock 230, rather than being positioned such that both the driver motor 290 and drive shaft 292 are coaxial with the stopcock 230. In addition, this configuration may provide gearing with different size gears to provide mechanical advantage in the transfer of torque from the driver motor 290 to the stopcock. This type of structure can provide certain benefits in some embodiments. For example, the stopcock may be part of a limited-use or single-use disposable fluid pump assembly 224. The stopcock may be lubricated with a material (e.g., silicone) that evaporates, deteriorates, or otherwise loses its lubrication ability over time. If an older fluid pump assembly 224 is used with the fluid transfer unit 290, the lubrication may have deteriorated to the point where a significant additional amount of torque (e.g., up to about 25% more, up to about 50% more, or up to or greater than about 100% more) is required to rotate the stopcock 230 than would otherwise be required to rotate a stopcock of a well-lubricated disposable fluid pump assembly 224. The gearing in the multi-gear configuration shown in FIG. 2F may be selected such that a driver motor 290 that is configured to provide a direct-drive shaft with a degree of torque sufficient for a well-lubricated disposable fluid pump assembly 224 may, in the illustrated configuration, also be able to provide a degree of torque sufficient for an older, less-well-lubricated disposable fluid pump assembly 224.

Figure 3:
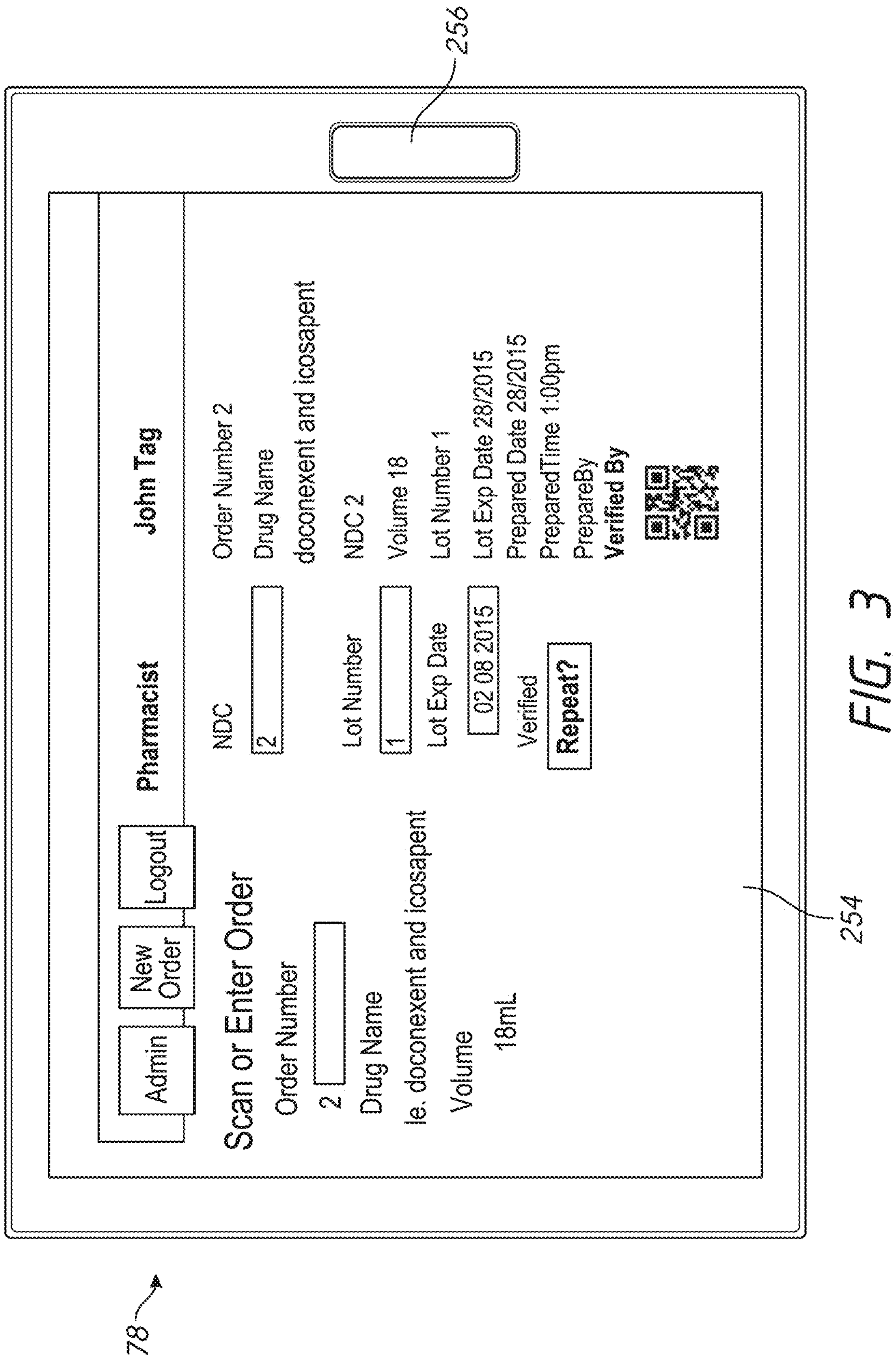
FIG. 3 is a front plan view of an example of a user control device.

FIG. 3 illustrates a user interface 78 that can be used with the fluid transfer unit 200 in the form in this example of a remote tablet. The user interface 78 can comprise a rechargeable internal battery, a touch-sensitive screen to enable user selection and input by way of the screen, and one or more additional or alternative user inputs 256, such as a button (as shown) or a knob or a slider or a rocking switch, or a rolling dial, or any other user input. The user interface 78 can communicate electronically with one or more fluid transfer units 200 and/or with one or more patient and/or drug information storage devices or networks 70 utilizing any suitable electronic protocols or electronic communicators. In some embodiments, the user interface 78 is fixed to the fluid transfer unit 200, such as being attached to or contained at least partially within the housing of the fluid transfer unit 200.

The user interface 78 can display or convey various items of information between a user and an electronic storage medium and/or can convey one or more executable instructions to a computer processor in the fluid transfer unit 200, or to electromechanical hardware in the fluid transfer unit 200, to perform one or more actions relating to fluid transfer. For example, the user interface 78 can receive and/or store (e.g., by user input or electronic transmission) the identity of the pharmacist or technician who is performing the fluid transfer, the identity of the patient, the name of the medical fluid, the volume of medical fluid to be transferred, the lot number, the expiration date of the medical fluid, and/or the date and time on which the fluid transfer was performed, etc. Also, as other examples, the user interface 78 can assist in controlling the fluid transfer by receiving and conveying commands from the user via the user interface 78 and/or displaying messages from the fluid transfer unit 200 regarding the progress and/or status of the fluid transfer, such as commands initiating the fluid transfer and/or halting the fluid transfer, and/or one or more messages demonstrating the amount of fluid transferred at any given moment, or the history of fluid transfers for a particular patient or pharmacist over a particular period, or one or more error messages indicating that the fluid transfer was not completed or that the fluid source container 39 is not connected or is empty, or the fluid destination container 44 is not connected or is full, or any other useful message.

Figure 4:
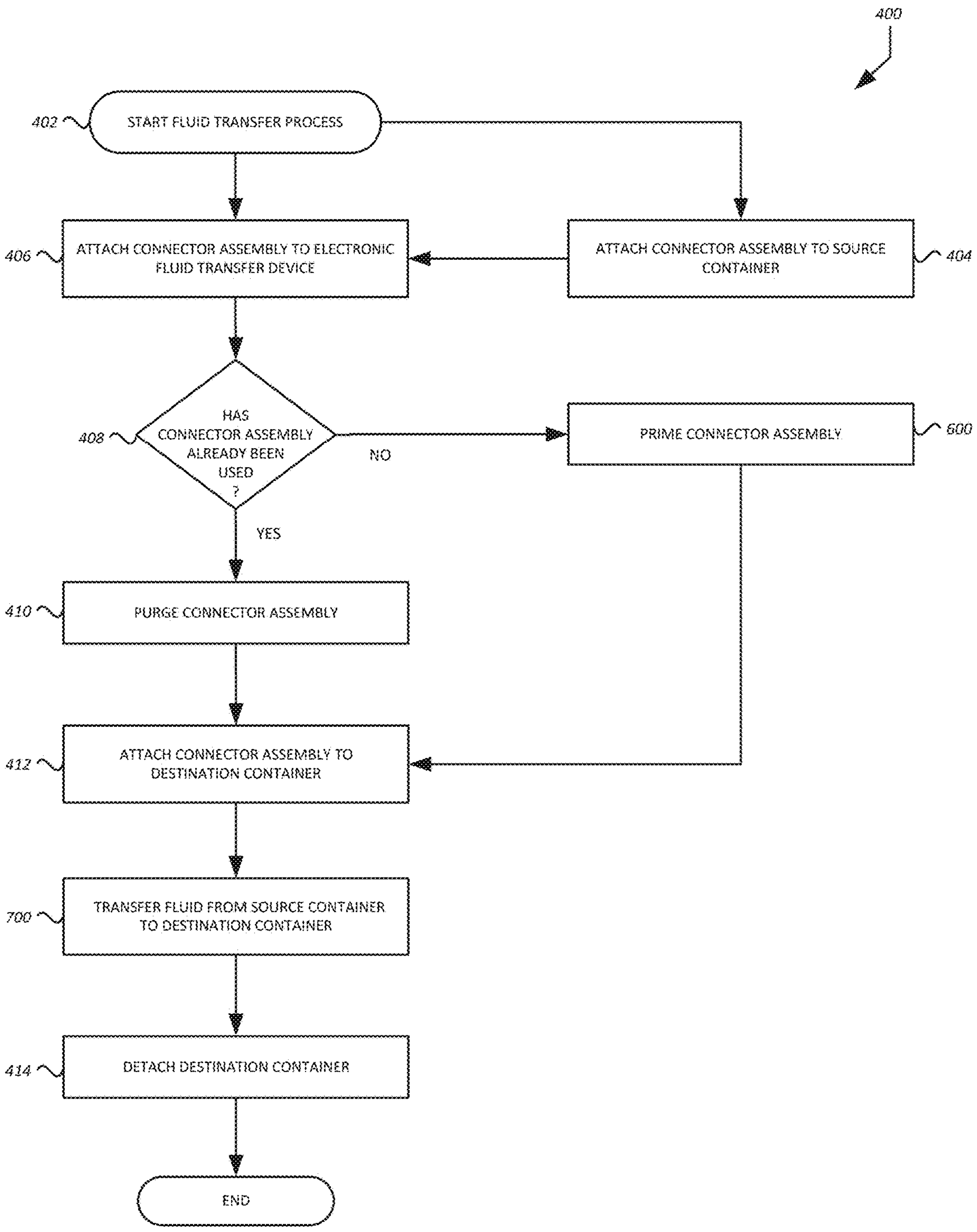
FIG. 4 is a flow chart illustrating an example of a process for managing a fluid transfer method.

FIG. 4 illustrates an example of a fluid transfer process 400. An advantage of some embodiments of this fluid transfer process 400 is that a high-precision dosage of liquid can be transferred to the destination container by carefully controlling and monitoring when a gas, such as air, enters the liquid pathway within one or more conduits of the fluid transfer module 31, and then by removing the gas from the liquid pathway and/or not counting any transferred gas in the destination container 44 as a transferred liquid. As with all embodiments in this specification, one or more of the steps of the fluid transfer process 400 can be performed alone, in one or more groups, or in a different ordering than is illustrated in FIG. 4 and/or than is described herein. Chronological terms such as "before" or "after" or "begin" or "start"

or "end," or any similar terms, are provided only as examples and are not required in all embodiments. None of these steps is essential or indispensable.

The fluid transfer process 400 begins at the start block 402. If a fluid transfer module 31 in the form in this example of a connector assembly (e.g., a multi-stroke pump assembly 224) has not already been attached to a source container 39, then the source container 39 is attached to the connector assembly at block 404. If the connector assembly has already been attached to a source container 39 (or if it will be attached later), then the connector assembly is attached to a fluid transfer management system 74 in the form in this example of an electronic fluid-delivery device, such as the fluid transfer unit 200 or any other type of fluid transfer unit, at block 406.

At decision block 408, it can be determined whether the connector assembly has already been used. In some situations, the connector assembly has previously been in use, such as when only a portion of the fluid in a source container 39 of a first connector assembly has been withdrawn but the connector assembly is temporarily disconnected or removed from the fluid transfer management system 74 to permit a second connector assembly to be attached to a source container 39 with a different type of therapeutic liquid to be coupled with the fluid transfer management system 74 for another type of fluid transfer. After the second connector assembly is used in the fluid transfer management system 74, the first connector assembly can be reattached in its original position in order to withdraw all or a portion of the remaining contents of the source container 39. Thus, in this example, among others, the first connector assembly has previously been in use.

If the connector assembly has not already been used, then in some instances the connector assembly can be "primed" at block 600 by filling the connector assembly with liquid and by removing gas, such as air, from the connector assembly. Priming may comprise filling the interior cavity of connector 234 and/or connecter 226 prior to transferring of fluid to a destination container 44. In some situations, gas needs to be removed from the connector assembly to avoid transferring air into a destination container 44 that will be transferred entirely into a patient's blood vessel. For example, priming may be useful where it is desirable to remove any clinically significant amount of air prior to transferring of fluid to a destination container 44, such as a syringe containing liquid that will be injected directly into a patient or into a patient's fluid line. In some situations, such as when an IV bag 248 is used, the concern of harming the patient 44 is not as severe, since an IV bag 248 is typically gravity-fed and the gas migrates to the top of the bag without entering the patient's blood vessel anyway. In some instances, the main concern is that a transfer of gas from the connector assembly into the destination container 44 might be mistakenly counted as a transfer of therapeutic liquid into the destination container 44, which may result in an under-count of the amount of therapeutic liquid provided to the patient, or it may lower the concentration of therapeutic liquid provided to the patient. In some embodiments, any one and/or all of the concerns may be resolved through various methods described in further detail below. An example of the priming process is illustrated and described more fully in FIGS. 5 and 6. Additional examples of a priming process are illustrated and described in U.S. Pat. No. 10,188,849, which is incorporated by reference in its entirety and made a part of this specification, and any feature, structure, material, step, or component of any embodiment described and/or illustrated the patent can be used with or instead of any other feature, structure, material, step, or component of any embodiment described and/or illustrated elsewhere in this specification. After the connector assembly is primed, it can be connected to the destination container 44 at block 412.

If the connector assembly has already been used, then the connector assembly does not need to be filled with liquid or primed. However, the connector assembly may have acquired air bubbles inside of it, such as during the disconnection process, or from partial vaporization of the liquid within the connector assembly, or by partial external spillage. The air bubbles can be substantially or entirely removed during a purging step in block 410. After the connector assembly has been purged of gas, it can be attached to the destination container 44 at block 412.

In some embodiments, re-use of a connector assembly or other fluid transfer module 31 may not be permitted in some or all circumstances. A previously-used connector assembly may be identified based on the presence of liquid within the connector assembly. For example, if a sensor 215 detects liquid anywhere in the fluid transfer module 31 (such as in the fluid-observation region of the conduit 238), then the connector assembly has been used previously. A notification may be generated, such as illumination of an indicator light or display of a message on the user interface 74. The process 400 may be stopped until a new connector assembly is attached and verified (e.g. by the absence of liquid). In some embodiments, an override may be permitted to allow for re-use of a connector assembly. For example, if the connector assembly has not been removed between fluid transfer operations and the same fluid is to be transferred (e.g., as verified by user entry, transfer order, photo verification of the source container 39, etc.), then the connector assembly may be re-used. As another example, an operator may manually override the stoppage (e.g., upon manual verification that the same fluid is to be transferred using the connector assembly).

Figure 7:
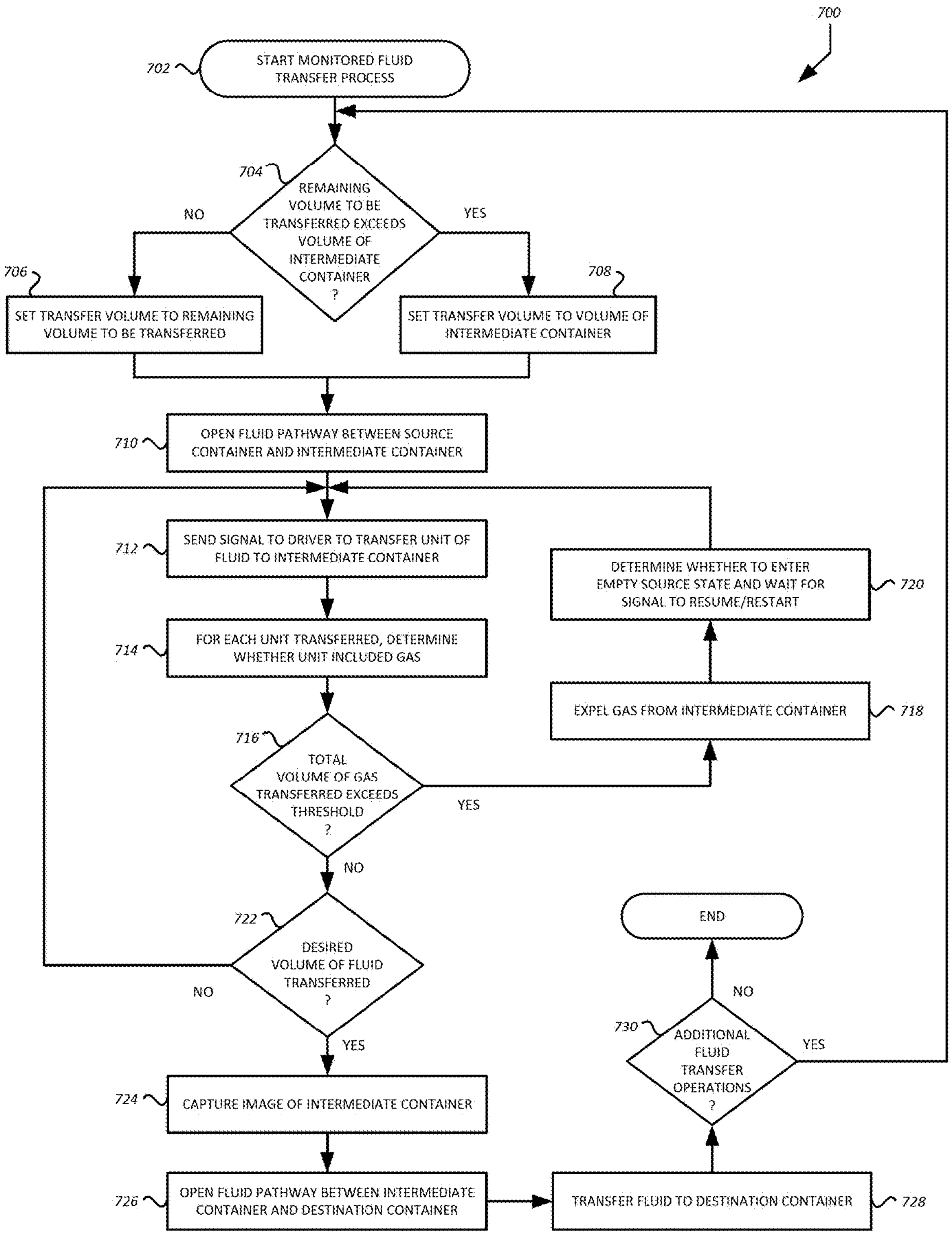
FIG. 7 is a flow chart illustrating an example of the fluid transfer operation of the fluid transfer method of FIG. 4.

After the source container 39 and the destination container 44 are attached to the fluid transfer module 31 (or connector assembly), the fluid transfer device 30 can proceed to transfer fluid from the source container 39, through the fluid transfer module 31, to the destination container 44 at block 700, which is illustrated and explained more fully in FIG. 7. Once the fluid transfer is complete, the destination container 44 can be detached from the fluid transfer module 31 at block 414 and transported to the patient for administration of the therapeutic fluid.

Each of the steps illustrated and/or described in connection with FIGS. 4-9 can be performed or controlled or actuated, in whole or in part, by the computer processor positioned in or associated with the fluid transfer management system 74, by a user interface 78 of the fluid transfer management system 74, or by some other module or component of the fluid transfer management system 74. The computer processor can be attached in electrical communication with the patient and/or drug information storage device(s) or network(s) 70, user interface 78, the memory 84 or memories 84, the electromechanical controller 36, and/or the electromechanical driver. The computer processor and/or user interface 78 can include, or can communicate with one or more memories or other electronic media that include, software or hardware instructions or subroutines or algorithms for performing any or all of the steps illustrated or described in this specification, including the steps illustrated in FIGS. 4-9. The steps shown in FIGS. 4-9 can be performed in the order illustrated, or in any other order, or individually or in one or more groups, as may be useful. The particular ordering illustrated in these figures is merely one example of many and should not be understood to be limiting. Any of the steps can be changed or omitted, and one or more additional steps can be included.

Figure 5:
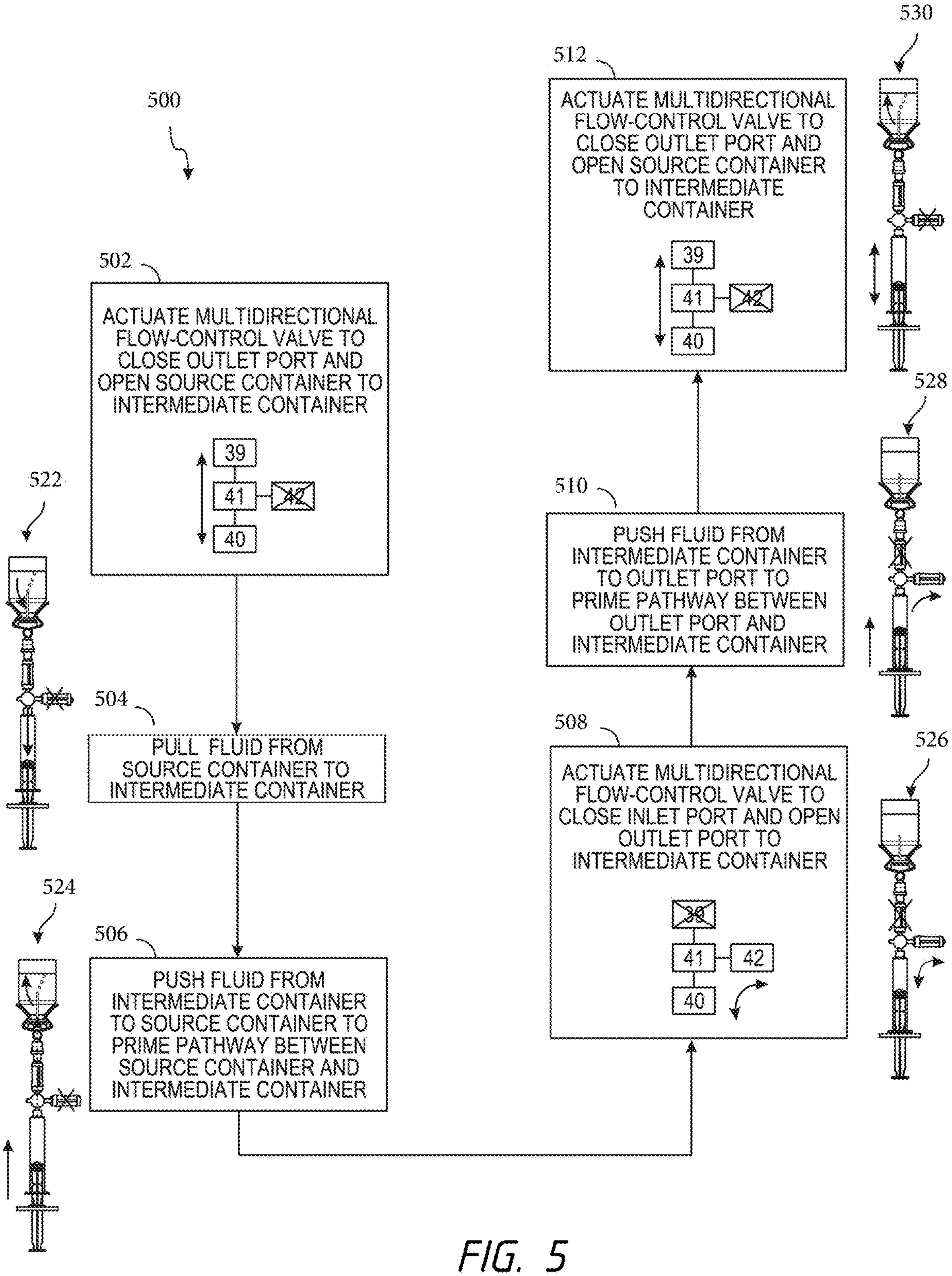
FIG. 5 is a flow chart illustrating an example of the priming step of the fluid transfer method of FIG. 4.
Figure 6:
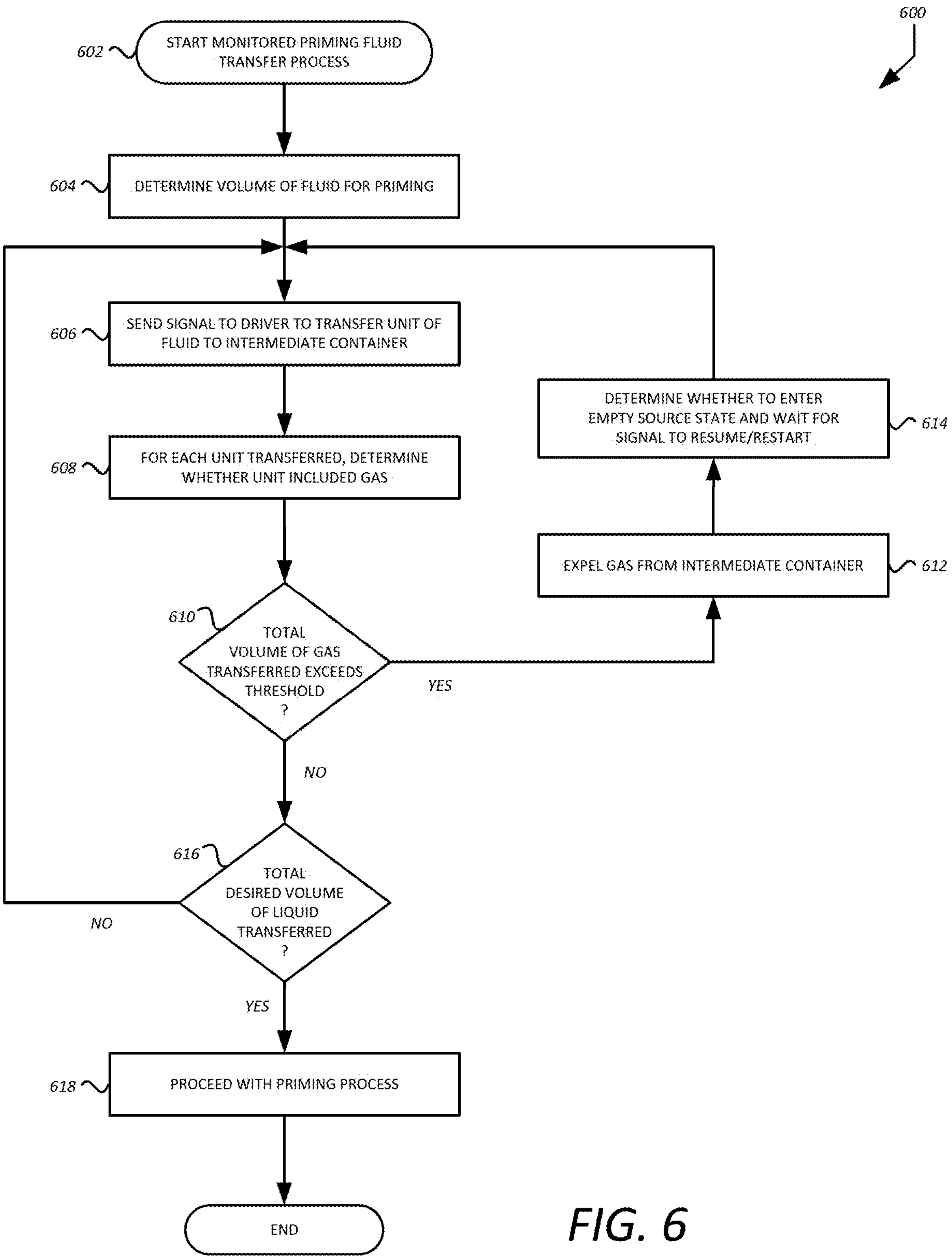
FIG. 6 is a flow chart illustrating an example of the priming step of the fluid transfer method of FIG. 4.

As previously discussed, priming sequences such as the one detailed in FIGS. 5 and 6 may not be utilized in all instances of the fluid transfer process. In FIG. 5 at block 502, the computer processor of the fluid transfer management system 74 can send an electronic signal to the electromechanical controller 36 of the fluid transfer device 30 to mechanically actuate the multidirectional flow-control valve 41 to close an outlet port on the fluid-control valve and open a fluid pathway between the inlet port on the fluid-control valve 41 and the intermediate outlet port on the fluid-control valve 41. The inlet connector 32 (and source container 39), fluid-control valve 41, and intermediate container 40 can then be positioned in fluid communication with each other, while the outlet connector 42 can be isolated or not in fluid communication with these components. An example of this configuration 522 shows an inverted vial 246 attached to a stopcock 230 by way of a male fluid connector 226 that is in fluid communication with the stopcock 230 and the syringe pump 240, while the male fluid connector 234 attached to the outlet port and outlet conduit 236 is blocked from fluid communication with the stopcock 230 and other components.

In some embodiments, when the fluid-control valve 41 or stopcock 230 is actuated, the fluid transfer management system 74 at block 504 may actively transfer fluid into the intermediate container 40 or syringe pump 240. The computer processor of the fluid transfer management system 74 can send an electronic signal to the electromechanical controller 36 of the fluid transfer device 30 to mechanically actuate the electromechanical driver. In some embodiments, as illustrated in 522, the actuation of the electromechanical driver can downwardly move the movable platform 222 and pull the actuating stem 241 out of the syringe pump 240, thereby increasing the volume and decreasing the pressure within the intermediate container 40 or syringe pump 240 to urge or pull liquid within the source container 39 into the intermediate container 40 or syringe pump 240. In some embodiments, after the migration of fluid from the source container 39 to the flow-control valve 41 and intermediate container 40, a small amount of air bubbles or a small air region may be present in the intermediate container 40. The air region or air bubbles generally migrate upward within the syringe pump 240, since the air is less dense than the fluid transferred from the source container 39, which is typically liquid. Additional air may still be present within the flow control valve 41.

At block 506, the computer processor of the fluid transfer management system 74 can send an electronic signal to the electromechanical controller 36 of the fluid transfer device 30 to mechanically actuate the electromechanical driver. In some embodiments, as illustrated, the actuation of the electromechanical driver can upwardly move the movable platform 222 and push the actuating stem 241 into the syringe pump 240, thereby decreasing the volume and increasing the pressure within the intermediate container 40 or syringe pump 240 to urge or push liquid and any accompanying air within the intermediate container 40 or syringe pump 240 backward or in reverse from the intermediate container 40 or syringe pump 240 into the flow-control valve 41, and the inlet connector 226. This reverse or backward flow of liquid can "prime" the fluid pathway between the source container 39, the flow control valve 41, and the intermediate container 40, to remove all or a portion of the air within these components and replace it with liquid. The backward flow of liquid may remove any air present in the syringe pump 240, thereby preventing the later transfer of air to the outlet port, outlet conduit 236, and/or outlet container. The movable platform 222 may be positioned to inject sufficient flow of fluid into the source container 39 to prime the fluid pathway between the source container 39, the flow control valve 41, and the inlet connector 226, while maintaining an amount of fluid within the intermediate container 40 sufficient to prime the outlet connector 42. The amount of liquid to prime the outlet connector 42 may include a volume of liquid about at least equal to the volume of the interior cavity of the outlet connector 42. An example routine for priming the fluid pathway between the source container 39, the flow control valve 41, and the intermediate container 40 is shown in FIG. 6.

At the beginning of block 508, the multidirectional flow-control valve 41 can be mechanically actuated by the electromechanical controller 36 of the fluid transfer device 30 to close an inlet port on the fluid-control valve 41 and open simultaneously or generally concurrently a fluid pathway between an outlet port on the fluid-control valve 41 and an intermediate outlet port on the fluid-control valve 41. The outlet connector 42, fluid-control valve 41, and intermediate container 40 can then be positioned in fluid communication with each other, while the source container 39 can be isolated or not in fluid communication with these components. An example of this configuration 526 shows an inverted vial 246 attached to a stopcock 230 by way of a male fluid connector 226 that is blocked from fluid communication with the stopcock 230 and other components, while a syringe pump 240 attached to the stopcock 230 is in fluid communication through the stopcock 230 with the outlet fluid connector 234.

In block 510, the actuation of the electromechanical driver can upwardly move the movable platform 222 and push the actuating stem 241 into the syringe pump 240, thereby decreasing the volume and increasing the pressure within the intermediate container 40 or syringe pump 240 to urge or push liquid within the intermediate container 40 or syringe pump 240 into the outlet port and outlet fluid connector 42. This flow of liquid can prime the fluid pathway between the destination container, the outlet port, and the outlet fluid connector 42, to remove all or a portion of the air within these components and replace it with liquid. In some embodiments, block 508 and 510 may evacuate any air within the outlet port and outlet fluid connector 42 or diminish the pressure within these components. The computer processor of the fluid transfer management system 74 can send an electronic signal to the electromechanical controller 36 of the fluid transfer device 30 to mechanically actuate the electromechanical driver. In some embodiments, the actuation of the electromechanical driver can downwardly move the movable platform 222 and pull the actuating stem 241 out of the syringe pump 240, thereby increasing the volume and decreasing the pressure within the intermediate container 40 or syringe pump 240 to urge or pull liquid and any accompanying air within the outlet port and outlet fluid connector 42 into the intermediate container 40 or syringe pump 240. This reverse or backward flow of liquid can prime the fluid pathway between the destination container, the outlet port, and the outlet fluid connector 42, to remove all or a portion of the air within these components and replace it with liquid.

At block 512, the computer processor of the fluid transfer management system 74 can send an electronic signal to the electromechanical controller 36 of the fluid transfer device 30 to mechanically actuate the multidirectional flow-control valve 41 to close the outlet port on the fluid-control valve 41 that is in fluid communication with the outlet connector 234, and to open simultaneously or generally concurrently a fluid pathway between the inlet port on the fluid-control valve 41 that is in fluid communication with the source container 39 and the outlet port on the fluid-control valve 41 that is in fluid communication with the intermediate container 40. An example of this configuration 512 shows the inverted vial 246 in fluid communication with the stopcock and the syringe pump 240 but not the outlet fluid connector 42. At this point, the computer processor can send a signal or series of signals to the electromechanical movable platform 222 to actuate the syringe pump 240 to draw in the proper amount of therapeutic fluid to be transferred to the destination container 44. An example routine for transferring therapeutic fluid to the destination container 44 is shown in FIG. 7.

If, at any other stage of FIG. 5, the sensor 215 detects that a gas or air bubble or a significant amount of gas or air is located somewhere in the fluid transfer module 31 (such as in the fluid-observation region of the conduit 238), a sequence of one or more steps constituting a "gas purge" can be performed. Any reference to gas or air in this specification includes a cavitation or absence of liquid of any type, whether it be due to the presence of gas, air, vapor, vacuum, and/or partial vacuum. A "significant amount of gas" is any amount of gas that would yield clinically significant imprecise measurements or other adverse results if permitted to remain in the fluid transfer module 31 or if permitted to be transferred into the destination container 44. In some embodiments, as part of the purging process, an electrical signal can be sent from the sensor 215 to the computer processor indicating detection of gas. Another electrical signal or a series of electrical signals can be sent from the computer processor to the electromechanical driver to move the movable platform 222 down to draw an amount of liquid from the source container 39 into the flow-control valve 41 and into the intermediate container 40, and then an electrical signal or a series of electrical signals can be sent from the computer processor to the electromechanical driver to move the movable platform 222 up to push an approximately equal amount of liquid out of the intermediate container 40 up through the flow-control valve 41 and back into the source container 39, and then another electrical signal or a series of electrical signals can be sent from the computer processor to the electromechanical driver to move the movable platform 222 down again to draw an amount of liquid from the source container 39 into the flow-control valve 41 and into the intermediate container 40.

This back-and-forth or drawing-and-expelling movement of liquid between the source container 39 and the intermediate container 40 can help to purge air from the fluid transfer module 31 because any air present will normally rise to the top of the central chamber of the intermediate container 40, or the top of the conduit 238, or the top of the fluid-control valve 41, and/or the top of the conduit 232 (since the gas or air is less dense than the liquid surrounding it), and then the gas or air can be returned or moved into the source container 39 during the return stroke before the liquid in the central chamber of the intermediate container 40 is returned or moved into the source container 39. If a first iteration of the back-and-forth or drawing-and-expelling movement does not sufficiently purge any significant amount of air from the fluid transfer module 31, then a second iteration or a plurality of additional iterations of the back-and-forth or drawing-and-expelling movement can be performed.

FIG. 6 shows a process 600 for controlled priming by continuously or periodically monitoring the transfer of fluid to determine whether a gas or a liquid is being transferred at each predetermined or dynamically determined interval, and implementing procedures based on the detection. The process 600 beings at block 602, such as when a connector assembly has not already been used during process 400.

At block 604, the computer processor of the fluid transfer management system 74 can determine a desired volume of liquid to be transferred from the source container for use in the priming procedure. The desired volume of liquid may be a static amount that is used for all priming operations, or a dynamically-determined amount that is associated with the connector assembly being used, the therapeutic fluid to be transferred, or the like. In some embodiments, if the position of the multidirectional flow-control valve 41 is currently set to close a fluid pathway between the source container 39 and the intermediate container 40, the computer processor of the fluid transfer management system 74 can send an electronic signal to the electromechanical controller 36 to mechanically actuate the multidirectional flow-control valve 41 to open the fluid pathway between the source container 39 and the intermediate container 40.

At block 606, the computer processor of the fluid transfer management system 74 can send an electronic signal to the electromechanical controller 36 of the fluid transfer device 30 to mechanically actuate the electromechanical driver. The electronic signal sent to the electromechanical controller 36 may indicate a single unit of the desired volume of medical fluid (e.g., liquid in the source container 39) to be transferred for the current priming operation, the total desired volume of medical fluid to be transferred, the displacement of the electromechanical driver that corresponds to transfer of the current unit or total desired volume for the current priming operation, or other data used to effectuate the transfer. In some embodiments, actuation of the electromechanical driver can move the moveable platform 222 down, which can pull on the actuating stem 241 to increase the volume inside of the internal fluid chamber of the syringe pump 240, which lowers the pressure inside of the syringe pump 240 and urges liquid from the source container to flow through the stopcock 230 and into the syringe pump 240.

In some embodiments, the electromechanical driver may include, be coupled to, or otherwise be associated with a driver movement assessor that monitors driver movement and generates feedback, such as driver movement data representing movement of the driver. For example, the driver movement assessor may be or include an optical encoder that converts angular displacement of a shaft of the electromechanical driver into digital data. The shaft of the driver may be coupled to a reference component, such as disk that rotates as the driver rotates the shaft. The surface of the reference component may include a series of segments, such as a series of alternating opaque and transparent segments. Light (e.g., infrared light) from one or more diodes may reach one or more receivers (e.g., infrared receivers) of the optical encoder through the transparent segments of the rotating disc. The optical encoder may then generate driver movement data representing the movement of the driver based on the detected light. The driver movement data may represent the number of segments that have been detected by the receiver(s) in a period of time, the detection of each individual segment, an angular measurement of the movement of the driver based on the detected segments, other measurements of movement, or some combination thereof. In some embodiments, each segment or quantity of segments may correspond to a volume of fluid transferred (e.g., a predetermined quantity of segments, such as a 1, corresponds to a predetermined volume of fluid, such as 1 microliter). Thus, the electromechanical controller 36 of the fluid transfer device 30 can transfer a desired volume of fluid by actuating the electromechanical driver for a corresponding quantity of segments.

At block 608, the computer processor of the fluid transfer management system 74 can determine whether liquid or gas is being (or has been) transferred. The determination may be made based on evaluating output of one or more sensors 215 indicating whether there is a medical fluid within at least a portion of the conduit 238 or whether there is a gas (e.g., ambient air or air bubbles) or a vacuum or partial vacuum within the conduit 238. In some embodiments, the determination may be made on a continuous or periodic basis. For example, as the electromechanical driver moves the moveable platform 222 down, the driver movement assessor may generate driver movement data. Each time a threshold or predetermined quantity of segments (e.g., 1 segment, 10 segments, 100 segments, etc.) is detected by the optical encoder indicating movement of the electromechanical driver's shaft, the optical encoder can notify the computer processor of the fluid transfer management system 74. Each time such a message is received by the computer processor, or the computer processor otherwise determines that a quantity of segments has been detected, the computer processor may determine whether the volume transferred during the electromechanical driver movement represented by the predetermined quantity of segments was medical fluid or gas. For example, the computer processor may evaluate the current state or output of a sensor 215 monitoring one or more regions of the fluid transfer module 31, such as a fluid-observation region on the conduit 238, to determine whether a gas bubble (such as air or a vacuum) is present or has migrated into the fluid transfer module 31. Based on the current state or output of the sensor, the computer processor can determine whether liquid was transferred or whether a gas bubble was transferred. The computer processor may determine a volume of the liquid and/or gas transferred during movement of the electromechanical driver based on a correspondence of a segment or quantity of segments to a volume of fluid. The computer processor may update a measurement in memory 84 regarding the volume of fluid transferred during the process, such as by updating separate values for liquid and gas, respectively.

At decision block 610, the computer processor of the fluid transfer management system 74 can determine whether the total volume of gas transferred during the process 600, or the total quantity of electromechanical driver movement readings associated with gas transferred during the process 600, satisfies a gas limit threshold (e.g., meets or exceeds a threshold). If so, the source container 39 may not have any medical fluid remaining, and may therefore be empty and only comprise gas to be transferred. In response, the process 600 may proceed to block 612 to mitigate the transfer of gas. Otherwise, if the total volume of gas—or quantity of driver movement readings associated with gas—transferred during the process does not satisfy the gas limit threshold (e.g., is less than the threshold), then the process 600 may proceed to block 616.

At block 612, the computer processor of the fluid transfer management system 74 can initiate a procedure to expel gas from the intermediate container 40 or syringe pump. In some embodiments, the computer processor of the fluid transfer management system 74 can send an electronic signal to the electromechanical controller 36 of the fluid transfer device 30 to mechanically actuate the electromechanical driver. The electromechanical driver may upwardly move the movable platform 222 and the syringe pump 240, thereby decreasing the volume and increasing the pressure within the intermediate container 40 or syringe pump 240 to urge or push liquid and any accompanying air within the intermediate container 40 or syringe pump backward or in reverse from the intermediate container 40 or syringe pump 240 into the flow-control valve 41, and the inlet connector 226. Thus, air in the intermediate container 40 or syringe pump can be purged.

At block 614, the computer processor of the fluid transfer management system 74 can determine whether to set the state of the process 600 to an empty source state. In some embodiments, determination of whether to set the state to an empty source state may be based on the number of times gas has been expelled, the volume of gas detected, the quantity of units of fluid transferred that included gas, another factor, or some combination thereof. For example, if blocks 612 and 614 are reached a threshold number of times during the process 600 (e.g., 2 times, 5 times, etc.), then the source container 39 may be empty. As another example, if the total volume of gas transferred exceeds a second threshold, above the gas limit threshold for expelling the gas and continuing with the transfer, then the source container 39 may be empty.

In some embodiments, setting the state of the process 600 may comprise changing a value of a property or variable, sending a message, another operation, or some combination thereof. For example, the computer processor may transmit, or cause transmission of, an empty source message regarding the empty source container 39 to another component of the fluid transfer management system 74, such as the user interface 78. The message may be displayed or otherwise presented by the user interface 78.

If the state of the process 600 has been set to an empty source state, the computer processor of the fluid transfer management system 74 can wait to receive a command to resume (or start over) the process 600. In some embodiments, the command may come from the user interface 78. For example, an operator or other user may receive, via the user interface 78, an empty source message indicating that the source container 39 is empty. The operator may determine the cause of the problem and perform a remedial action, such as replacing the empty source container 39 with a source container 39 that is not empty, refilling the empty source container 39, reconnecting a source container 39 or another component that has become disconnected, or the like. After addressing the problem that caused the empty source state, the operator may use the user interface 78 to indicate that the source container 39 has been replaced or that the process 600 may otherwise proceed. For example, the operator may activate a button or other touch-based control to resume or restart the process 600. The operation by the operator may cause a command to resume or restart the process the process to be provided to the computer processor. In response, the computer processor may cause the process 600 to return to block 606.

At decision block 616, the computer processor of the fluid transfer management system 74 can determine whether the total volume of liquid transferred during the process 600, or the total quantity of electromechanical driver movement readings associated with liquid transferred during the process 600, has reached the desired volume of liquid to be transferred for the current priming operation. In some embodiments, the computer processor may evaluate a measurement in memory 84 regarding the volume of liquid transferred during the process 600. If the total volume of liquid transferred during the process 600 thus far has reached the desired volume, the process 600 may proceed to block 618 to transfer the priming liquid to desired portions of the fluid transfer device 30. Otherwise, if the total volume of liquid transferred during the process 600 thus far has not reached the desired volume, the process 600 may return to block 608 to continue the transfer of liquid.

At block 618, the computer processor of the fluid transfer management system 74 can proceed with transferring desired volume of priming liquid. For example, the computer processor can proceed with transferring some or all of the priming liquid to the destination container 44, the source container 39, conduit 232, conduit 236, conduit 238, fluid connector 226, fluid connector 234, other vessels, or some combination thereof, as shown and discussed with respect to FIG. 5.

FIG. 7 shows a process 700 for controlled, accurate transfer of medical fluid by continuously or periodically monitoring the transfer to determine whether a gas or a liquid is being transferred at each predetermined or dynamically determined interval. The process 700 beings at block 702, such as after completion of the priming process 600, in response to activation of a transfer command by an operator, etc. The process 700 may be performed to transfer a desired volume of medical fluid to a destination container 44. The desired volume may be referred to as the "total desired volume" to distinguish it from (1) the volume of fluid that remains to be transferred to the destination container 44 in order to complete transfer of the total desired volume, and (2) the cumulative volume of fluid that has been transferred to the destination container 44 during the transfer process. The volume of fluid that remains to be transferred may be referred to as the "remaining desired volume." The cumulative volume of fluid that has been transferred to the destination container during the process may be referred to as the "total transferred volume." In some embodiments, at the start of the process 700 the remaining desired volume may be set equal to the total desired volume, and the total transferred volume may be set to zero.

At decision block 704, the computer processor of the fluid transfer management system 74 can determine whether the remaining desired volume of liquid to be transferred to the destination container 44 exceeds a maximum available volume of the intermediate container 40. If the remaining desired volume of liquid to be transferred to the destination container 44 is less than or equal to the maximum available volume of the intermediate container 40, the process 700 can proceed to block 706 where the computer processor sets the volume to be transferred to the intermediate container 40 equal to the entire remaining desired volume of liquid to be transferred to the destination container 44. Otherwise, if the remaining desired volume of liquid to be transferred to the destination container 44 exceeds the maximum available volume of the intermediate container 40, the process 700 can proceed to block 708 where the computer processor sets the volume to be transferred to the intermediate container 40 equal to the maximum available volume of the intermediate container 40. In this latter case, portions of the process 700 may be iteratively repeated to ensure that the entire remaining desired volume of liquid is eventually transferred to the destination container 44 in multiple steps. Each iteration of portions of the process 700 may include reducing the remaining desired volume of liquid to be transferred by the volume of liquid transferred during the prior iteration. For example, if the maximum available volume of the intermediate container 40 is 20 ml and the total desired volume of liquid to be transferred to the destination container is 55 ml, then the remaining desired volume of liquid to be transferred may be reduced by 20 ml (to a total of 30 ml) after the first iteration and reduced by 20 ml (to a total of 10 ml) after the second iteration. On the third iteration, the entire remaining desired volume of 10 ml may be transferred.

In some embodiments, the maximum available volume of the intermediate container 40 may be a static value for all instances of the process 700, while the total desired volume of liquid to be transferred to the destination container 44 may be configurable from instance to instance. In some embodiments, the maximum available volume of the intermediate container 40 may also be configurable from instance to instance.

At block 710, if the position of the multidirectional flow-control valve 41 is currently set to close a fluid pathway between the source container 39 and the intermediate container 40, the computer processor of the fluid transfer management system 74 can send an electronic signal to the electromechanical controller 36 to mechanically actuate the multidirectional flow-control valve 41 to open the fluid pathway between the source container 39 and the intermediate container 40.

At block 712, the computer processor of the fluid transfer management system 74 can send an electronic signal to the electromechanical controller 36 of the fluid transfer device 30 to mechanically actuate the electromechanical driver. In some embodiments, the electronic signal sent to the electromechanical controller 36 may indicate a single unit of the volume of medical fluid to be transferred during the current iteration as determined above in block 706 or 708, the entire volume of medical fluid to be transferred during the current iteration as determined above, or the displacement of the electromechanical driver to effectuate transfer of the unit or total volume for the current iteration. As described in greater detail above, actuation of the electromechanical driver can move the moveable platform 222 down, which can pull on the actuating stem 241 to increase the volume inside of the internal fluid chamber of the syringe pump 240, which lowers the pressure inside of the syringe pump 240 and urges liquid from the source container to flow through the stopcock 230 and into the syringe pump 240. As the electromechanical driver moves the movable platform, an optical encoder or other driver movement assessor may generate driver movement data representing the movement of the driver. The electromechanical controller 36 of the fluid transfer device 30 can transfer a particular volume of fluid by actuating the electromechanical driver for a corresponding quantity of segments detected by the optical encoder.

Figure 8:
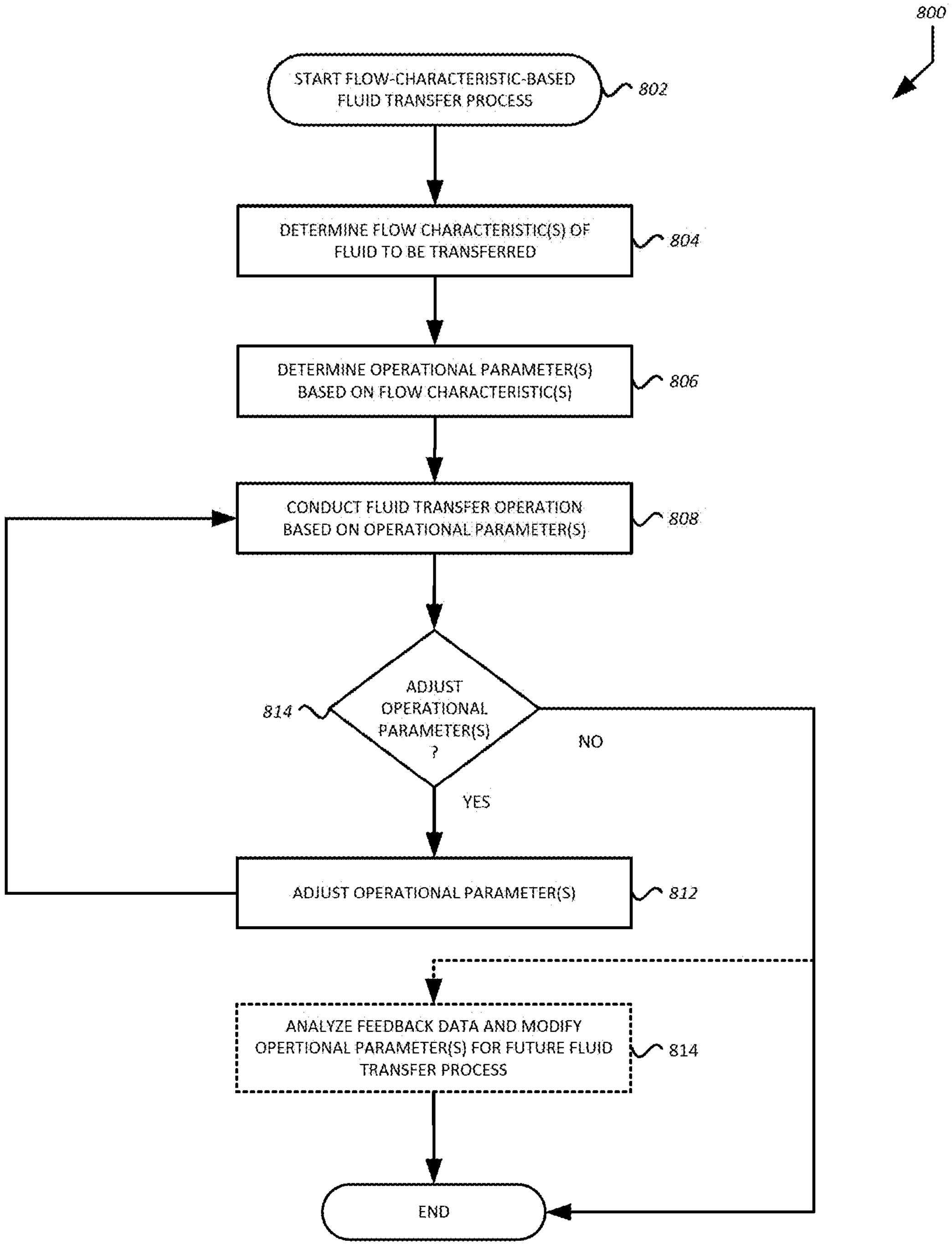
FIG. 8 is a flow chart illustrating an example of using configurable operational parameters during a fluid transfer operation.

In some embodiments, the speed at which the electromechanical driver moves the movable platform 222 down and/or the acceleration used to reach that speed may be configurable. For example, some medical fluids have a greater viscosity or are otherwise more likely to cause the occurrence of a vacuum or the formation of gas bubbles when transferred from a source container 39 to an intermediate container 40. The occurrence of a vacuum under such circumstances may be referred to as cavitation. When vacuum or gas bubbles occur, they can affect the accuracy of the fluid transfer and result in purging and re-transfer operations that reduce overall efficiency of the transfer process. To reduce the occurrence of vacuum or gas bubbles when transferring fluids with relatively high viscosity, the speed at which the transfer is performed and/or the acceleration to that speed may be set to a lower level than that used for other medical fluids with relatively low viscosity. To reduce the time to transfer lower viscosity fluids that are less likely to experience the occurrence of vacuum or gas bubbles, the speed at which the transfer is performed and/or the acceleration to that speed may be set to a higher level than that used for medical fluids with high viscosity. Thus, by allowing for configuration of the speed and/or acceleration parameters, the fluid transfer management system 74 can provide efficient transfer processes for medical fluids over a range of viscosities. An example process for using configurable parameters during the transfer of medical fluids is shown in FIG. 8.

At block 714, the computer processor of the fluid transfer management system 74 can determine whether liquid or gas is being (or has been) transferred. The determination may be made based on evaluating output of one or more sensors 215 indicating whether there is a medical fluid within at least a portion of the conduit 238 or whether there is a gas (e.g., ambient air or air bubbles) or a vacuum or partial vacuum within the conduit 238. In some embodiments, the determination may be made on a continuous or periodic basis. For example, as the electromechanical driver moves the moveable platform 222 down, the driver movement assessor may generate driver movement data. Each time a threshold quantity or predetermined quantity of segments (e.g., 1 segment, 10 segments, 100 segments, etc.) is detected by the optical encoder indicating movement of the electromechanical driver's shaft, the optical encoder can notify the computer processor of the fluid transfer management system 74. Each time the computer processor is so notified or otherwise determines that a quantity of segments has been detected, the computer processor may evaluate sensor data from the one or more sensors 215 to determine whether the volume transferred during the electromechanical driver movement represented by the predetermined quantity of segments was medical fluid or gas. The computer processor may determine a volume of the liquid and/or gas transferred during movement of the electromechanical driver based on a correspondence of a segment or quantity of segments to a volume of fluid. The computer processor may update a measurement in memory 84 regarding the volume of fluid transferred during the process, such as by updating separate values for liquid and gas, respectively.

At decision block 716, the computer processor of the fluid transfer management system 74 can determine whether the total volume of gas, or the total quantity of electromechanical driving movement readings associated with gas, transferred during the process 700 (or the current iteration of this portion of the process 700) satisfies a gas limit threshold (e.g., meets or exceeds a threshold). If so, the source container 39 may not have any medical fluid remaining, and may therefore be empty and only comprise gas to be transferred. In response, the process 700 may proceed to block 718 to mitigate the transfer of gas. Otherwise, if the total volume of gas (or quantity of driver movement readings associated with gas) transferred during the process or current iteration thereof does not satisfy the gas limit threshold (e.g., is less than the threshold), then the process 700 may proceed to decision block 722.

At block 718, the computer processor of the fluid transfer management system 74 can initiate a procedure to expel gas from the intermediate container 40 or syringe pump. In some embodiments, the computer processor of the fluid transfer management system 74 can send an electronic signal to the electromechanical controller 36 of the fluid transfer device 30 to mechanically actuate the electromechanical driver. The electromechanical driver may upwardly move the movable platform 222 and the syringe pump 240, thereby decreasing the volume and increasing the pressure within the intermediate container 40 or syringe pump 240 to urge or push liquid and any accompanying air within the intermediate container 40 or syringe pump backward or in reverse from the intermediate container 40 or syringe pump 240 into the flow-control valve 41, and the inlet connector 226. Thus, air in the intermediate container 40 or syringe pump can be purged.

At block 720, the computer processor of the fluid transfer management system 74 can determine whether to set the state of the process 700 to an empty source state. In some embodiments, determination of whether to set the state to an empty source state may be based on the number of times gas has been expelled, the volume of gas detected, the quantity of units of fluid transferred that included gas, another factor, or some combination thereof. For example, if blocks 718 and 720 are reached a threshold number of times during the current iteration of the process 700 (e.g., 2 times, 5 times, etc.), then the source container 39 may be empty. As another example, if the total volume of gas transferred exceeds a second threshold, above the gas limit threshold for expelling the gas and continuing with the transfer, then the source container 39 may be empty.

In some embodiments, setting the state of the process 700 may comprise changing a value of a property or variable, sending a message, another operation, or some combination thereof. For example, the computer processor may transmit, or cause transmission of, an empty source message regarding the empty source container 39 to another component of the fluid transfer management system 74, such as the user interface 78. The message may be displayed or otherwise presented by the user interface 78 as described in greater detail above.

If the state of the process 700 has been set to an empty source state, the computer processor of the fluid transfer management system 74 can wait to receive a command to resume (or start over) the process 700. In some embodiments, the command may come from the user interface 78. For example, as described in greater detail above, an operator may receive, via the user interface 78, an empty source message indicating that the source container 39 is empty, and perform a remedial action. After addressing the problem that caused the empty source state, the operator may use the user interface 78 to indicate that the source container 39 has been replaced or that the process 700 may otherwise proceed at block 712.

At decision block 722, the computer processor of the fluid transfer management system 74 can determine whether the total volume of liquid transferred from the source container 39 to the intermediate container 40 has reached the volume determined above at block 706 or 708. In some embodiments, the computer processor may evaluate a measurement in memory 84 regarding the volume of liquid transferred during the current iteration of this portion of the process 700. If the volume of liquid transferred thus far has reached the volume determined in block 706 or 708, the process 700 may proceed to block 724 to record the transfer. Otherwise, if the volume of liquid transferred during the current iteration of the process 700 has not yet reached the volume determined in block 706 or 708, fluid may continue to be transferred from the source container 39 to the intermediate container 40 and the process 700 may return to block 714 to continue to monitor the transfer.

Figure 11:
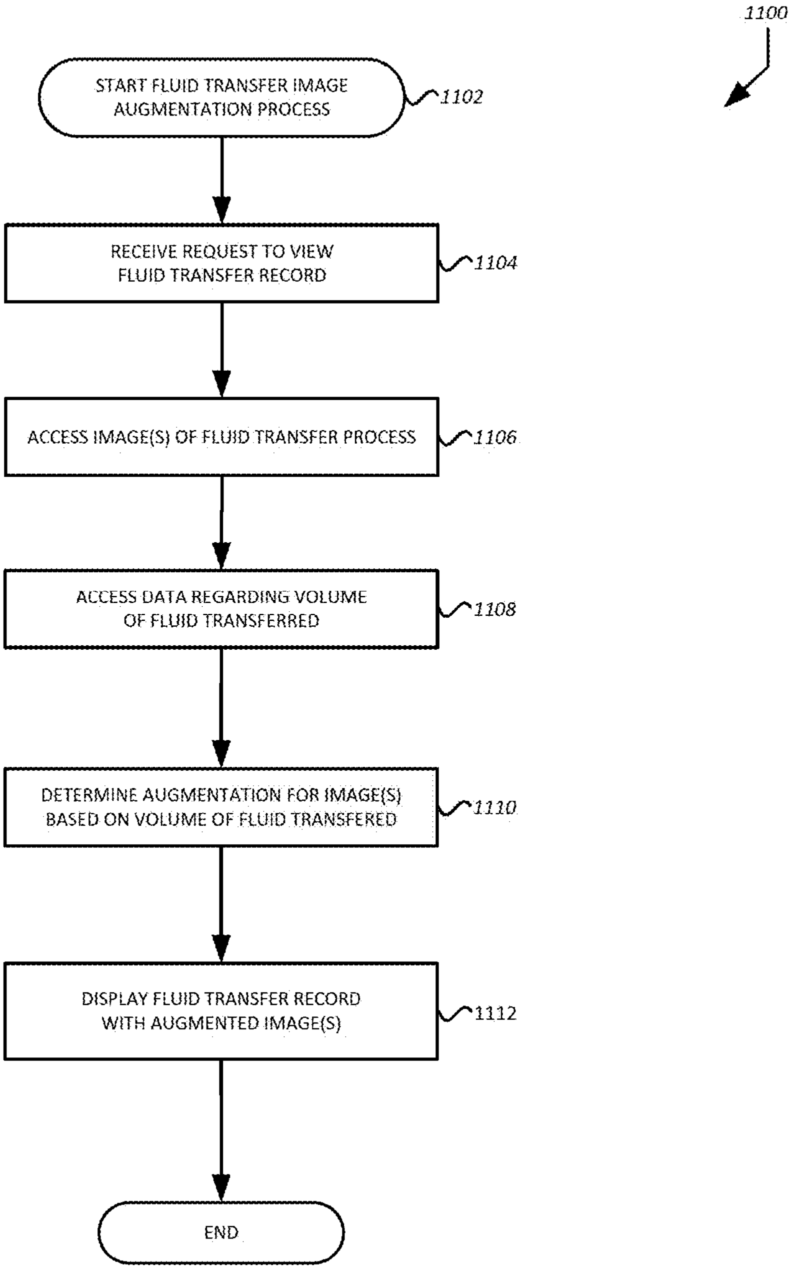
FIG. 11 is a flow chart illustrating an example of a process for displaying a record of a fluid transfer operation.
Figure 12A:
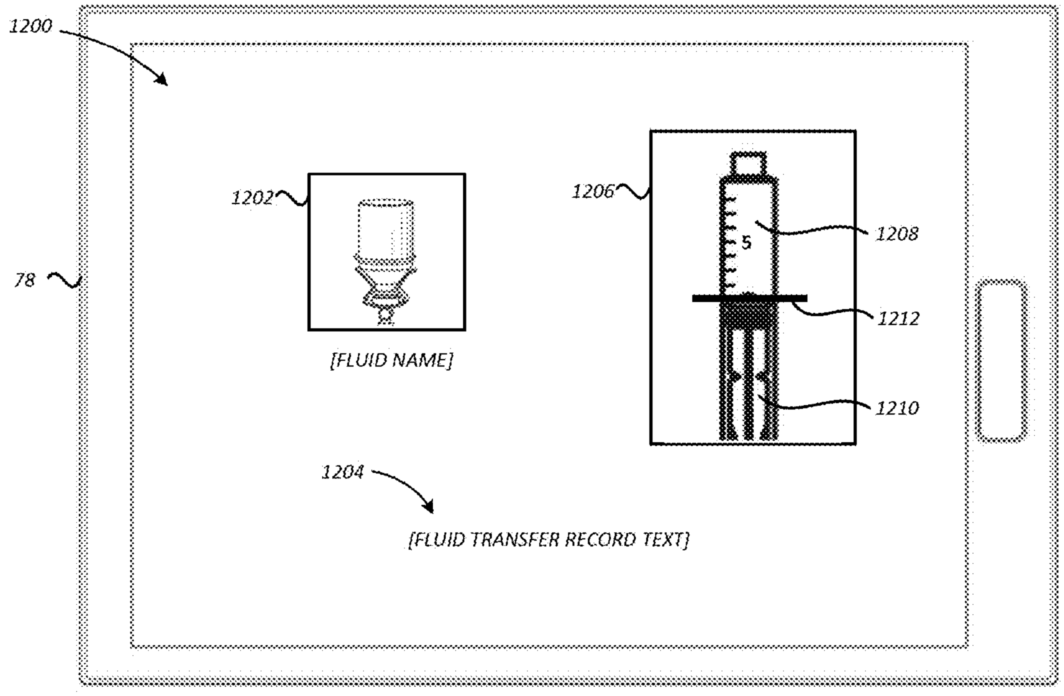
FIG. 12A is a front plan view of an example of a user interface displaying a record of a fluid transfer operation.
Figure 12B:
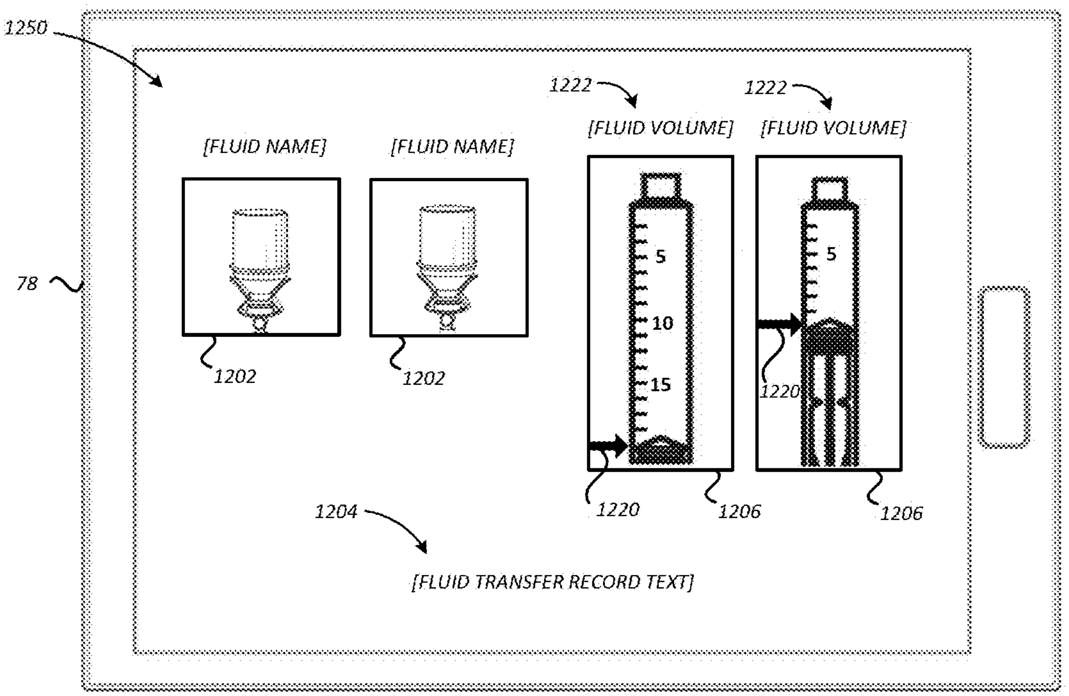
FIG. 12B is a front plan view of an example of a user interface displaying a record of a fluid transfer operation.

At block 724, the computer processor of the fluid transfer management system 74 can initiate an operation to create a record of the fluid transferred to the intermediate container 40. In some embodiments, the computer processor may send an electronic signal to a measuring instrument such as a sensor 225. For example, the sensor 225 may be a camera, and the electronic signal may cause the camera to capture an image of the intermediate container 40. The image may be captured to create a visual record of the volume of fluid that has been transferred to the intermediate container 40 during the current iteration of the process 700. The image may be stored, such as a file in memory 84. Additional data may be stored with or otherwise associated with the image. For example, data indicating the volume of fluid that has been transferred to the intermediate container 40 shown in the image may be stored and used during subsequent processes as a confirmation of the volume shown in the image. FIGS. 11, 12A, and 12B show and describe an example process and user interface for displaying images of fluid transfer operations, and augmenting the images based on volume information stored with or otherwise associated with the images.

At block 726, the computer processor of the fluid transfer management system 74 can cause the multidirectional flow-control valve 41 to close the fluid between the source container 39 and the intermediate container 40, and open the fluid pathway between the intermediate container 40 and the destination container 44. For example, the computer processor can send an electronic signal to the electromechanical controller 36 to mechanically actuate the multidirectional flow-control valve 41 to close and open the appropriate fluid pathways.

At block 728, the computer processor of the fluid transfer management system 74 can proceed with transferring the fluid from the intermediate container 40 to the destination container 44. In some embodiments, the computer processor of the fluid transfer management system 74 can send an electronic signal to the electromechanical controller 36 of the fluid transfer device 30 to mechanically actuate the electromechanical driver. The electromechanical driver may upwardly move the movable platform 222 and the syringe pump 240, thereby decreasing the volume and increasing the pressure within the intermediate container 40 or syringe pump 240 to urge or push the fluid from the intermediate container 40 or syringe pump 240 into the destination container 44.

As the electromechanical driver moves the movable platform 222, an optical encoder or other driver movement assessor may generate driver movement data representing the movement of the driver. In some embodiments, the computer processor of the fluid transfer management system 74 can evaluate sensor data from one or more sensors 215 to determine whether the volume transferred during the electromechanical driver movement represented by the driver movement data was medical fluid or gas. For each segment or set of segments that are detected by the optical encoder and associated with movement of liquid as detected by the one or more sensors 215, the computer processor may determine the corresponding volume of liquid that has been transferred and update the total transferred volume of liquid that has been transferred to the destination container 44. For example, the computer processor may update a value stored in memory 84. For each segment or set of segments that are detected by the optical encoder and associated with movement of gas as detected by the one or more sensors 215, the computer processor may not add to the total transferred volume of liquid that has been transferred to the destination container 44. When calculated in this manner, the data regarding the total transferred volume can more accurately reflect the actual volume of liquid that has been transferred to the destination container 44, and will exclude the volume of gas (if any) that is transferred to the destination container 44, exclude the volume of liquid (if any) that remains in the intermediate container 40, etc.

At decision block 730, the computer processor of the fluid transfer management system 74 can determine whether the total desired volume of liquid to be transferred to the destination container 44 has been transferred. For example, the computer processor can subtract the total transferred volume from the total desired volume. If the difference is zero, the process 700 may end. Otherwise, if the total desired volume is greater than the total transferred volume, the difference may be used as the remaining desired volume and the process 700 may return to block 704.

In some embodiments, a process similar to the fluid transfer process 700 in reverse may be performed to remove air from a destination container 44. For example, a user may desire to transfer medical fluid to a destination container 44 that was previously used, delivered without being purged, etc. Prior to transferring the medical fluid, the air in the destination container 44 may be removed. To remove the air from the destination container 44, the computer processor of the fluid transfer management system 74 may cause a fluid path to be opened between the destination container 44 and the intermediate container 40. The computer processor may then cause mechanical actuation of the electromechanical driver that in turn causes the moveable platform 222 to move down, pull on the actuating stem 241 to increase the volume inside of the internal fluid chamber of the syringe pump 240, lower the pressure inside of the syringe pump 240, and urge air from the destination container 44 to flow through the stopcock 230 and into the syringe pump 240. Once the desired volume of air has been transferred to the intermediate container 40, the computer processor of the fluid transfer management system 74 may cause a fluid path to be opened between the intermediate container and a source container 39 (or the environment). The computer processor may then cause mechanical actuation of the electromechanical driver that in turn causes the moveable platform 222 to move up, push on the actuating stem 241 to decrease the volume inside of the internal fluid chamber of the syringe pump 240, raise the pressure inside of the syringe pump 240, and urge air from the syringe pump 240 to flow through the stopcock 230 and into the source container 39 (or the environment). This process may be repeated as needed to remove the desired volume of air from the destination container 44. Once the destination container 44 has been sufficiently purged of air, medical fluid may be transferred to the destination container 44 as described herein.

FIG. 8 shows a process 800 for transfer of medical fluid using dynamically configurable operational parameters. Operational parameters may be configured based on one or more flow characteristics of the fluid to be transferred, such as the viscosity, density, and/or compressibility of the fluid. Advantageously, certain operational parameters may be configured so as to reduce or eliminate the occurrence of vacuum or gas bubbles that may occur during the transfer of some fluids (e.g., relatively higher-viscosity medial fluids) and/or to increase the speed at which some fluids may be transferred (e.g., relatively lower-viscosity medical fluids).

The process 800 beings at block 802. In some embodiments, the process 800 may be initiated during any transfer operation performed by the fluid transfer management system 74, such as during the priming process 600 or transfer process 700 described herein. For example, some portions of the process 800 may be performed prior to block 712 of the transfer process 700, and other portions may be performed during and after blocks 712-722.

At block 804, the computer processor of the fluid transfer management system 74 can determine one or more flow characteristics of the fluid to be transferred from the source container 39 to the intermediate container 40. In some embodiments, flow characteristic data representing a flow characteristic such as the viscosity of the fluid may be provided by a user or from a look-up table or other form of transmitted or stored data when a transfer operation is initiated. For example, an operator may initiate a transfer operation and indicate a measurement of the viscosity (e.g., in centipoise or "cP") of the fluid to be transferred. In some embodiments, the computer processor can determine the viscosity based on information provided to initiate the transfer operation. For example, an operator may provide an identifier or other indication of the fluid to be transferred, and the computer processor can access a viscosity measurement for the fluid in a cross-reference table or other database. A table may include different records for different fluids or groups of fluids, and each record may include values or ranges of viscosities for the corresponding fluids. In some embodiments, the viscosity of the fluid can be determined using a sensor. In some embodiments, the computer processor may not determine the viscosity prior to determining the operational parameters to be used for the current fluid transfer process, as described below.

At block 806, the computer processor of the fluid transfer management system 74 can determine operational parameters for the transfer process. The operational parameters may include the speed at which the fluid is to be transferred, the acceleration to be used to reach the speed, some other parameter, or some combination thereof. In some embodiments, the computer processor can access one or more operational parameters for the current flow characteristic(s) in a cross-reference table or other database. For example, a table may include different records for different viscosities or ranges of viscosities, and each record may include values of one or more operational parameters such as speed and/or acceleration. In some embodiments, the operational parameters may be provided or otherwise determined without necessarily referencing the flow characteristic(s) of the fluid. For example, an operator may initiate a transfer operation and indicate the operational parameter(s) to be used. As another example, the computer processor may access a cross-reference table or other database that includes records indicating the operational parameter(s) to be used for different fluids that are to be transferred without necessarily referencing the viscosity or other flow characteristics of the fluids.

At block 808, the computer processor may initiate or perform certain portions of a fluid transfer operation using the determined operational parameter(s). As described above, the computer processor may send an electronic signal to the electromechanical controller 36 of the fluid transfer device 30 to mechanically actuate the electromechanical driver, which causes the moveable platform 222 to move down, pull on the actuating stem 241 to increase the volume inside of the internal fluid chamber of the syringe pump 240, lower the pressure inside of the syringe pump 240, and urge liquid from the source container to flow through the stopcock 230 and into the syringe pump 240. In some embodiments, the electronic signal (or another electronic signal) may indicate certain operational parameters to be used to effectuate the transfer of liquid from the source container to the intermediate container. For example, the electronic signal may indicate the speed at which the electromechanical driver is to move the moveable platform 222 down, the acceleration to be used to arrive at the speed, or the like. The electromechanical controller 36 may then manage the electromechanical driver according to the operational parameters.

At decision block 810, the computer processor may determine whether to adjust one or more operational parameters of the fluid transfer operation. In some embodiments, as described in greater detail above, as the electromechanical driver moves the movable platform 222, the computer processor of the fluid transfer management system 74 can evaluate sensor data from one or more sensors 215 or obtain monitored data from a memory regarding previous commands and/or responses to previous commands communicated over time between different components or subsystems of the electronic transfer system, such as between an electronic controller and one or more motors. The sensor or monitor data may help determine whether a volume of fluid transferred during the electromechanical driver movement (e.g., during a quantity of segments detected by the driver movement assessor) was medical fluid or bubbles of gas or vacuum. The computer processor can determine whether a volume of bubbles (of gas or vacuum) satisfies a gas limit threshold (e.g., meets or exceeds a threshold). If the volume of bubbles satisfies the threshold, the process 800 may proceed to block 812 to implement a change in one or more operational parameters of the fluid transfer process, such as in the example provided below. Otherwise, if the desired volume of fluid is transferred and the volume of bubbles does not satisfy the gas limit threshold, the process 800 may complete.

At block 812, the computer processor of the fluid transfer management system 74 may initiate or adjust one or more operational parameters of the fluid transfer process. In some embodiments, the computer processor may initiate with a particular speed or acceleration based upon information received or inputted from one or more reference sources (e.g., user input, look-up tables, data from a remote source, etc.) and/or implement a reduction in speed or acceleration in response to detecting gas or vacuum bubbles during the fluid transfer process. For example, the computer processor may reduce the speed by a predetermined or dynamically determined amount or percentage if any gas is detected or if any threshold amount of gas over a particular time is detected. The process 800 may then return to decision block 810 to monitor the fluid transfer operation and determine whether to further adjust one or more operational parameters. In some embodiments, the computer processor may stop the fluid transfer process 800 by sending an electronic signal to the electromechanical controller to mechanically stop the electromechanical driver, which causes the moveable platform 222 to stop moving down and stops the flow of fluid through the stopcock 230 and into the syringe pump 240. The stopping operation may be performed and held on a temporary basis before restarting the fluid transfer process using the same operational parameters, or operational parameters that have been adjusted at block 812.

At block 814, the computer processor of the fluid transfer management system 74 may analyze the feedback data regarding fluid transfer operations and adjustments implemented to one or more operational parameters of the fluid transfer operations. Based on this analysis, the computer processor may modify the operational parameters that may be used for future transfers of the same medical fluid and/or fluids with the same or similar flow characteristics as the fluid transferred during the current operation. In some embodiments, feedback data generated during or after the fluid transfer may represent, among other things: the fluid and/or viscosity of the fluid transferred, the volume of fluid transferred, the operational parameters used during the transfer of a portion of the volume of fluid, detection or non-detection of gas bubbles (air or vacuum) during transfer of the portion of the volume of fluid, changes implemented to operational parameters based on detection of the gas bubbles, detection or non-detection of gas bubbles (air or vacuum) during transfer of a subsequent portion of the volume of fluid, changes implemented to operational parameters based on detection of the gas bubbles in the subsequent portion of the volume of fluid, and the like. The feedback data may be stored in a database, such as in memory 84 of the fluid transfer management system 74.

The computer processor may access the feedback data at the conclusion of the fluid transfer operation, on a predetermined or dynamically determined schedule, upon initiation by a user, or in response to some other event. The computer processor may determine whether the adjustments to the operational parameters implemented during the fluid transfer operation were effective. For example, the computer processor may determine whether the adjustments resulted in the elimination of substantially all gas bubbles, or resulted in a reduction of the occurrence of gas bubbles that satisfies a criterion such as bringing the volume of gas below a threshold. If the adjustments are determined to be successful, the computer processor may modify the operational parameters used during future transfers of the same medical fluid and/or fluids with the same or similar flow characteristics as the fluid transferred during the current operation. The modification may be to set the operational parameters equal to the adjusted operational parameters that resulted in the desired elimination or reduction in gas bubbles.

In some embodiments, the computer processor may not modify the operational parameters until a threshold number of fluid transfer operations result in dynamic adjustments to operational parameters being implemented. For example, the computer processor may only implement modifications after 2, 5, 10, or more fluid transfer operations for a particular medical fluid (or fluid with a particular flow characteristic) result in the dynamic adjustment of operational parameters. The computer processor may then modify the operational parameters based on an analysis of the set of observed adjustments, such as by calculating the average adjustment, the median adjustment, the minimum adjustment, or the maximum adjustment.

In some embodiments, the feedback data and/or modifications made to operational parameters for future fluid transfer operations may be sent to a centralized system, such as a remote network-accessible server or "cloud" system, that is in communication with multiple fluid transfer management systems 74. The centralized system may aggregate the feedback data and/or modifications made to operational parameters, and determine when modifications to operational parameters are to be distributed to the various fluid transfer management systems 74. The centralized system may not distribute modified operational parameters until a threshold number of fluid transfer operations result in dynamic adjustments to operational parameters being implemented. For example, the centralized system may only distribute modifications after 20, 50, 100, or more fluid transfer operations for a particular medical fluid (or fluid with a particular flow characteristic) result in the dynamic adjustment of operational parameters. The centralized system may then modify the operational parameters based on an analysis of the set of observed adjustments, such as by calculating the average adjustment, the median adjustment, the minimum adjustment, or the maximum adjustment. The modified operational parameters may be distributed to, and implemented by, one or more of the fluid transfer management systems 74.

Figure 9:
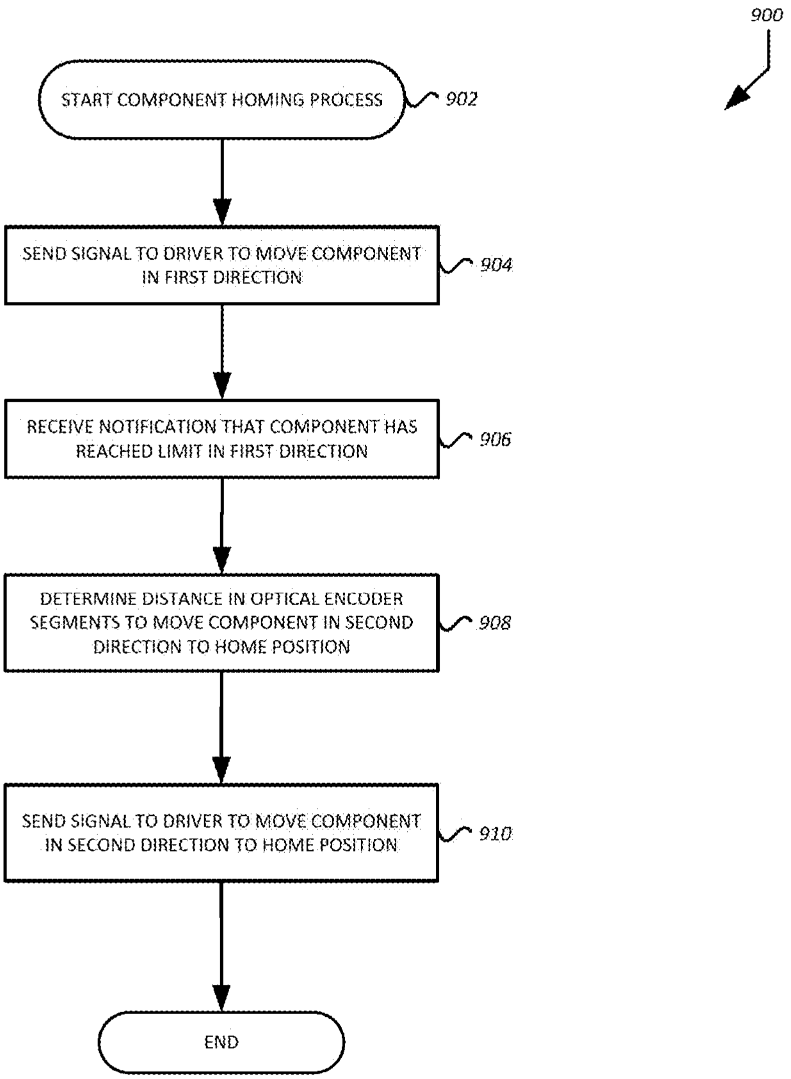
FIG. 9 is a flow chart illustrating an example of homing a component of a fluid transfer device.

FIG. 9 shows a process 900 for setting the location of a component moved by an electromechanical driver, such as the multidirectional flow-control valve 41 (e.g., stopcock) or moveable platform 222, to a particular default or otherwise predetermined location or other position. Such a process may be referred to as "homing" the component, and the predetermined location or other position may be referred to as the "home position." Advantageously, the homing process may be performed using a driver movement assessor such as an optical encoder to provide accurate homing to the home location between the movement limits of the component being homed.

The process 900 beings at block 902. In some embodiments, the process 900 may be initiated when the fluid transfer system 74 is powered up or otherwise begins operation, or in response to some other event such as a stall condition of the electromechanical driver.

At block 904, the computer processor of the fluid transfer management system 74 may send an electronic signal to the electromechanical controller 36 to actuate the electromechanical driver for the component to be homed (e.g., the multidirectional flow-control valve 41 or moveable platform 222). The electronic signal may cause the electromechanical driver to move the component in a predetermined direction. For example, the electromechanical driver may be configured to move the component in two directions: a first direction and a second direction. If the component rotates, then the two directions may be determined with respect to direction of rotation around a rotation axis. If the component moves linearly, the two direction may be determined with respect to direction of movement along a linear axis. During the homing operation, the electromechanical driver may always be instructed to first move the component in the first direction and not the second direction. The electromechanical driver may be instructed to move the component in the first direction until reaching the limit of movement in that direction.

At block 906, the electromechanical driver may reach the limit of movement in the first direction for the component being homed. The computer processor may determine that the electromechanical driver has reached the limit based on the driver entering a stall condition. In some embodiments, rather than the electrotechnical driving moving the component in the first direction until a stall condition occurs, there may be a limit sensor that detects when the electromechanical driver has moved the component to the limit in the homing direction. The computer processor may be notified when the limit sensor detects that the electromechanical driver has moved the component to the limit in the first direction.

At block 908, the computer processor of the fluid transfer management system 74 may determine the distance that the component being homed is to be moved in a second direction to reach the home position. In some embodiments, as described above, the driver may include, be coupled to, or otherwise be associated with a driver movement assessor such as an optical encoder or stepper. The computer processor may determine the distance that driver is to move the component to reach the home position in terms of the number of segments that are to be detected by the driver movement assessor. When the component is first moved to the limit in the first direction, and when the home position is a predetermined position between the limits in each direction, there may be a corresponding predetermined quantity of segments to be detected by the driver movement assessor to reach the home position.

At block 910, the computer processor of the fluid transfer management system 74 may send an electronic signal to the electromechanical controller 36 to cause the component being homed to move to the home position. In some embodiments, the electronic signal may be a signal to actuate the electromechanical driver for the component to be homed to move the component for the distance determined above at block 908. The distance may be provided in terms of the quantity of segments to be detected by the driver movement assessor to reach the home position. The electromechanical controller 36 may then cause the component being homed to move the home position by controlling the electromechanical driver to move the component in the second direction until the quantity of segments determined above have been detected.

Figure 10:
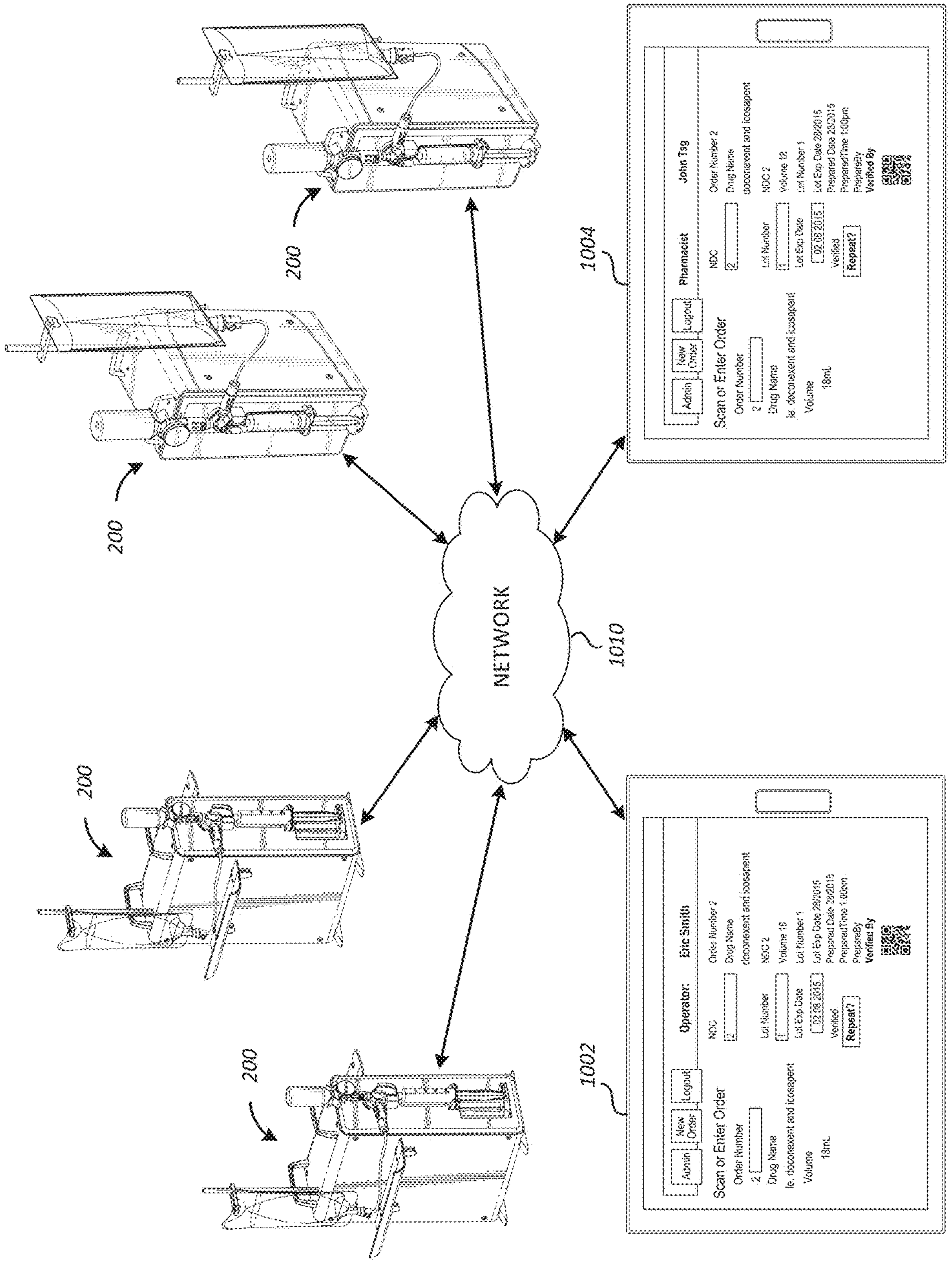
FIG. 10 is a schematic illustration of user interfaces configured to electronically communicate with each other medical fluid transfer devices.

FIG. 10 illustrates a fluid transfer environment that includes multiple fluid transfer units 200 and multiple user interfaces 78 in communication via a communication network 1010. As shown, in some embodiments the user interface 78 may include multiple distinct units, such as an operator interface 1002 and a pharmacist user interface 1004. The distinct units may provide different functionality, the same functionality, or partially overlapping functionality. For example, the operator interface 1002 can be used by user who is directly operating or otherwise interacting with one or more fluid transfer units 200 (e.g., attaching and detaching source containers 39, intermediate containers 40, and destination containers 44). The pharmacist interface 1004 can be used by a user who is not necessarily directly interacting with fluid transfer units 200, but who may instead be overseeing the work of one or more operators, approving medical fluid preparations for dispensation or storage, etc.

In some embodiments, the pharmacist interface 1004 may be used from a remote location, such as a different room or building than the operator tablet. In some embodiments, data regarding fluid transfer orders, drug libraries, records of prior fluid transfer operations, and the like may be stored on one or more of the user interfaces 78. For example, the pharmacist interface 1004 may serve as the central data store, and may include one or more databases for storing preparation data, drug library information (e.g., names, identifiers, concentrations, lot numbers, expiration dates, dosage limits, etc.), operational parameters for transferring medical fluids (e.g., speed, acceleration), records of fluid transfer operations (including images, volume data, user logging data, etc.), and the like. The operator interface 1002 may access any needed data via a network connection to the pharmacist interface 1004. In some embodiments, data stored on one user interface, such as the pharmacist interface 1004, may be replicated or synchronized to another user interface, such as the operator interface 1002. In this case, the user interface that does not serve as a central data store may nevertheless have local access to a copy of some or all data stored at the central data store.

Although only one operator interface 1002 and one pharmacist interface 1004 are shown, in some embodiments additional operator interfaces 1002, pharmacist interfaces 1004, and/or other types of interfaces 78 may be used. In addition, although only one type of fluid transfer unit 200 is shown in FIG. 10, in some embodiments the user interfaces 78 can be universally compatible with a plurality of different fluid transfer devices, such as different versions, models, types, or classes of fluid transfer devices. For example, a single user interface 78 can be configured to electronically communicate with (e.g., by transferring data to and/or from) a plurality of different fluid transfer devices that are performing separate fluid transfer operations, such as filling destination containers with a plurality of different therapeutic fluids and/or for a plurality of different patients. The user interface 78 can be configured to simultaneously or generally concurrently control and/or record information from any or a plurality or all of such operations. The user interface 78 can comprise a plurality of different communication capabilities, including a plurality of different electronic communicators and/or a plurality of different communication protocols for use with any of such electronic communicators.

In one illustrative, non-limiting embodiment, a fluid transfer operation may be coordinated among the user interfaces and a fluid transfer unit 200 using the following protocol: [1] data regarding the fluid transfer operation (e.g., drug library record(s) for fluids to be transferred, order information, etc.) may be communicated from the pharmacist interface 1004 to the operator interface 1002, either upon request from the operator interface 1002 or as a push delivery from the pharmacist interface 1004; [2] initial operation setup data may be generated and stored by the operator interface 1002, such as images of input containers 39 to be used; [3] operational parameters may be communicated from the operator interface 1002 to the fluid transfer unit 200 upon initiation by a user of the operator interface 1002, such as the volume of fluid to be transferred, and the speed and acceleration with which the fluid is to be transferred; [4] the fluid transfer unit 200 may confirm receipt of the operational parameters, and stand by for a command to begin the transfer; [5] the operator interface 1002 may send a command to the fluid transfer unit 200 to begin the transfer, such as in response to user activation of a user interface control on the operator interface 1002; [6] the fluid transfer unit 200 may perform the fluid transfer operation, and provide status updates to the operator interface 1002 continuously or periodically throughout the operation, such as data about the volume transferred thus far, any priming or purging operations performed, etc.; [7] the operator interface 1002 can update its display to provide status information to the user of the operator interface 1002; [8] if the fluid transfer unit 200 encounters an error, such as an empty source state, the fluid transfer unit 200 may send an error message to the operator interface 1002 and stand by for a command to resume the transfer or perform some other operation; [9] the operator interface 1002 can send a command to resume the transfer, such as after a user has corrected the cause of the error (e.g., attached a new source container 39); [10] the fluid transfer unit 200 can resume the transfer; [11] upon successful completion of the transfer, the fluid transfer unit 200 can provide a notification to the operator interface 1002, and additional data such as images captured during the transfer process; [12] the operator interface 1002 can provide data regarding the transfer process to the pharmacist interface 1004.

FIG. 11 shows a process 1100 for viewing fluid transfer records, including images and/or other visual representations of a medication preparation or other fluid transfer operation. Advantageously, images can provide visual confirmation of fluid transfer operation, and may be augmented to provide further confirmation of the volume of fluid transferred.

The process 1100 beings at block 1102. In some embodiments, the process 1100 may be initiated during user interaction with a user interface 78, such as an operator interface 1002 or pharmacist interface 1004 shown in FIG. 10. For example, a user may use an operator interface 1002 to review details of a medication preparation or other fluid transfer operation prior to finalizing the operation, printing labels, submitting the operation to a pharmacist for approval, or the like. As another example, a user may use a pharmacist interface 1004 to review details of a fluid transfer operation prior to approving dispensation or storage of a destination container 44 into which medical fluid has been transferred. In these or other cases, the user may wish to review a visual record of the fluid transfer operation. The process 1100 will be described as being performed by such a user interface 78, however in some embodiments some or all of the functions may be performed by the computer processor or some other component of the fluid transfer management system 74.

At block 1104, the user interface 78 or some other component of the fluid transfer management system 74 can receive a request to view a record regarding a particular medication preparation or other fluid transfer operation. In some embodiments, the request may include an identifier of the operation to which the request applies. For example, a user may select a particular fluid transfer operation from a list of completed and/or in-progress fluid transfer operations. Selection of a particular operation may include activating a link or tapping a button on the user interface 78, which may initiate a request including an identifier of the fluid transfer operation selected by the user.

At block 1106, the user interface 78 can access one or more images created during the transfer operation. In some embodiments, the images may be stored as files in memory 84 or another data store, and associated with an identifier of the fluid transfer operation. For example, names of the image files may be configured using a naming convention that includes the identifier of the fluid transfer operation. As another example, a database record that references the identifier of the fluid transfer operation may identify the file name and/or location of the image files(s) for the fluid transfer operation. The user interface 78 may use this information to load the image files.

At block 1108, the user interface 78 can access volume data indicating the volume of fluid that was transferred to the intermediate container 40 depicted in each image file. In some embodiments, the volume data may be embedded into or stored in connection with each image file. For example, a naming convention of an image file or metadata stored with the file may include the volume represented by the image. In some embodiments, the volume data may be stored separately from the image files, such as in a database that includes data regarding the fluid transfer operation.

At block 1110, the user interface 78 can determine an augmentation to be displayed with the image file. The augmentation may provide a visual indication of the volume of fluid in the intermediate container 40 depicted in the image file. Such an augmentation can be helpful to users in quickly ascertaining the volume of fluid depicted in the image, particularly in cases where the fluid level, syringe plunger, syringe stem, or other aspects of the image are difficult to see or not visible.

In some embodiments, the augmentation may be a graphical indicator, such as a line or arrow, that is superimposed onto the image to help indicate the fluid level of the intermediate container 40. The user interface 78 can determine the location at which to display the augmentation within the image using a function or mapping of fluid volume to image location. For example, each image may be taken using a camera, such as sensor 225, that is positioned at static location. The camera may produce images that are each of the same resolution, level of zoom, angle of perspective, etc., regardless of the operational parameters used to transfer the fluid and regardless of the fluid that is transferred. In addition, the intermediate container 40 in each image may have the same shape and dimensions. Therefore, due to the static nature of the camera location, image parameters, and intermediate container 40 characteristics, a particular volume of fluid may have a fluid level depicted at the same location of an image each time the particular volume of fluid is imaged (e.g., a volume of $x_1$ milliliters will always or substantially always result in a fluid level that is $y_1$ pixels from a reference location such as the top or bottom of the image, a volume of $x_2$ milliliters will always or substantially always result in a fluid level that is $y_2$ pixels from the reference location, etc.). The correspondence of fluid level image locations to fluid volumes may be stored in a cross-reference table or other database, or it may be modeled by a function that is evaluated using the fluid volume as input. To determine the fluid level image location at which the augmentation is to be displayed, the user interface 78 may query the database for the fluid level image location (e.g., pixel offset or coordinates) that corresponds to the fluid volume depicted in the image, or evaluate a function to obtain the fluid level image location that corresponds to the fluid volume.

The relationship between fluid volume and fluid level image locations may in some embodiments be linear, such that a volume of x milliliters will always or substantially always result in a fluid level that is y pixels from the top or bottom of the image, a volume of 2x milliliters will always or substantially always result in a fluid level that is 2y pixels from the top or bottom of the image, etc. For example, the camera may be positioned such that its optical axis is orthogonal (or substantially orthogonal) to an axis of movement of the syringe plunger or syringe stem of the intermediate container 40, and the fluid level is typically in or near the center of the camera's field of view. In some embodiments, the relationship between fluid volume and fluid level may not be linear. For example, if the camera is positioned such that its optical axis forms a non-orthogonal angle with an axis of movement of the syringe plunger or syringe stem of the intermediate container 40 and/or the fluid level is not typically near the center of the camera's field of view, then the relationship between fluid volume and fluid level image location may not be linear over the range of volumes to be imaged (e.g., the relationship may be modeled by a polynomial instead of a linear function).

In some embodiments, the augmentation may be an alphanumeric indicator of fluid volume that is to be superimposed onto the image, displayed adjacent to the image, or otherwise displayed in connection with the image. For example, instead of or in addition to determining a display location of a graphical indicator of the fluid level, the user interface 78 may generate a label to present the fluid volume measurement.

At block 1112, the user interface 78 may display the requested fluid transfer record and augmented fluid transfer image(s). Examples of augmented fluid transfer images are shown in FIGS. 12A and 12B.

As shown in FIG. 12A, in some embodiments the user interface 78 may display a fluid transfer record 1200 that includes various data items, images, and the like. For example, the fluid transfer record may include a source image 1202 of a source container 39 from which fluid was transferred. The fluid transfer record 1200 may also include text data 1204 regarding aspects of the fluid transfer operation that is the subject of the fluid transfer record 1200, such as names, identification numbers, lot numbers, and/or expiration dates of fluids transferred during the operation. In addition, the fluid transfer record 1200 may include one or more augmented fluid transfer images 1206.

A fluid transfer image 1206 may depict an intermediate container 40 used during the fluid transfer operation. The depicted intermediate container 40 may have medical fluid 1208 that has been transferred from the source container 39. The intermediate container 40 may also have a stem, such as a plunger 1210 if the intermediate container 40 is a syringe, that was moved to urge the medical fluid 1208 into the intermediate container 40 during the fluid transfer operation. The augmentation 1212 may be displayed as superimposed over the portion of the intermediate container 40 at which the fluid level is expected to be for the volume of fluid transferred into the intermediate container 40. As shown, the augmentation 1212 may be a graphical line that is offset from the top or bottom of the image by a number of pixels, or displayed at image coordinates, determined by the user interface 78 based on the fluid volume that was transferred to the intermediate container 40. In some embodiments, the fluid transfer image 1206 may be zoomed (e.g., using a reverse-pinch gesture, interacting with a graphical interface control, etc.) to aid a user in seeing the fluid level. During such a zoom operation, the location of the augmentation 1212 may be dynamically changed to remain at a location that represents the fluid level within the intermediate container 40.

In some embodiments, as shown in FIG. 12B, the user interface 78 may display a fluid transfer record 1250 that includes multiple source images 1202 and/or multiple fluid transfer images 1206. For example, if the fluid transfer operation included transfers of multiple different types of fluid or otherwise from multiple different source containers 39, then there may be multiple source images and multiple fluid transfer images, with at least one pair of source image and fluid transfer image for each of the different source containers 39. As another example, if the total transferred volume exceeded the maximum volume of the intermediate container 40, then multiple fluid transfer images 1206 may be shown, one fluid transfer image 1206 for each discrete transfer of fluid into the intermediate container 40. In some embodiments, augmentations other than lines may be shown on or in connection with a fluid transfer image. For example, an arrow augmentation 1220 may be shown. As another example, a label 1222 may be shown. The example augmentations shown and described are illustrative only, and are not intended to be limiting. In some embodiments, additional and/or alternative augmentations may be used. In some embodiments, a camera-captured image of an intermediate container 40 may not be shown. Instead, a re-created graphical representation of the intermediate container and fluid transferred thereto may be rendered and shown by the user interface 78, with or without augmentation.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as programmable computer central processing unit (CPU), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. When a method, process, routine, or algorithm is to be executed, executable instructions may be loaded to or accessed at a storage medium and executed by one or more processors. In some embodiments, the storage medium can be integral to the processor device. The processor device and the storage medium can reside in an ASIC. The ASIC can reside in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. An electronic medical fluid transfer device comprising:

a fluid transfer module comprising a first inlet fluid connector, a second outlet fluid connector, and a pumping region;

a sensor configured to detect whether a region of at least one of vacuum, partial vacuum, or gas is present in the fluid transfer module;

an electromechanical driver configured to be mechanically linked to and control the pumping region according to an operational parameter, wherein the operational parameter comprises one of: speed of the electromechanical driver, or acceleration of the electromechanical driver; and one or more computer processors configured to communicate electronically with the sensor and the electromechanical driver to:

determine the operational parameter based on a viscosity of medical fluid to be transferred; and adjust the operational parameter based on output of the sensor.

2. The electronic medical fluid transfer device of claim 1, wherein the one or more computer processors are further configured to:

receive an identifier of the medical fluid to be transferred; and obtain, from a data store using the identifier, flow characteristic data representing the viscosity of the medical fluid to be transferred.

3. The electronic medical fluid transfer device of claim 1, wherein the one or more computer processors are further configured to receive a medical fluid transfer command comprising flow characteristic data representing the viscosity of the medical fluid to be transferred.

4. The electronic medical fluid transfer device of claim 1, wherein the one or more computer processors are further configured to receive the output of the sensor, wherein the output represents detection of at least one of a vacuum or gas in the fluid transfer module.

5. The electronic medical fluid transfer device of claim 1, wherein the one or more computer processors are further configured to:

generate feedback data representing adjustment of the operational parameter;

modify operational parameter data, stored in a data store and associated with the medical fluid, based on the feedback data; and use the operational parameter data, as modified based on the feedback data, during a subsequent transfer of medical fluid.

6. The electronic medical fluid transfer device of claim 1, wherein the one or more computer processors are further configured to:

generate feedback data representing adjustment of the operational parameter;

send the feedback data to a network-based server; and receive, from the network-based server, operational parameter data representing a modification to the operational parameter based at least partly on the feedback data.

7. The electronic medical fluid transfer device of claim 1, wherein the sensor comprises an acoustic sensor.

8. The electronic medical fluid transfer device of claim 1, further comprising an optical encoder configured to generate driver movement data representing movement of the electromechanical driver.

9. The electronic medical fluid transfer device of claim 8, wherein the driver movement data represents a quantity of segments of a reference component detected by the optical encoder, wherein the reference component is coupled to the electromechanical driver, and wherein the one or more computer processors determine to evaluate output of the sensor based on the quantity of segments.

10. The electronic medical fluid transfer device of claim 8, wherein the driver movement data represents a quantity of segments of a reference component detected by the optical encoder, wherein the reference component is coupled to the electromechanical driver, and wherein the one or more computer processors determine, based on the quantity of segments, a volume of medical fluid transferred to a destination container or the pumping region.

11. The electronic medical fluid transfer device of claim 8, wherein the one or more computer processors are further configured to:

send an electronic signal causing the electromechanical driver to move in a first direction;

determine that the electromechanical driver has stalled;

determine a quantity of segments of a reference component to be detected by the optical encoder during movement of the electromechanical driver in a second direction to reach a home position; and send a second electronic signal causing the electromechanical driver to move in the second direction until the optical encoder has detected the quantity of segments.

12. The electronic medical fluid transfer device of claim 1, further comprising a camera configured to capture an image of the pumping region.

13. The electronic medical fluid transfer device of claim 12, further comprising a user interface configured to:

determine an augmentation to be applied to the image based at least partly on a volume of medical fluid transferred to an intermediate container or pumping region; and display the image with the augmentation, wherein the augmentation indicates a level of medical fluid within the intermediate container or pumping region depicted in the image.

14. A method for controlling an electronic medical device, wherein the electronic medical device comprises an electromechanical driver, a sensor, and a computer processor configured to communicate electronically with the sensor and the electromechanical driver, the method comprising:

determining, using the computer processor, an operational parameter based on a viscosity of medical fluid to be transferred, wherein the operational parameter comprises one of: speed of the electromechanical driver, or acceleration of the electromechanical driver;

controlling, using the electromechanical driver, a pumping region of a fluid transfer module according to the operational parameter, wherein the fluid transfer module comprises a first inlet fluid connector, a second outlet fluid connector, and the pumping region;

detecting, using the sensor, a region of at least one of vacuum, partial vacuum, or gas is present in the fluid transfer module; and adjusting, using the computer processor, the operational parameter based on output of the sensor.

15. The method of claim 14, further comprising:

receiving an identifier of the medical fluid to be transferred; and obtaining, from a data store using the identifier, flow characteristic data representing the viscosity of the medical fluid to be transferred.

16. The method of claim 14, further comprising receiving a medical fluid transfer command comprising flow characteristic data representing the viscosity of the medical fluid to be transferred.

17. The method of claim 14, further comprising:

generating feedback data representing adjustment of the operational parameter;

modifying operational parameter data, stored in a data store and associated with the medical fluid, based on the feedback data; and using the operational parameter data, as modified based on the feedback data, during a subsequent transfer of medical fluid.

18. The method of claim 17, further comprising:

generating feedback data representing adjustment of the operational parameter;

sending the feedback data to a network-based server; and receiving, from the network-based server, operational parameter data representing a modification to the operational parameter based at least partly on the feedback data.

19. The method of claim 14, further comprising:

sending an electronic signal causing the electromechanical driver to move in a first direction;

determining that the electromechanical driver has stalled;

determining a quantity of segments of a reference component to be detected by an optical encoder during movement of the electromechanical driver in a second direction to reach a home position; and sending a second electronic signal causing the electromechanical driver to move in the second direction until the optical encoder has detected the quantity of segments.

20. The method of claim 14, further comprising:

determining an augmentation to be applied to an image of the pumping region based at least partly on a volume of medical fluid transferred to an intermediate container or pumping region; and causing display of the image with the augmentation, wherein the augmentation indicates a level of medical fluid within the intermediate container or pumping region depicted in the image.

* * * * *